(12) United States Patent
Centonza et al.

(10) Patent No.: US 11,589,345 B2
(45) Date of Patent: Feb. 21, 2023

(54) MANAGEMENT OF RESOURCE ALLOCATION AND NOTIFICATION CONTROL OVER RAN INTERFACES

(71) Applicant: Telefonaktiebolaget LM Ericsson (publ), Stockholm (SE)

(72) Inventors: Angelo Centonza, Stockholm (SE); Mattias Frenne, Uppsala (SE); Gino Masini, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 16/763,824

(22) PCT Filed: Nov. 16, 2018

(86) PCT No.: PCT/IB2018/059051
§ 371 (c)(1),
(2) Date: May 13, 2020

(87) PCT Pub. No.: WO2019/097476
PCT Pub. Date: May 23, 2019

(65) Prior Publication Data
US 2021/0368500 A1  Nov. 25, 2021

Related U.S. Application Data

(60) Provisional application No. 62/588,168, filed on Nov. 17, 2017.

(51) Int. Cl.
*H04W 72/04* (2009.01)
*H04W 72/08* (2009.01)
*H04W 76/15* (2018.01)
*H04W 72/0446* (2023.01)

(52) U.S. Cl.
CPC ......... *H04W 72/0426* (2013.01); *H04W 72/0446* (2013.01); *H04W 72/082* (2013.01); *H04W 76/15* (2018.02)

(58) Field of Classification Search
CPC ......... H04W 72/0426; H04W 72/082; H04W 76/15; H04W 84/20; H04L 5/0053; H04L 5/001
USPC ........................................................ 370/329
See application file for complete search history.

(56) References Cited

U.S. PATENT DOCUMENTS

| | | | |
|---|---|---|---|
| 10,368,384 B2* | 7/2019 | Ali | H04L 5/0032 |
| 2020/0084766 A1* | 3/2020 | Pawlak | H04W 72/0446 |
| 2020/0120535 A1* | 4/2020 | Dai | H04W 76/00 |

OTHER PUBLICATIONS

R3-173860 (Year: 2017).*
R3-173702 (Year: 2017).*
62501993P (Year: 2017).*

(Continued)

*Primary Examiner* — Intekhaab A Siddiquee
(74) *Attorney, Agent, or Firm* — Baker Botts, LLP

(57) ABSTRACT

According to certain embodiments, a method by a master network node is provided for resource coordination with a secondary network node for dual connectivity. The method includes transmitting, to the secondary network node, resource coordination information for use by the secondary network node in coordinating resource utilization between the master network node and the secondary network node for a wireless device.

23 Claims, 19 Drawing Sheets

(56) References Cited

OTHER PUBLICATIONS

3GPP TSG-RAN WG1 NR_AH #3; Nagoya, Japan; Agenda item 6.6; Offline discussions and proposals on harmonic interference handling (R1-1716696)—Sep. 21, 2017.
3GPP TSG-RAN WG3 Meeting #97bis; Prague, Czech Republic; Source: vivo; Title: Design of backhaul signaling for harmonic interference handling (R3-173860)—Oct. 9-13, 2017.
3GPP TSG-RAN WG3 #97bis; Source: Ericsson; Title: Bearers for Dual Connectivity—Bearer harmonisation (R3-173947)—Oct. 9-13, 2017.
3GPP TSG RAN WG3 Meeting #98 Tdoc; Reno, Nevada, USA; Source: Ericsson; Title: Discussion on per UE resource coordination between LTE and NR (R3-174793)—Nov. 27-Dec. 1, 2017.
PCT International Search Report for International application No. PCT/IB2018/059051—dated Feb. 20, 2019.
PCT Written Opinion of the International Searching Authority for International application No. PCT/IB2018/059051—dated Feb. 20, 2019.
EPO Communication Pursuant to Article 94(3) EPC issued for Application No. 18 815 027.0-1205—dated Apr. 6, 2021.
3GPP TSG RAN WG3 Meeting #97; Berlin, Germany; Title: LS on RAN3 signaling support for LTE-NR coexistence feature (R3-173397)—Aug. 21-25, 2017.
3GPP TSG-RAN WG3#97BIS; Prague, Czech Republic; Title: LS on backhaul signalling for UE harmonic interference handling (R3-173581)—Oct. 9-13, 2017.
3GPP TSG-RAN WG3#97BIS; Prague, Czech Republic; Title: LS on single Tx switched UL (R3-173587)—Oct. 9-13, 2017.

\* cited by examiner

MANAGEMENT OF RESOURCE ALLOCATION AND NOTIFICATION CONTROL OVER RAN INTERFACES

PRIORITY

This nonprovisional application is a U.S. National Stage Filing under 35 U.S.C. § 371 of International Patent Application Serial No. PCT/IB2018/059051 filed Nov. 16, 2018 and entitled "MANAGEMENT OF RESOURCE ALLOCATION AND NOTIFICATION CONTROL OVER RAN INTERFACES" which claims priority to U.S. Provisional Patent Application No. 62/588,168 filed Nov. 17, 2017 both of which are hereby incorporated by reference in their entirety.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates the current 5G RAN architecture as described in TS 38.401. The NG architecture can be further described as follows:

The NG-RAN consists of a set of gNBs connected to the 5GC through the NG.
  An gNB can support FDD mode, TDD mode or dual mode operation.
  gNBs can be interconnected through the Xn.
  A gNB may consist of a gNB-CU and gNB-DUs.
  A gNB-CU and a gNB-DU is connected via F1 logical interface.
  One gNB-DU is connected to only one gNB-CU.
  NG, Xn and F1 are logical interfaces. For NG-RAN, the NG and Xn-C interfaces for a gNB consisting of a gNB-CU and gNB-DUs, terminate in the gNB-CU. For EN-DC, the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.
  The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signalling transport. In NG-Flex configuration, each gNB is connected to all AMFs within an AMF Region. The AMF Region is defined in 3GPP TS 23.501.

In the context of RAN 5G architectures, 3GPP has agreed that dual connectivity is supported. Such mechanism consists of establishing master and secondary nodes and it consists of distributing user plane (UP) traffic to the master node (MN) and secondary nodes (SNs) according to the best possible traffic and radio resource management. CP traffic is assumed to terminate in one node only such as, for example, the MN. FIGS. 2 and 3 illustrate the protocol and interfaces involved in dual connectivity, as per TS 38.300. Specifically, FIG. 2 illustrates MgNB Bearers for Dual Connectivity, and FIG. 3 illustrates SgNB Bearers for Dual Connectivity.

As shown in FIG. 2, the Master gNB (MgNB) can forward PDCP bearer traffic to a Secondary gNB (SgNB), while FIG. 3 shows the case where the SGNB forwards PDCP bearer traffic to the MgNB. It needs to be considered that the MgNB and SgNB may be subject to the RAN split architecture outlined above and made of CUs and DUs.

Furthermore, in the context of 5G standardization multi-RAT dual connectivity (MR-DC) is being specified. When MR-DC is applied, a RAN node (the master node, MN) anchors the control plane towards the CN, while another RAN node (the secondary node, SN) provides control and user plane resources to the UE via coordination with the MN. The details of MR-DC and related procedure as specified in TS 37.340.

For the 5G system, a connectivity option is being specified which foresees dual connectivity between a node providing E-UTRA resources (LTE eNB in the FIGS. 4 and 5) and a node providing NR resources (gNB in FIGS. 4 and 5). Specifically, FIG. 4 illustrates C-Plane connectivity for EN-DC. FIG. 5 illustrates U-Plane connectivity for EN-DC. This connectivity option is called "option 3", as per 3GPP TR 38.801 and foresees connectivity from RAN nodes towards a 4G Core Network by means of the S1 interface. It may also be indicated as EN-DC, E-UTRAN-NR Dual Connectivity. The interface between the LTE eNB and gNB is an X2 interface.

Early deployments of NR and LTE networks will be characterized by tight integration. One of the key features will be MR-DC (Multi-Radio Access Technology Dual Connectivity), to deliver enhanced end-user bit rate. In MR-DC, both LTE and NR concurrently provide radio resources toward the UE. In one of the possible options for MR-DC (called "Option 3" in 3GPP discussions), the LTE eNB acts as "master" (CP anchor) and the NR gNB acts as "secondary" (providing additional UP resources).

In many cases, NR and LTE will be deployed over the same bands: therefore, neighbor LTE and NR cells may use overlapping or adjacent spectrum.

When a UE is configured for MR-DC where LTE and NR use overlapping or adjacent spectrum, there may be harmonic interference generated from UL to DL. This may degrade receiver performance, ultimately leading to poor signal quality and bit rate degradation, effectively reducing the potential capacity gain of using MR-DC. Per-cell or per-node information exchange between master and secondary nodes is not enough to address the issue of harmonic interference, since different UEs will be typically be allocated different TX and/or RX resource patterns by the master node. In this case, the exchange of allocated radio resource information (e.g. semi-static time or frequency patterns indicating intended reception/transmission on an LTE UL carrier and an NR DL carrier on non-overlapping frequencies) needs to be per-UE. (See, R3-173581 LS on Backhaul Signaling for UE Harmonic Interference Handling).

There is yet another issue which will require tight coordination in early NR deployments. It will be possible for an early UEs to support both NR and LTE with only a single TX. (See, R3-173587 LS on Single TX Switched UL).

Therefore, when such a single-TX UE is configured for MR-DC, it will be impossible for it to transmit over LTE and NR physical layer at the same time. The master and secondary node serving that UE will then need to a) be aware of such a limitation through the UE's capability signaling, and b) coordinate their UL TX allocation to the UE so that it is never required to transmit over LTE and NR at the same time. Also in this case, per-UE information exchange over X2 and/or Xn is necessary.

The physical layer transmission in LTE and NR uses OFDM in the downlink and while LTE always use DFT-spread OFDM in the uplink, it can for NR be configurable to either OFDM or DFT-spread OFDM. The basic LTE and NR physical resource can thus be seen as a time-frequency grid as illustrated in FIG. 6, where each resource element corresponds to one subcarrier during one OFDM symbol interval. FIG. 6 illustrates the LTE downlink physical resource where subcarrier spacing is 15 kHz.

In the time domain, LTE downlink transmissions are organized into radio frames of 10 ms, each radio frame consisting of ten equally-sized subframes of 1 ms as illustrated in FIG. 7. A subframe is divided into two slots, each of 0.5 ms time duration. FIG. 7 illustrates the LTE time-domain structure.

The resource allocation in LTE is described in terms of resource blocks (RB), where an RB corresponds to one slot in the time domain and 12 contiguous 15 kHz subcarriers in the frequency domain. Two in time consecutive RBs represent an RB pair or PRB and corresponds to the time interval upon which scheduling operates.

In the time domain, NR downlink transmissions are organized into radio frames of 10 ms, each radio frame consisting of ten equally-sized subframes of 1 ms as illustrated in FIG. 8. A subframe is divided into 1, 2, 4, 8 or 16 slots, each of a configurable time duration. FIG. 8 illustrates the NR time-domain structure.

The resource allocation in NR is described in terms of resource blocks (RB), where an RB corresponds to one slot in the time domain and 12 contiguous subcarriers in the frequency domain where the subcarrier bandwidth is configurable, see below.

In NR, the bandwidth for which a UE is served can be UE specific, so two UEs which has capabilities to receive different maximum bandwidths can still be served by the same carrier band. The term bandwidth part (BWP) is introduced, which is the part of the bandwidth where the UE currently is served. For example, the carrier can have 100 MHz bandwidth but a less complex UE can only operate on a 15 MHz BWP while another UE can use the full 100 MHz BWP. It is also possible that a given UE is configured a narrow (e.g. 15 MHz) BWP and a wide (e.g. 100 MHz) BWP simultaneously, while only one of its configured BWPs is active at a time. This allows the UE to save battery when there is no need for large data transfer, but it can quickly switch to a large BWP if there is need to transmit or receive a lot of data.

NR is based on an OFDM based waveform, but compared to LTE which use a fixed subcarrier spacing of 15 kHz and 1 ms long subframes, a scaled numerology is introduced, where a parameter μ is used to set the subcarrier spacing $\Delta f = 2^\mu \cdot 15$ [kHz] for a given bandwidth part. Table 1 below shows the supported subcarrier spacings in NR Rel-14.

TABLE 1

Supported transmission numerologies and subcarrier spacing Δf

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

When the subcarrier spacing is increased, then the OFDM symbol time is decreased proportionally.

In LTE, a subframe is 1 ms long and is used to transmit a PDSCH or PUSCH, i.e. this is the TTI for a data transport block, while the corresponding measure in NR is a slot which scales with the numerology μ Hence the OFDM slot time is $T=2^{-\mu} \cdot 1$ [ms] and the number of symbols per slot is given by Table 2.

TABLE 2

Number of OFDM symbols per slot, slots per frame, and slots per subframe for normal cyclic prefix.

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In Table 2 it can also be seen that a frame has 10 slots when μ=0, that is when the subcarrier spacing is 15 kHz, same as a frame in LTE has 10 subframes but for μ=3 when the subcarrier spacing is 120 kHz according to Table 1, then there are 80 slots per frame, i.e. per 10 ms. In a sense, a slot in NR is equivalent to a subframe in LTE. However, NR also have subframes, which always is 1 ms, irrespectively of the numerology but subframes does not have any particular relevance in NR physical layer expect it serves as a "clock", once per 1 ms, but it may be useful for higher layer configurations. In addition, NR has frames, which always is 10 ms.

To summarize, the frame and subframe always have fixed time durations (10 ms and 1 ms), while slots have a time duration that depends on the numerology according to $T=2^{-\mu} \cdot 1$ [ms].

Moreover, NR will support a larger maximum carrier (or BWP) bandwidth compared to LTE, partially achieved by changing the subcarrier spacing to be larger than 15 kHz but partially also to due to the fact that a larger total number of subcarriers can be used, up to 3300 subcarrier is supported in NR. This means that a carrier can have up to 275 physical resource blocks (RBs) which has 12 subcarriers each.

For each numerology and carrier, a resource grid of $N_{RB,x}^\mu N_{sc}^{RNB}$ subcarriers and $N_{symb}^{subframe,\mu}$ OFDM symbols is defined, where $N_{RB,x}^{max,\mu}$ is given by Table 3 and x is DL or UL for downlink and uplink, respectively. Note that there is also a minimum bandwidth due to the fact that synchronization signals needs to be transmitted and they have 20 RB bandwidth.

TABLE 3

Minimum and maximum number of resource blocks.

| $\mu$ | $N_{RB,\,DL}^{min,\,\mu}$ | $N_{RB,\,DL}^{max,\,\mu}$ | $N_{RB,\,UL}^{min,\,\mu}$ | $N_{RB,\,UL}^{max,\,\mu}$ |
|---|---|---|---|---|
| 0 | 20 | 275 | 20 | 275 |
| 1 | 20 | 275 | 20 | 275 |
| 2 | 20 | 275 | 20 | 275 |
| 3 | 20 | 275 | 20 | 275 |
| 4 | 20 | 138 | 20 | 138 |

One can now compute the maximum number or RB per radio frame by using the Tables 2 and 3 and assuming the maximal bandwidth of 275 RB, for example if $\mu=0$, then there are 10*275=2750 RB per radio frame while if $\mu=3$ then there are maximally 80*275=22000 RB per radio frame.

There currently exist certain challenge(s). For example, various mechanisms may be envisaged to exchange air interface parameters (e.g. DL/UL carrier center frequency, carrier bandwidth, semi-statically used resources, slots/PRBs not intended for transmission, etc.) over network interfaces (e.g. X2 and/or Xn) to enable inter-node interference coordination. (See, R3-173397 LS on RAN3 Signaling Support for LTE-NR Coexistence Feature.) As seen above, to correctly handle single-TX UEs and to mitigate harmonic interference, the information needs to be exchanged on a per-UE basis. At the same time coordination of LTE and NR is needed for harmonic interference mitigation. Such mechanisms are needed for scenarios of multi connectivity, i.e. the exchange of information to coordinate these cases is either between an LTE eNB and an NR gNB or between two NR gNBs.

SUMMARY

There are, proposed herein, various embodiments which address one or more of the issues disclosed herein. As one example, a method is disclosed that allows coordination of single transmission capable UEs and the coordination of harmonic interference both in cases of multi connectivity in NR and in cases of LTE-NR dual connectivity.

According to certain embodiments, a method by a master network node is provided for resource coordination with a secondary network node for dual connectivity. The method includes transmitting, to the secondary network node, resource coordination information for use by the secondary network node in coordinating resource utilization between the master network node and the secondary network node for a wireless device.

According to certain embodiments, a master network node is provided for resource coordination with a secondary network node for dual connectivity. The master network node includes processing circuitry configured to transmit, to the secondary network node, resource coordination information for use by the secondary network node in coordinating resource utilization between the master network node and the secondary network node for a wireless device.

According to certain embodiments, a method by a secondary network node is provided for resource coordination with a master network node for dual connectivity. The method includes receiving, from the master network node, resource coordination information for a wireless device and using, by the secondary network node, the resource coordination information from the master network node for coordinating resource utilization between the master network node and the secondary network node for the wireless device.

According to certain embodiments, a secondary network node is provided for resource coordination with a master network node for dual connectivity. The secondary network node includes processing circuitry configured to receive, from the master network node, resource coordination information for a wireless device and use the resource coordination information from the master network node for coordinating resource utilization between the master network node and the secondary network node for the wireless device.

Certain embodiments may provide one or more of the following technical advantage(s). As one example, certain embodiments may advantageously solve, with one class of signalling information, both the problem of coordination of single TX UEs and the problem of harmonic interference coordination. As another example, certain embodiments may advantageously allow for signalling of information that adapt to multiple radio access technologies, e.g. LTE and NR.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
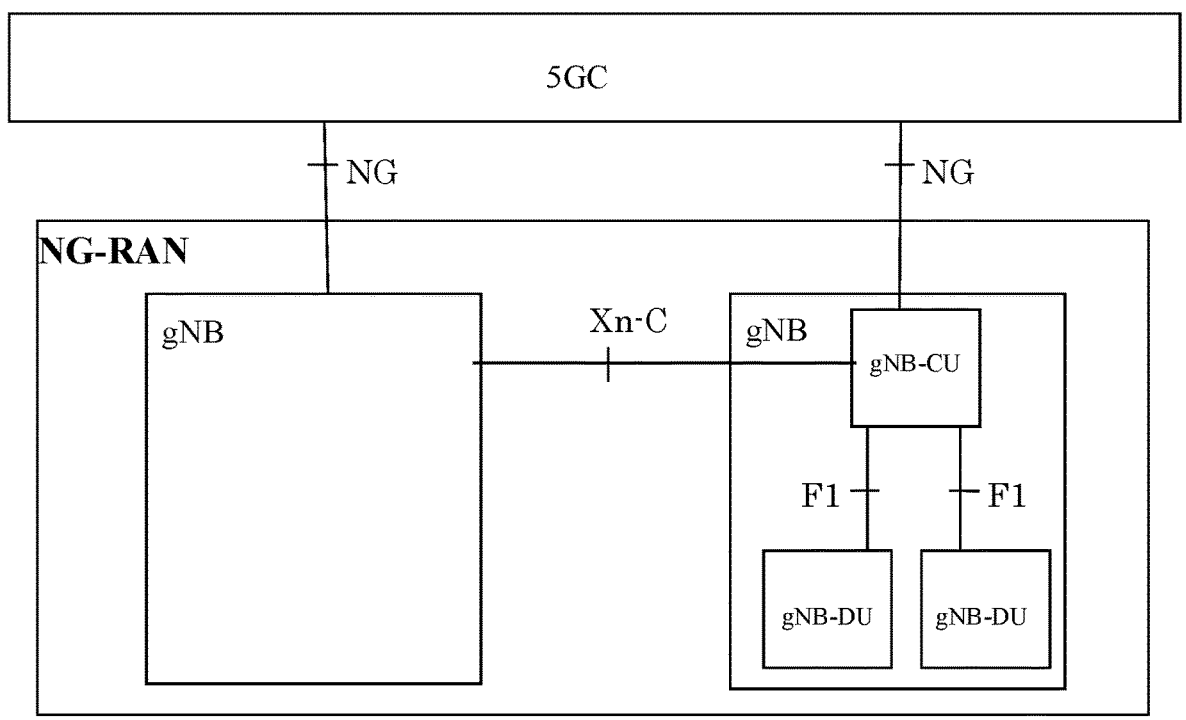
FIG. 1 illustrates the current 5G RAN architecture as described in TS 38.401.
Figure 2:
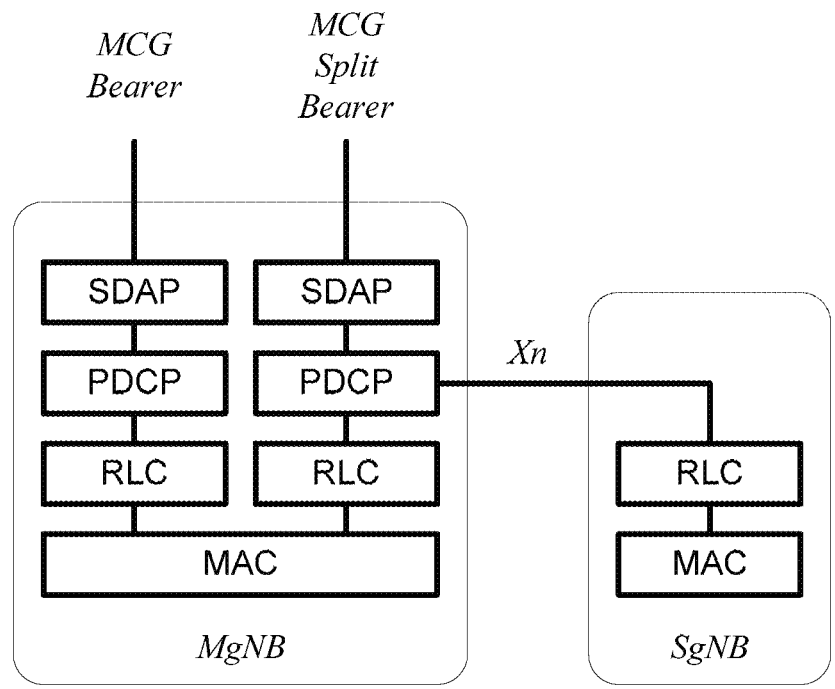
FIG. 2 illustrates MgNB Bearers for Dual Connectivity.
Figure 3:
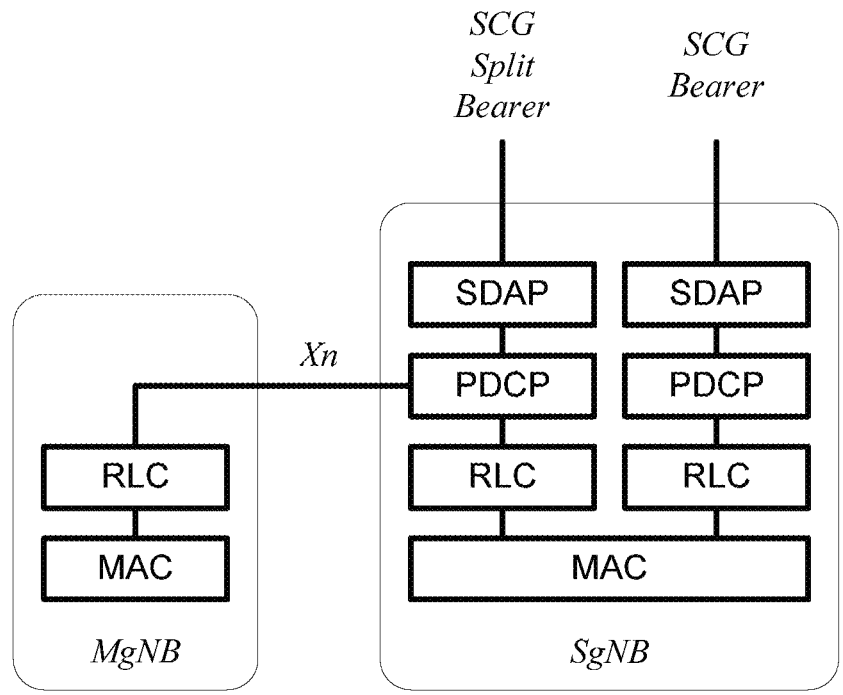
FIG. 3 illustrates SgNB Bearers for Dual Connectivity.
Figure 4:
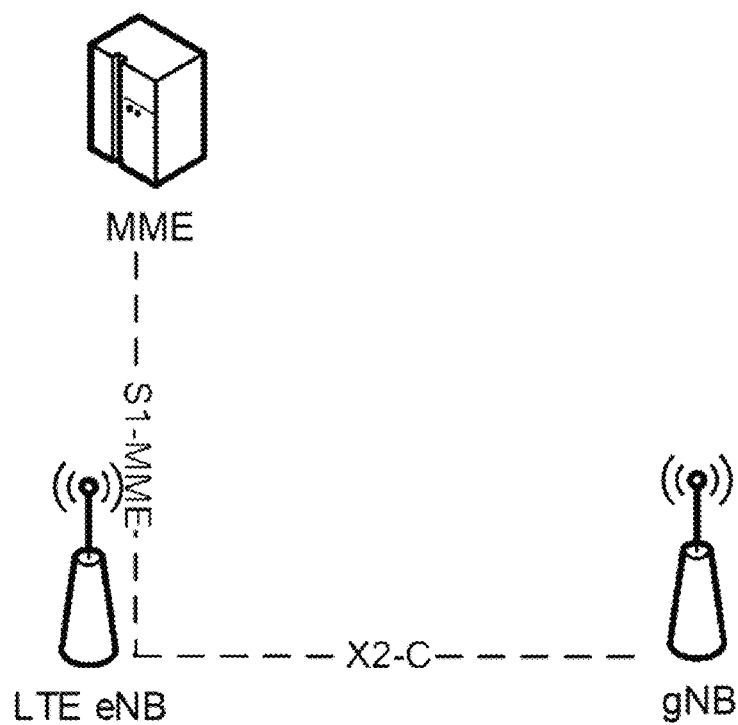
FIG. 4 illustrates C-Plane connectivity for EN-DC.

Typically, radio resource allocation for a UE in multi connectivity, e.g. in EN-DC, may happen together with adding/modifying/removing UP resources, which is done with the DC procedures over X2/Xn. One option is, therefore, to add the appropriate radio resource allocation for the UE configured for MC, in the existing set of DC procedures for X2/Xn. Among other things, this may enable special handling of single-TX UEs and handling of harmonic interference with a single solution.

Dedicated procedures may be defined too, where information to coordinate single TX and harmonic interference are provided.

A problem solved by one or more embodiments of the present disclosure is to convey a single set of information that addresses both the problem of single Tx UE coordination and harmonic transmission interference coordination.

In order to find a solution for single Tx capable UEs and harmonic interference coordination a representation of time frequency resources that can adapt to the two scenarios of EN-DC and intra NR multi connectivity shall be designed.

With regards to the case of EN-DC, i.e. signaling of the time frequency information between a Master eNB (MeNB) and an SgNB, one example embodiment of the present disclosure foresees formatting of the information on intended resource allocation done with respect to LTE. Namely, the SgNB constructs a pattern of utilized PRBs spanning across subframes, where PRBs and subframes follow the LTE structure. This is done for two reasons:

To minimize the impact on LTE: The MeNB will not need to understand the time frequency resource structure of the SgNB. The SgNB will format its intended resource utilization in a way that fits the time frequency resource distribution in LTE.

To reduce complexity: the time frequency resource granularity of NR can be much finer than in LTE and the range of e.g. number of RBs across the bandwidth can be larger than in LTE. However, to achieve coordination of resource allocation between LTE and NR it is sufficient to express intended resource allocation in accordance to the coarser structure, i.e. the LTE one.

According to certain embodiments, the exchange of information representing the intended resource allocation of an MeNB and an SeNB in EN-DC, used to achieve coordination of both Single Tx UEs and harmonic interference, may be added to one or more of the following procedures:

SgNB Addition Preparation: this allows the MeNB to signal, in a UE associated way, to SgNB its intended resource utilization and receive in response the intended resource utilization of the SgNB.

MeNB initiated SgNB Modification Preparation: this allows the MeNB to signal, in a UE associated way, to SgNB eventual modifications of the intended resource utilization and receive in response the eventually modified intended resource utilization of the SgNB.

SgNB initiated SgNB Modification: this allows the SgNB to signal, in a UE associated way, to MeNB eventual modifications of the intended resource utilization and receive in response the eventually modified intended resource utilization of the MeNB.

In another example embodiment of the present disclosure, the information may be exchanged in new messages over the X2 interface.

In another example embodiment of the present disclosure, and for the case of intra NR DC or MC, i.e. dual or multi connectivity between gNBs, information on intended time frequency resource allocation may be signaled on procedures equivalent to the ones above, where the only difference is that the MeNB is replaced by an MgNB, i.e. a master gNB node.

In one example embodiment of the present disclosure, the information that can be signalled for the EN-DC case may contain one or more of the following:

A cell identifier for the cell for which the intended resource allocation is signalled An indication from the MeNB to the SgNB of the intended UL resource allocation for a UE. This indication may cover multiple subframes. This utilization can be considered valid until new information is signalled An indication from the SgNB to the MeNB of the intended UL and DL resource allocation for a UE. This indication may cover multiple subframes. This utilization can be considered valid until new information is signalled An indication of whether the information is used for single Tx UE coordination, for harmonic interference coordination or for both. This is needed because When the indication applies to single Tx UE coordination all the time-frequency resources in the transmission time interval utilized for UL should be assumed not usable by the receiving node;

On the contrary, when the indication is for harmonic interference coordination, but the UE is not a single Tx UE, there is no strict restriction on the receiving node to use resources not utilized by the sending node;

When the indication is for both single Tx UEs and harmonic interference coordination the receiving node should assume that the transmission time intervals used for UL by the sending node cannot be used, and it should consider the indication on DL resources intended to be utilized when performing DL RRM for the UE In another example embodiment of the present disclosure, the same type of information can be signaled for intra NR DC or MC, where the only difference with the embodiment above is that the MeNB is replaced by an MgNB.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

According to certain embodiments, information is exchanged for EN-DC. In various particular embodiments, the information exchanged for EN-DC can be encoded as per the examples below. These are only an example and the same encoding of the information may be used for other X2 procedures mentioned in previous embodiments.

According to certain embodiments, the indicational be sent in an SGNB ADDITION REQUEST. This message is sent by the MeNB to the SgNB to request the preparation of resources for EN-DC operation for a specific UE. Direction: MeNB→SgNB.

[ . . . ]

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| MeNB Resource Coordination Information | | 0 . . . 1 | | Information used to coordinate resources utilisation between MeNB and SgNB | EACH | reject |
| >Cell ID | M | | ECGI 9.2.14 | | — | — |
| >UL Coordination Information | M | | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to UL subframes. The bit string may span across multiple contiguous subframes (maximum 40). The first position of the UL Coordination Information corresponds to subframe 0 in a radio frame where SFN = 0. The length of the bit string is an integer multiple of $N_{RB}^{DL}$. $N_{RB}^{DL}$ is defined in TS 36.211 [10]. The UL | | |

-continued

| IE/Group Name | Presence | Range | IE type and reference | Semantics description | Criticality | Assigned Criticality |
|---|---|---|---|---|---|---|
| >Resource Coordination Type | M | | BITSTRING (SIZE(32)) | Coordination Information is continuously repeated. Each position in the bitmap indicates a type of intended coordination. First Bit = Single Tx Coordination, Second Bit = Harmonic Interference Coordination, Third Bit = Single Tx and Harmonic Interference Coordination. Other bits shall be ignored | | |

[ . . . ]
1.1.2 Inclusion in SGNB ADDITION REQUEST ACKNOWLEDGE
This message is sent by the SgNB to confirm the MeNB about the SgNB addition preparation.
Direction: SgNB→MeNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SgNB UE X2AP ID | M | | gNB UE X2AP ID 9.2.XX | Allocated at the SgNB | YES | reject |

| SgNB Resource Coordination Information | | 0 . . . 1 | | Information used to coordinate resources utilisation between SgNB and MeNB | EACH | ignore |
| >Cell ID | M | | ECGI 9.2.14 | | — | — |
| >UL Coordination Information | M | | BIT STRING (6 . . . 4400, . . .) | Each position in the bitmap represents a PRB in a subframe; value "0" indicates "resource not intended to be used for transmission", | | |

| | | | |
|---|---|---|---|
| | | | value "1" indicates "resource intended to be used for transmission". Each position is applicable only in positions corresponding to UL subframes. The bit string may span across multiple contiguous subframes (maximum 40). The first position of the UL Coordination Information corresponds to the receiving node's subframe 0 in a receiving node's radio frame where SFN = 0. The length of the bit string is an integer multiple of $N_{RB}^{DL}$. $N_{RB}^{DL}$ is defined in TS 36.211 [10]. The UL Coordination Information is continuously repeated. |
| >DL Coordination Information | O | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to DL subframes. The bit |

-continued

| | | | |
|---|---|---|---|
| | | | string may span across multiple contiguous subframes (maximum 40). The first position of the DL Coordination Information corresponds to the receiving node's subframe 0 in a receiving node's radio frame where SFN = 0. The length of the bit string is an integer multiple of $N_{RB}^{DL}$. $N_{RB}^{DL}$ is defined in TS 36.211 [10]. The DL Coordination Information is continuously repeated. |
| >Resource Coordination Type | M | BITSTRING (SIZE(32)) | Each position in the bitmap indicates a type of intended coordination. First Bit = Single Tx Coordination, Second Bit = Harmonic Interference Coordination, Third Bit = Single Tx and Harmonic Interference Coordination. Other bits shall be ignored |

With regards to the example of information encoded above the following behavior is envisaged for the receiving node:

If the SGNB ADDITION REQUEST message contains the MeNB Resource Coordination Information IE, the SgNB may use it for the purpose of resource coordination with the sending MeNB. If the Resource Coordination Type IE indicates that the intended coordination is for UEs capable of single transmission, this indicates that the UE may not be able to transmit on any resource of the subframes intended to be utilized for UL transmission.

For this reason, the receiving SgNB may consider not scheduling the UE on any of the resources corresponding to the subframe used for UL transmission.

The SgNB may decide to adapt its allocation of resources on the basis of the received intended resource allocation from the MeNB and avoid allocation of resources to the UE that may cause harmonic interference.

The SgNB shall consider the received MeNB Resource Coordination Information IE value valid until reception of a new update of the IE for the same UE.

If the SGNB ADDITION ACKNOWLEDGE message contains the SgNB Resource Coordination Information, the MeNB may use it for the purpose of resource coordination with the SgNB. If the Resource Coordination Type IE indicates that the intended coordination is for UEs capable of single transmission, this indicates that the UE may not be able to transmit on any resource of the subframes intended to be utilized for UL transmission. For this reason, the receiving MeNB may consider not scheduling the UE on any of the resources corresponding to the subframe used for UL transmission.

The MeNB may decide to adapt its allocation of resources on the bases of the received intended resource allocation from the MeNB and avoid allocation of resources to the UE that may cause harmonic interference. The latter shall be done still respecting the intended resource allocation in the SGNB ADDITION REQUEST. The MeNB shall consider the received UL Coordination Information IE value valid until reception of a new update of the IE for the same UE. The MeNB shall consider the received DL Coordination Information IE value valid until reception of a new update of the IE for the same UE.

According to certain embodiments, information is exchanged for NR MC and DC. Specifically, in this example embodiment, a generic signaling which takes into account the NR physical layer structure is defined. In this signaling, instead of adapting to the LTE physical layer structure the sending node may adapt to the NR physical layer structure. For that reason the numerology of the NR physical layer needs to be signaled, namely the parameters that define the number of slots per radio frame, their duration, the number of resource blocks in a slot.

The information to be signaled which describe the numerology of the NR physical layer may include at least:
Subcarrier spacing: (15 kHz, 30 kHz, 60 kHz, 120 kHz, . . . )
Number of slots per radio frame: from 20 to 320
If the information about the intended resource utilization had to be signalled in a similar way as specified in previous embodiment, but with a formulation adapted to the NR physical layer, the bit string to be used would be equal to the number of slots per radio frame, multiplied the number of radio blocks per frame, multiplied by the number of radio frame to be covered.

The resource coordination type and other information besides the intended resource allocation can be used in a way similar to what described for other embodiments.

In a particular embodiment, if the information exchanged between the two nodes is pertinent to both coordination of single Tx UEs and harmonic interference coordination, a receiving node, upon determining that the performance drop incurred when harmonic interference is experienced is minimal, may disregard the information on LD intended resource allocation and only consider the information about the UL intended resource allocation. The latter is because it is physically impossible for a single TX UE to transmit in multiple RATs within the same transmission time interval, e.g. same subframe. For this reason the indication on single Tx coordination shall not be ignored.

Figure 9:
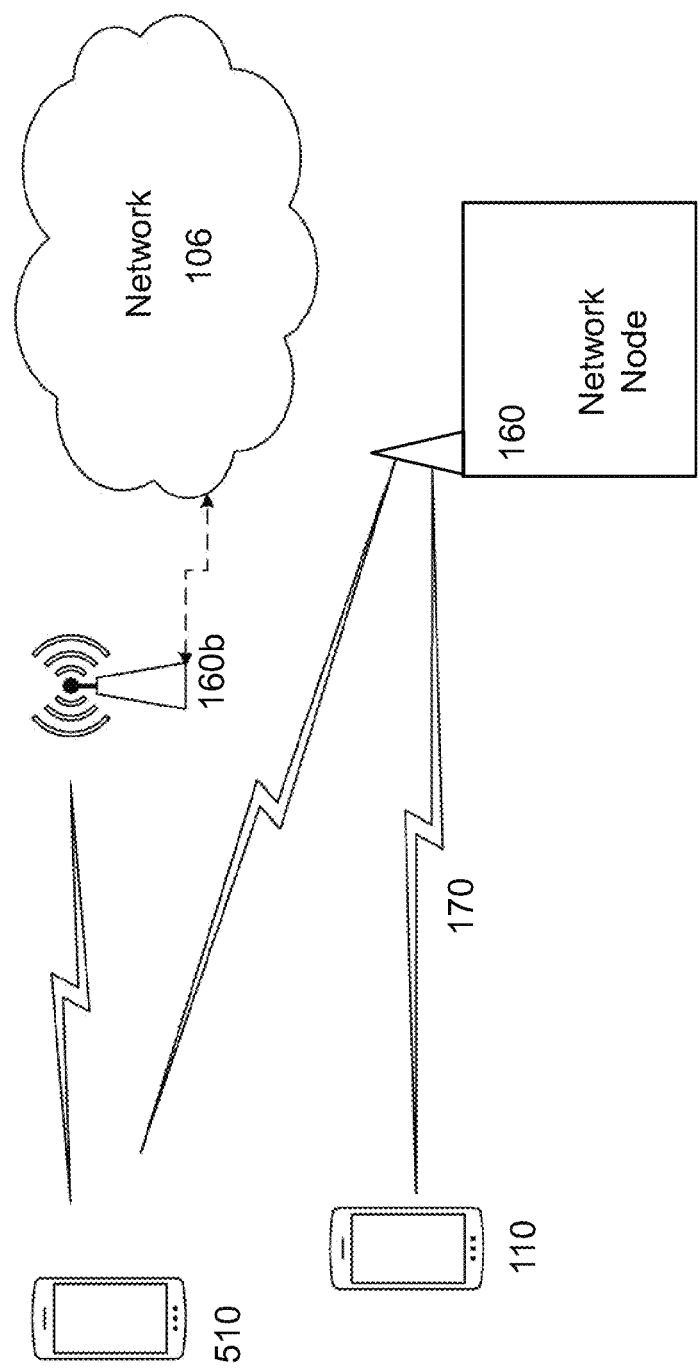
FIG. 9 illustrates an example network, in accordance with certain embodiments.

FIG. 9 illustrates a wireless network, according to certain embodiments. Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail.

The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 10:
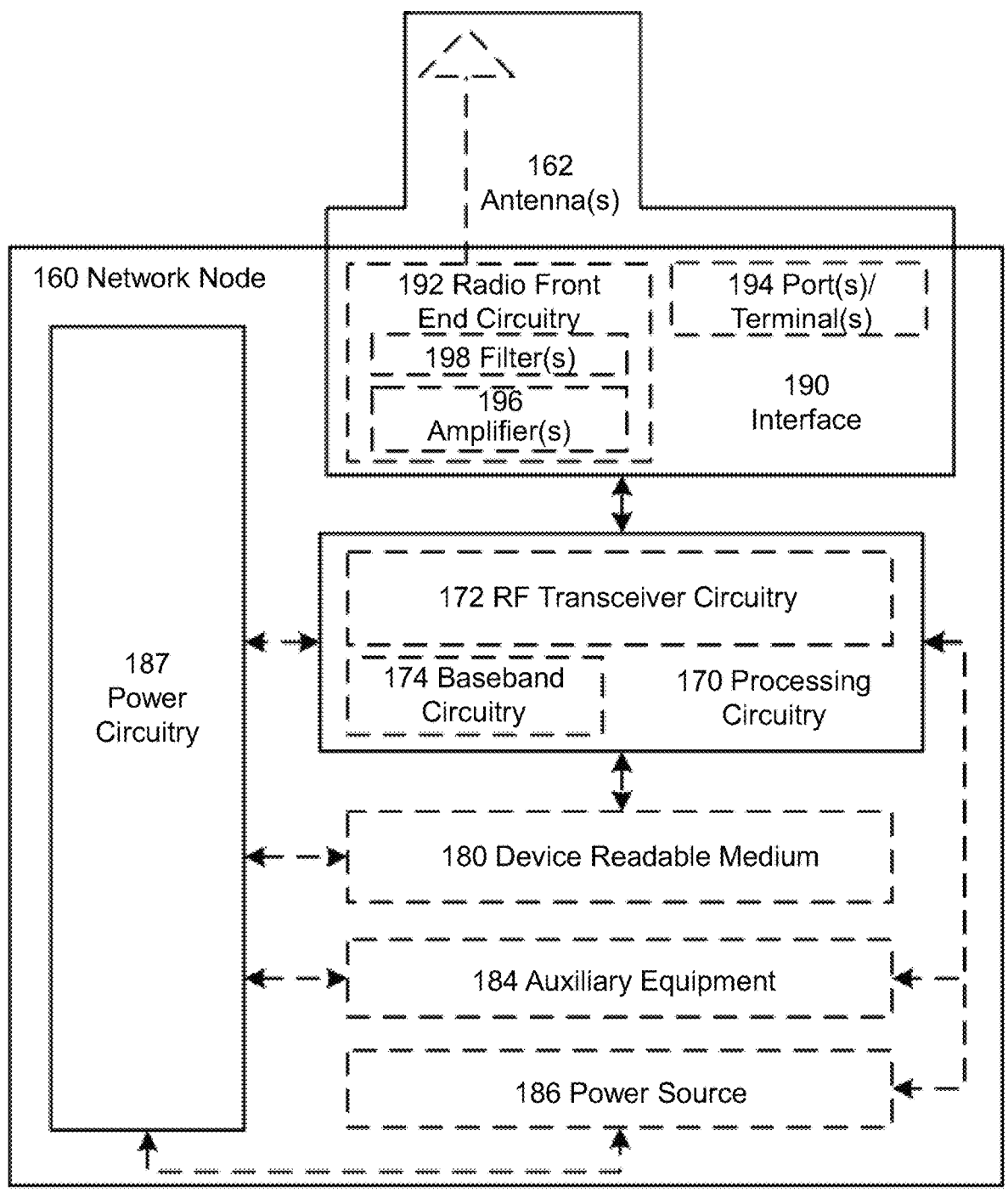
FIG. 10 illustrate an example network node, according to certain embodiments.

FIG. 10 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 160 includes processing circuitry 170, device readable medium 180, interface 190, auxiliary equipment 184, power source 186, power circuitry 187, and antenna 162. Although network node 160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 10 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 11:
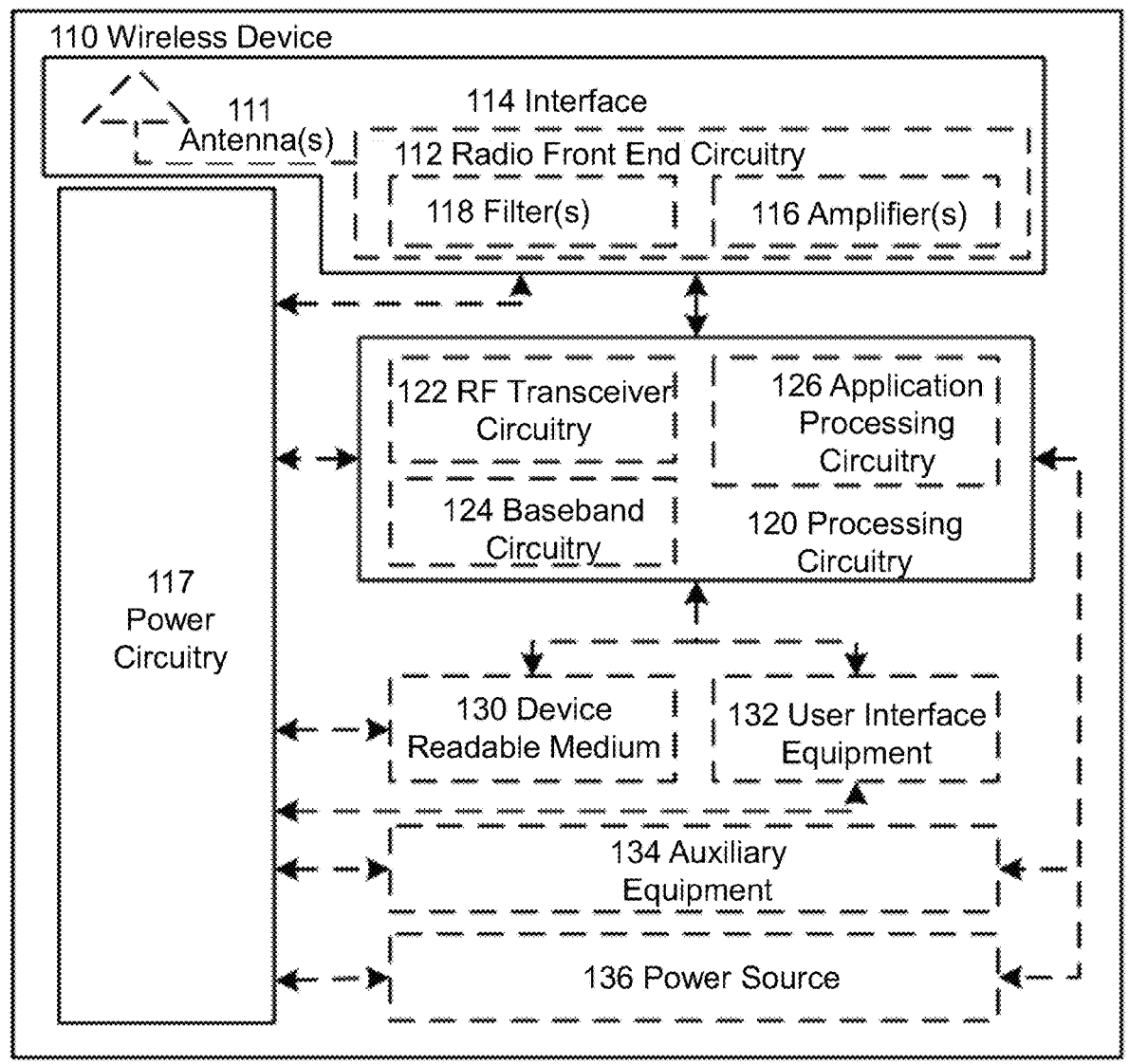
FIG. 11 illustrates an example wireless device, according to certain embodiments.

FIG. 11 illustrates an example wireless device (WD) 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 12:
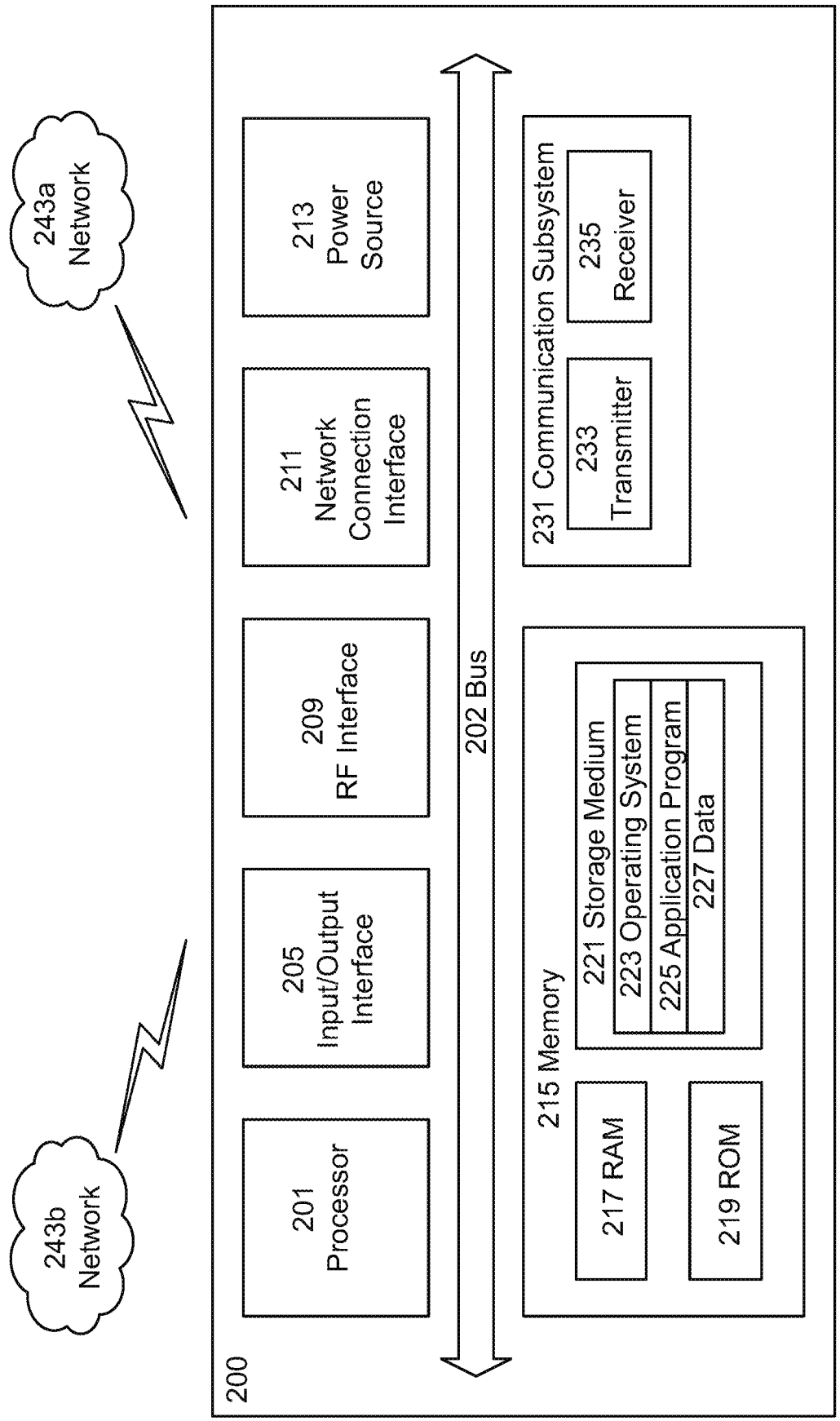
FIG. 12 illustrates an example user equipment (UE), according to certain embodiments.

FIG. 12 illustrates an example UE, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 12, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 13:
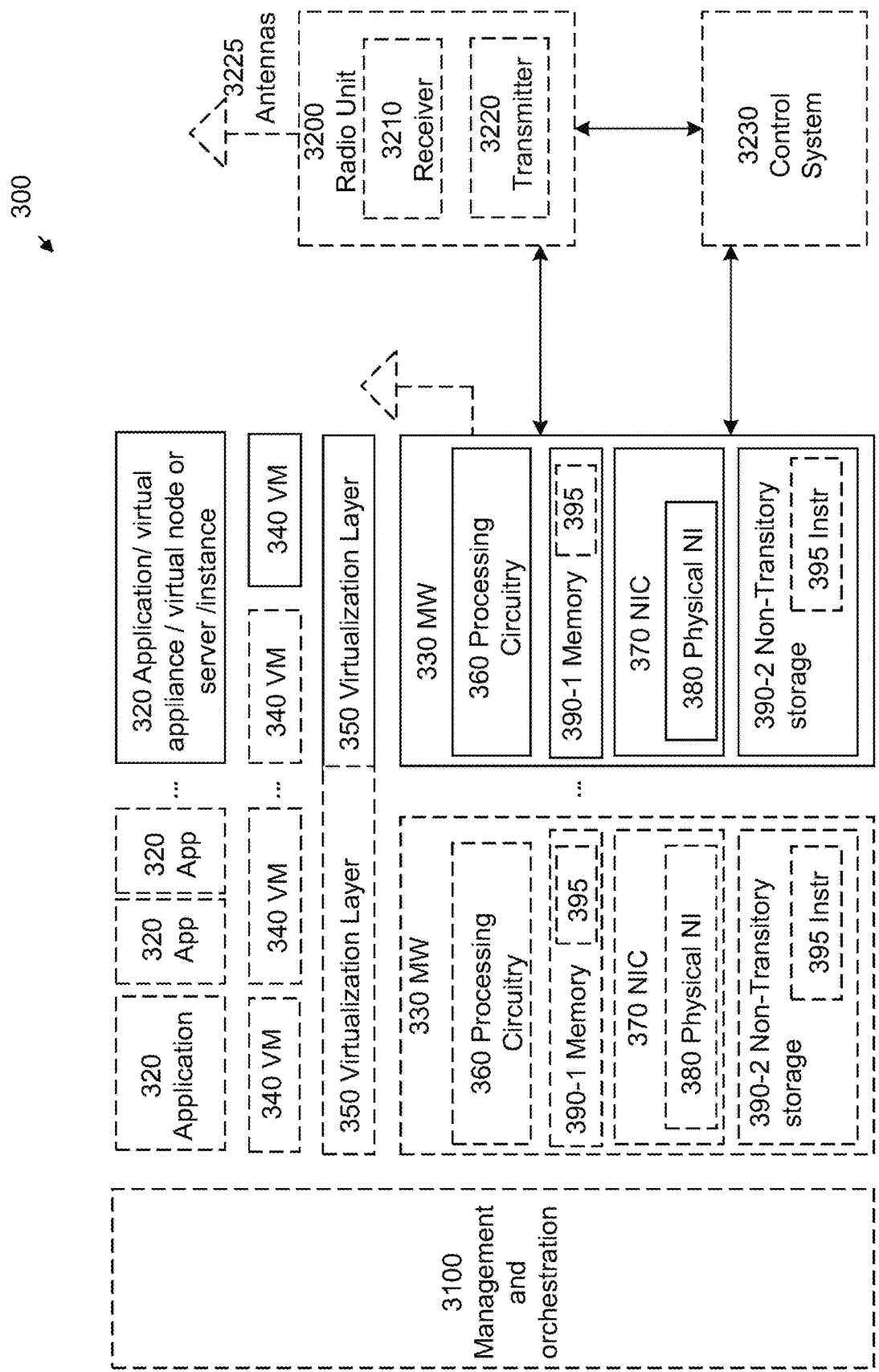
FIG. 13 illustrates a virtualization environment, according to certain embodiments.

FIG. 13 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 13, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 13.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 14:
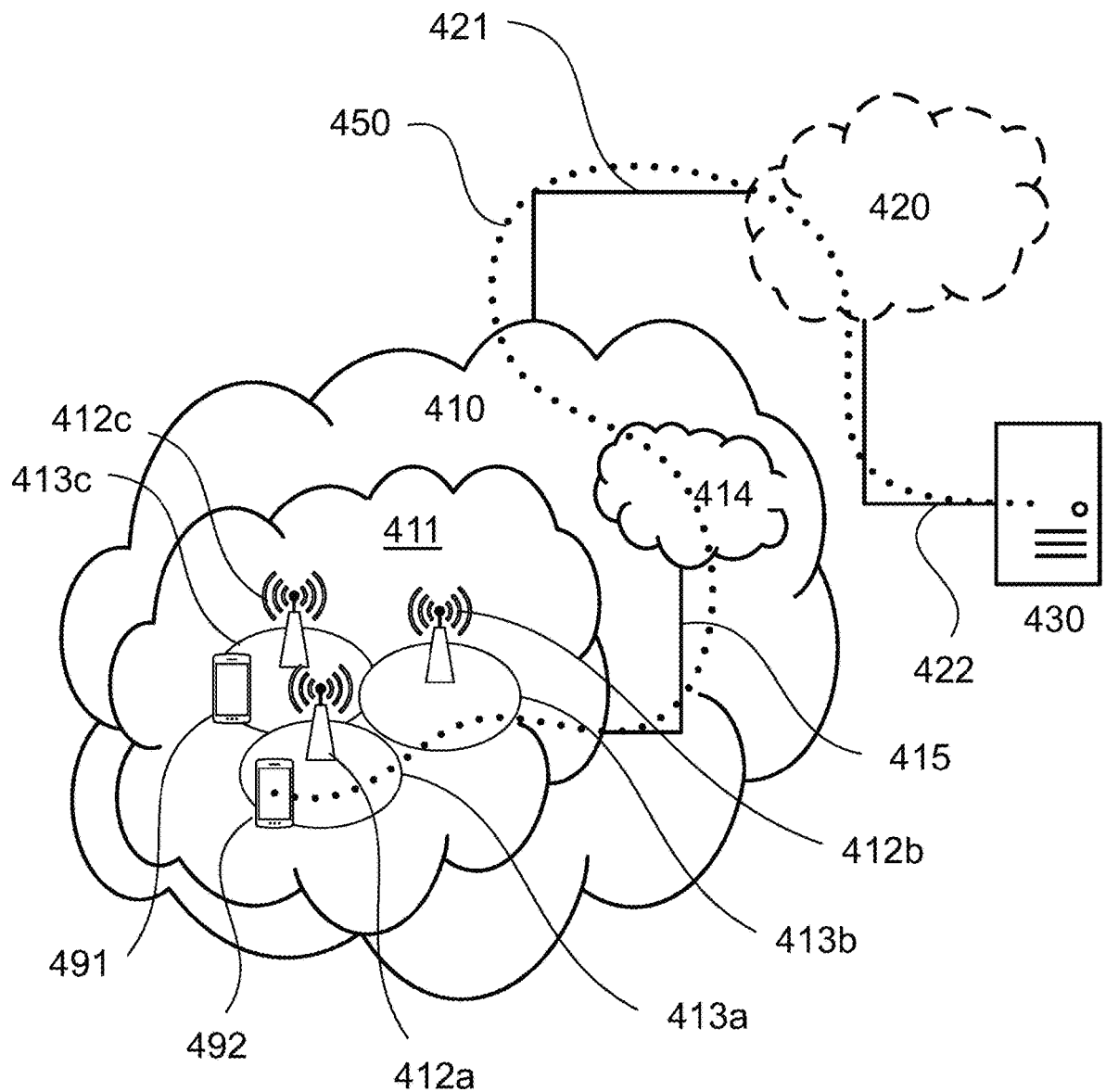
FIG. 14 illustrates a telecommunication network connected via an intermediate network to a host computer, according to certain embodiments.

FIG. 14 illustrates a telecommunication network connected via an intermediate network to a host computer, according to certain embodiments. With reference to FIG. 14, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 15:
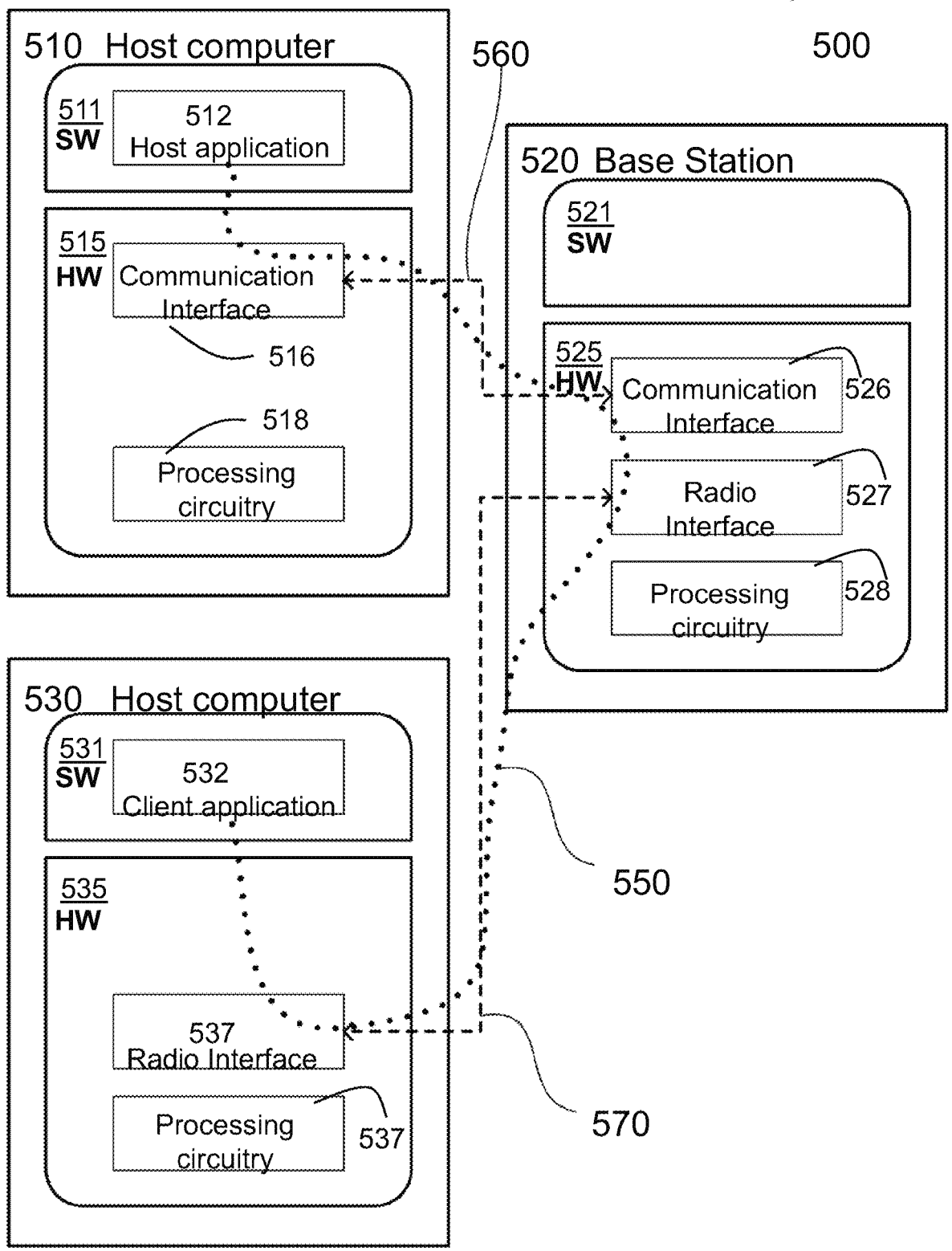
FIG. 15 illustrates a host computer communicating via a base station with a user equipment over a partially wireless connection, according to certain embodiments.

FIG. 15 illustrates a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Figure 5:
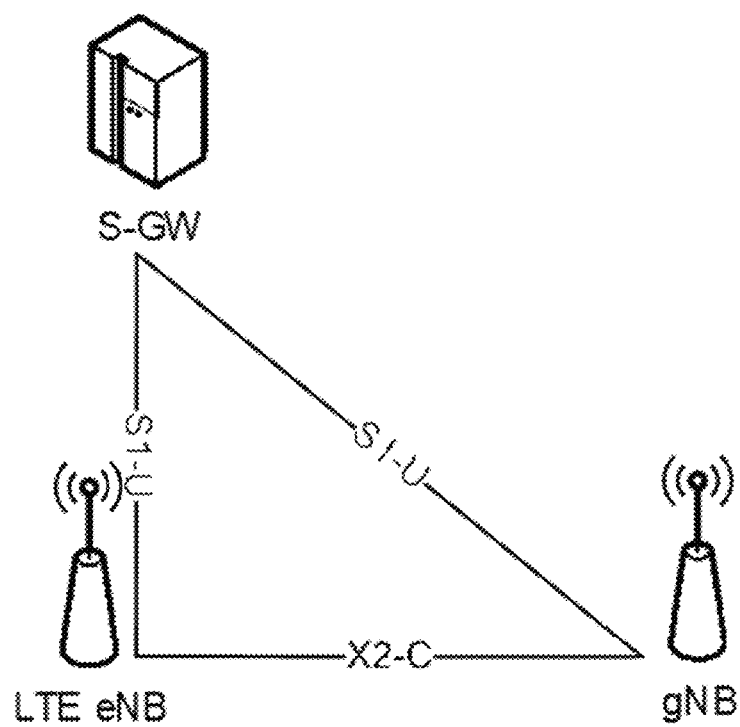
FIG. 5 illustrates U-Plane connectivity for EN-DC.
Figure 6:
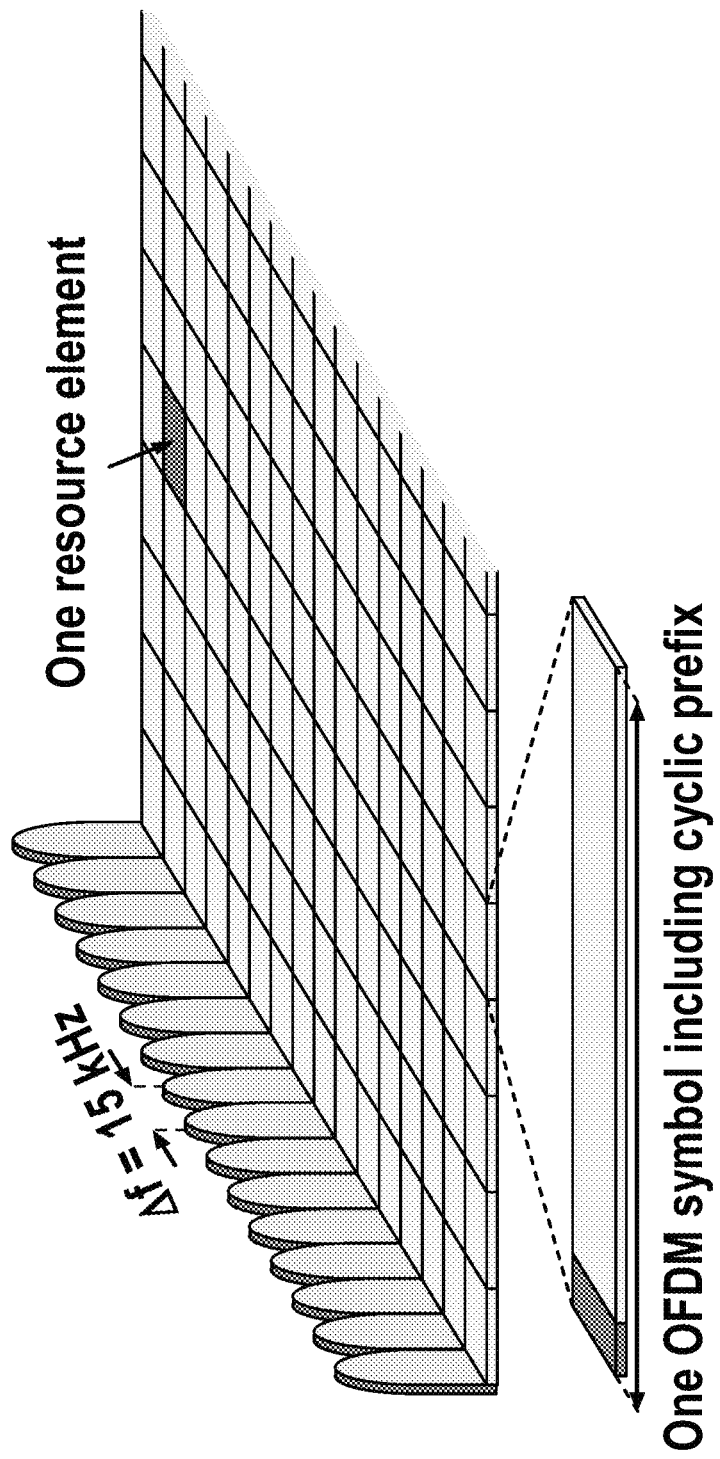
FIG. 6 illustrates the LTE downlink physical resource where subcarrier spacing is 15 kHz.
Figure 7:
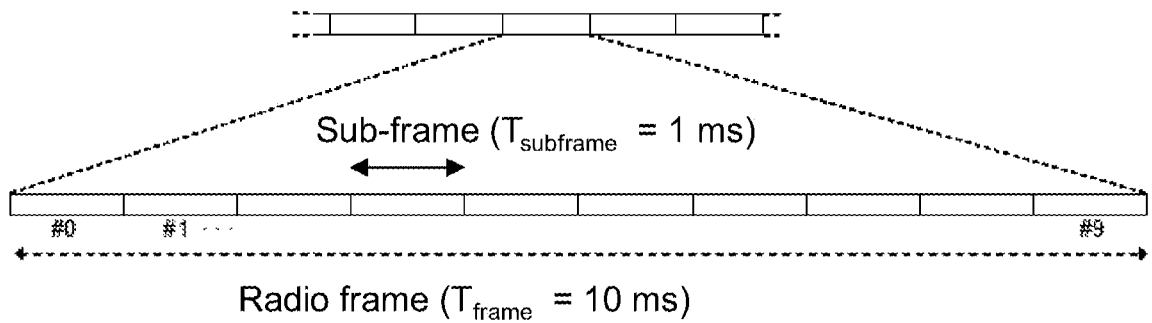
FIG. 7 illustrates the LTE time-domain structure.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 15 may be similar or identical to host computer 430, one of base stations 412a, 412b, 412c and one of UEs 491, 492 of FIG. 14, respectively. This is to say, the inner workings of these entities may be as shown in FIG. 15 and independently, the surrounding network topology may be that of FIG. 14.

In FIG. 15, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the coordination of single transmission capable UEs and thereby solve the problem of coordination of single TX UEs and the problem of harmonic interference coordination.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 16, 17:
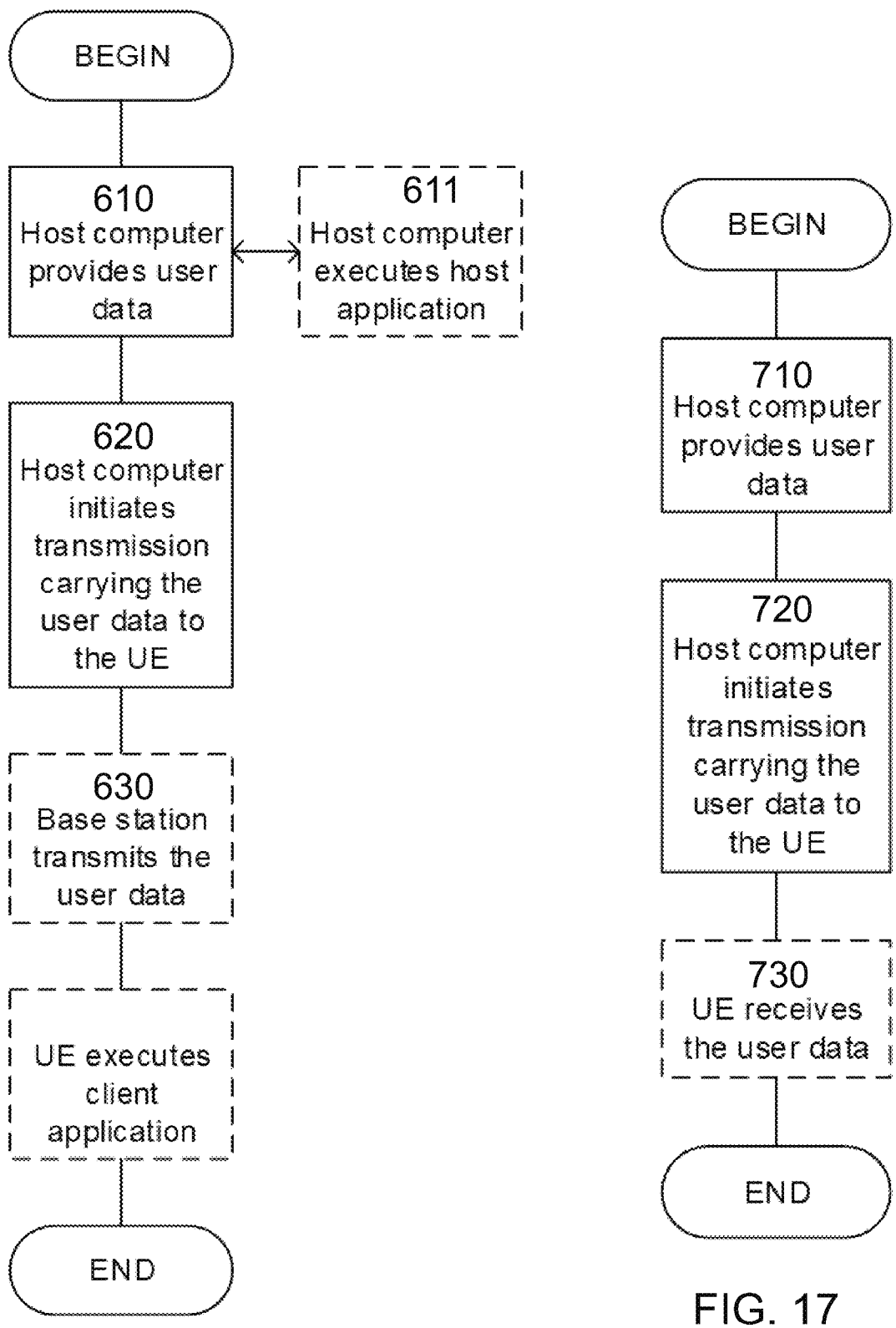
FIG. 16 illustrates a method implemented in a communication system, in accordance with one embodiment.
FIG. 17 illustrates another method implemented in a communication system, in accordance with one embodiment.

FIG. 16 illustrates a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 17 illustrates a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 18, 19:
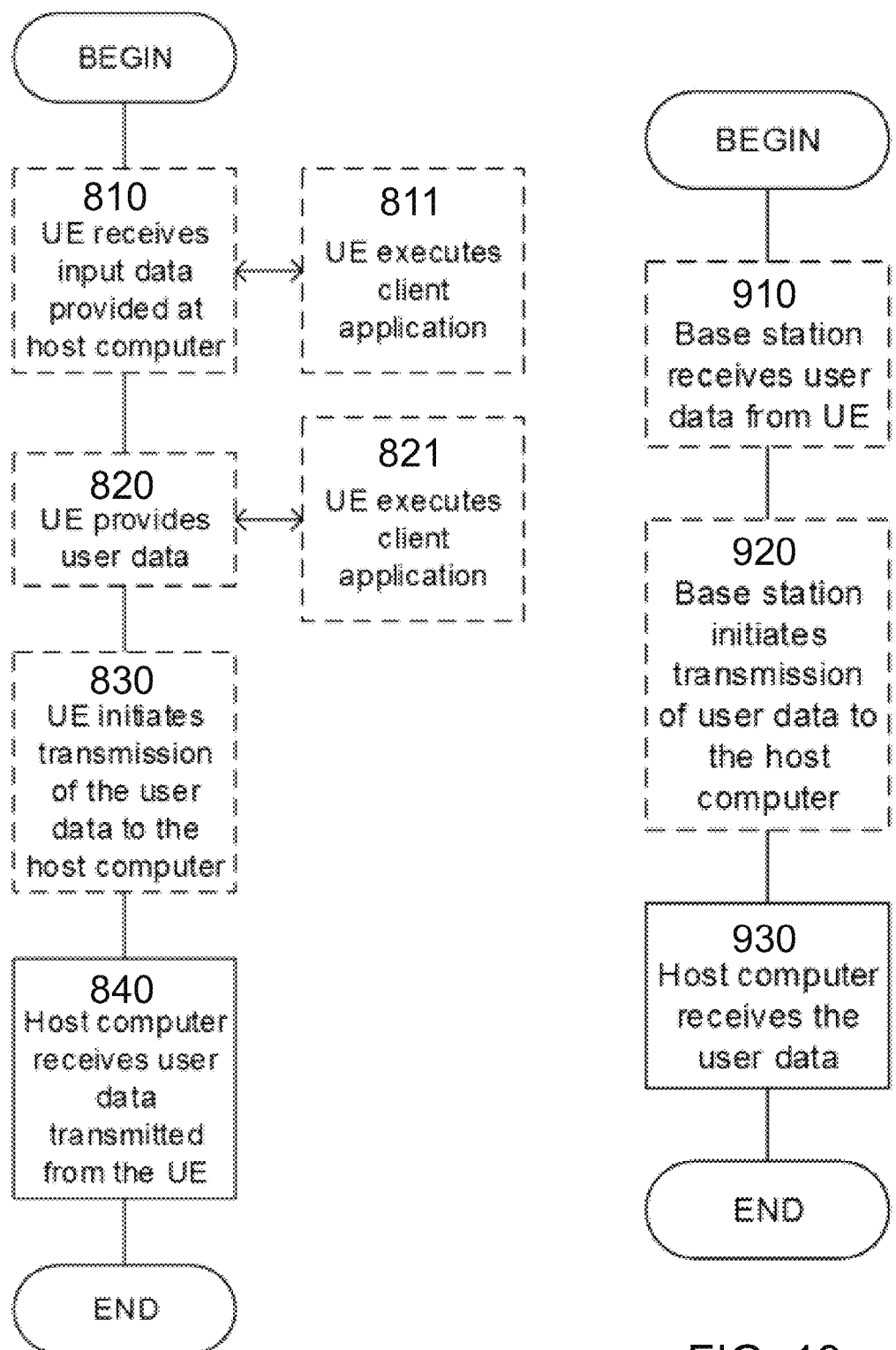
FIG. 18 illustrate another method implemented in a communication system, in accordance with one embodiment.
FIG. 19 illustrate another method implemented in a communication system, in accordance with one embodiment.

FIG. 18 illustrates a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 20:
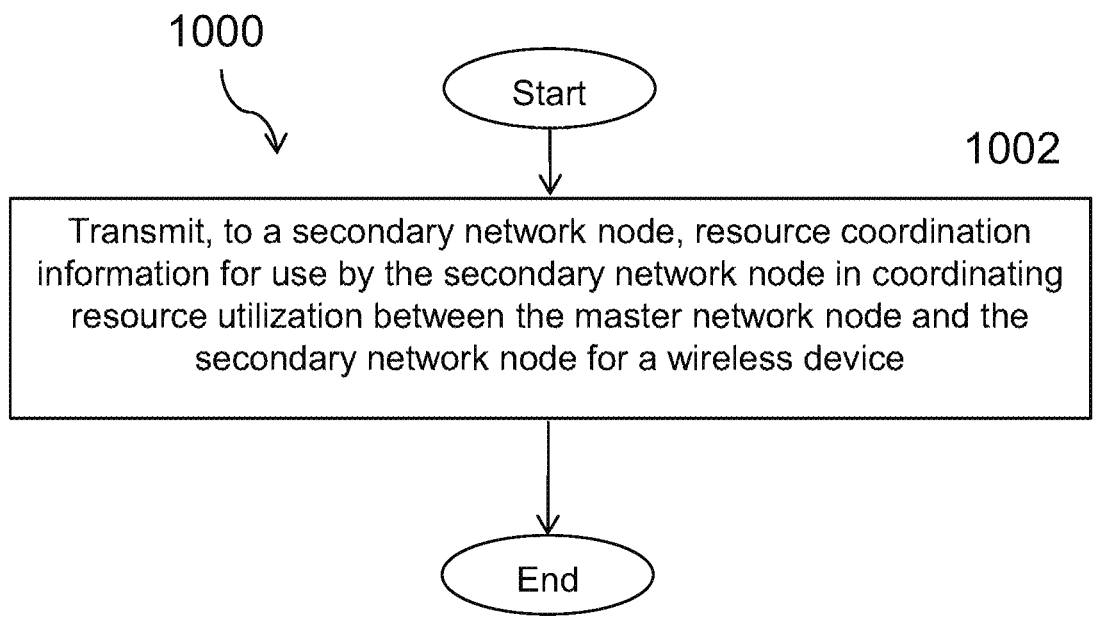
FIG. 20 illustrates an example method by a master network node, according to certain embodiments.

FIG. 20 illustrates an example method 1000 by a master network node for resource coordination with a secondary network node for dual connectivity, according to certain embodiments. At step 1002, the master network node transmits, to the secondary network node, resource coordination information for use by the secondary network node in coordinating resource utilization between the master network node and the secondary network node for a wireless device.

In a particular embodiment, the method may further include the master network node receiving, from the secondary network node, a response message acknowledging the resource coordination information.

In a particular embodiment, the method may further include the master network node receiving, from the secondary network node, resource coordination information for use by the master network node in coordinating resource utilization between the master node and the secondary node for the wireless device. The master network node may use the resource coordination information from the secondary network node to coordinate resource utilization for the wireless device.

In a particular embodiment, the resource coordination information is transmitted to the secondary network node by the master network node in a SGNB additional request, and the resource coordination information is received from the secondary network node in a SGNB addition acknowledge message.

In a particular embodiment, the resource coordination information may be transmitted to the secondary network node by the master network node in a SGNB modification request. The SGNB modification request requests the secondary network node to modify the at least one resource allocated to the wireless device. Likewise, the resource coordination information may be received from the secondary network node in a SGNB modification acknowledge message.

In a particular embodiment, when transmitting the resource coordination information to the secondary network node, the master network node may transmit an indication of an intended resource allocation of the master network node.

In a particular embodiment, when receiving the resource coordination information from the secondary network node, the master network node may receive an indication of an intended resource allocation of the secondary network node.

In a particular embodiment, the resource coordination information may be transmitted to the secondary network node over an X2 interface.

In a particular embodiment, the resource coordination information may include at least one of: a cell identifier associated with a cell in which the wireless device is served; an indication of an uplink resource allocation for at least one subframe; an indication of a downlink resource allocation for at least one subframe; an indication of whether the resource coordination information is for single transmitter user equipment (Tx UE) coordination; and an indication of whether the resource coordination information is for harmonic interference coordination.

In a particular embodiment, the resource coordination information is valid until a subsequent transmission of additional resource coordination information.

In a particular embodiment, the dual connectivity between the master network node and the secondary network node comprises E-UTRAN-NR dual connectivity.

In a particular embodiment, the master network node is a MgNB and the secondary network node is a SgNB. In another embodiment, the master network node is a master gNodeB and the secondary network node is a secondary gNodeB.

Certain embodiments may comprise more or fewer actions, and the actions may be performed in any suitable order.

Figure 21:
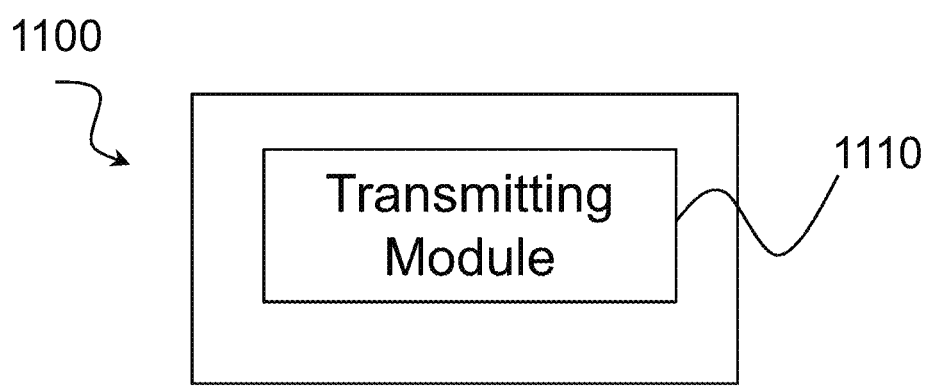
FIG. 21 illustrates an example virtual computing device for, according to certain embodiments.

In certain embodiments, the method for resource coordination with a secondary network node for dual connectivity may be performed by a virtual computing device. FIG. 21 illustrates an example virtual computing device 1100 for resource coordination with a secondary network node for dual connectivity, according to certain embodiments. In certain embodiments, virtual computing device 1100 may include modules for performing steps similar to those described above with regard to the method illustrated and described in FIG. 20. For example, virtual computing device 1100 may include a transmitting module 1110 and any other suitable modules for resource coordination with a secondary network node for dual connectivity. In some embodiments, one or more of the modules may be implemented using processing circuitry 170 of FIG. 10. In certain embodiments, the functions of two or more of the various modules may be combined into a single module.

The transmitting module 1110 may perform certain of the transmitting functions of virtual computing device 1100. For example, in a particular embodiment, transmitting module 1110 may transmit, to the secondary network node, resource coordination information for use by the secondary network node in coordinating resource utilization between the master network node and the secondary network node for a wireless device.

Other embodiments of virtual computing device 1100 may include additional components beyond those shown in FIG. 21 that may be responsible for providing certain aspects of the master network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 22:
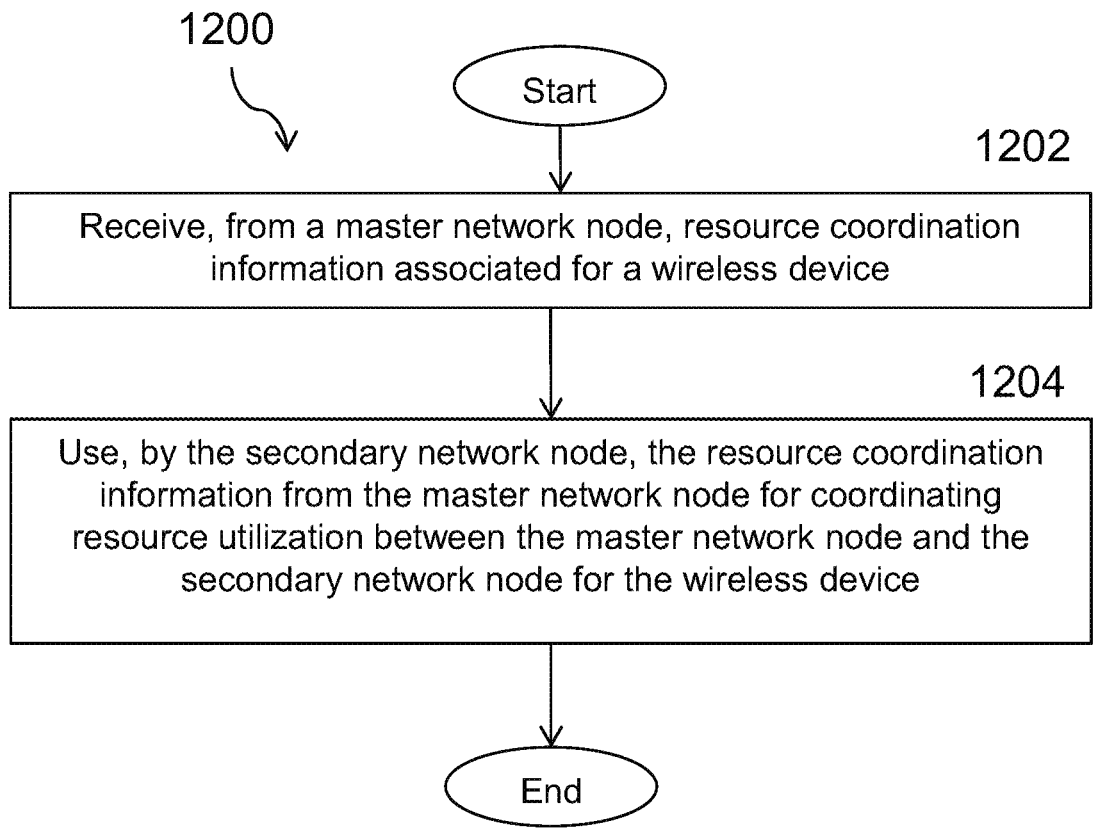
FIG. 22 illustrates an example method by a secondary network node, in accordance with certain embodiments.

FIG. 22 illustrates an example method 1200 by a secondary network node for resource coordination with a master network node for dual connectivity, in accordance with certain embodiments. The method begins at step 1202 when the secondary network node receives, from the master network node, resource coordination information for a wireless device.

At step 1204, the secondary network node uses the resource coordination information from the master network node for coordinating resource utilization between the master network node and the secondary network node for the wireless device.

In a particular embodiment, the method may further include the secondary network node transmitting, to the master network node, a response message acknowledging the resource coordination information received from the master network node.

In a particular embodiment, the method may further include the secondary network node transmitting, to the master network node, resource coordination information for use by the master node in coordinating resource utilization between the master network node and the secondary network node for the wireless device.

In a particular embodiment, the resource coordination information may be received from the master network node in a SGNB additional request, and the resource coordination information may be transmitted to the master network node from the secondary network node in a SGNB addition acknowledge message.

In a particular embodiment, the resource coordination information may be received from the master network node in a SGNB modification request that requests the secondary network node to modify at least one resource allocated to the wireless device. The resource coordination information may then be transmitted to the master network node from the secondary network node in a SGNB modification acknowledge message.

In a particular embodiment, when transmitting the resource coordination information, the secondary network node may transmit, to the master network node, an indication of an intended resource allocation of the secondary network node.

In a particular embodiment, when receiving the resource coordination information from the master network node, the secondary network node may receive an indication of an intended resource allocation of the master network node.

In a particular embodiment, the resource coordination information may be received from the master network node over an X2 interface.

In a particular embodiment, the resource coordination information may include at least one of: a cell identifier associated with a cell in which the wireless device is served; an indication of an uplink resource allocation for at least one subframe; an indication a downlink resource allocation for at least one subframe; an indication of whether the resource coordination information is for single transmitter user equipment (Tx UE) coordination; and an indication of whether the resource coordination information is for harmonic interference coordination.

In a particular embodiment, the resource coordination information is valid until a subsequent transmission of additional resource coordination information.

In a particular embodiment, the dual connectivity between the master network node and the secondary network node comprises E-UTRAN-NR dual connectivity.

In a particular embodiment, the master node is a MgNB and the secondary node is a SgNB. In another embodiment, the master node is a master gNodeB and the secondary node is a secondary gNodeB.

Certain embodiments may comprise more or fewer actions, and the actions may be performed in any suitable order.

Figure 23:
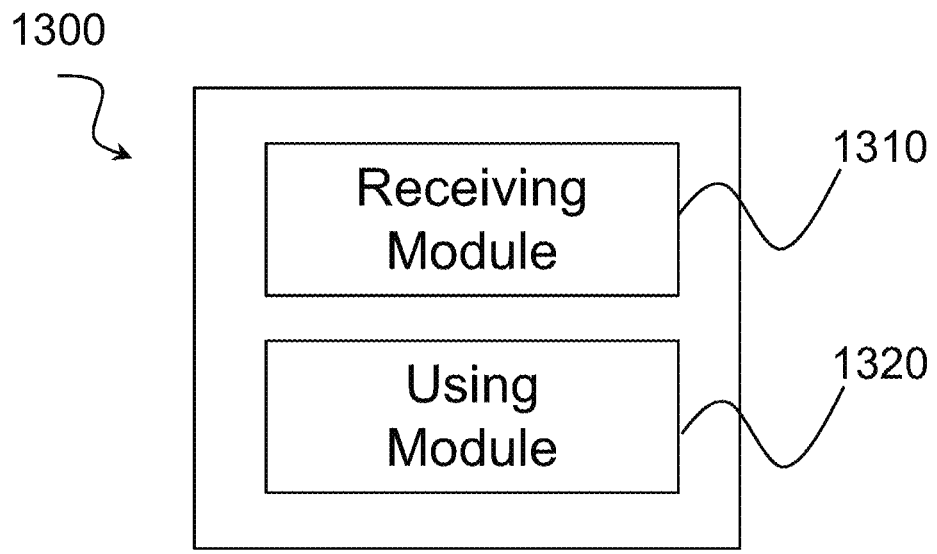
FIG. 23 illustrates another exemplary virtual computing device, in accordance with certain embodiments.

In certain embodiments, the method by a secondary network node for resource coordination with a master network node for dual connectivity may be performed by a virtual computing device. FIG. 23 illustrates an example virtual computing device 1300 for resource coordination with a master network node for dual connectivity, according to certain embodiments. In certain embodiments, virtual computing device 1300 may include modules for performing steps similar to those described above with regard to the method illustrated and described in FIG. 22. For example, virtual computing device 1300 may include a receiving module 1310, a using module 1320, and any other suitable modules for resource coordination with a master network node for dual connectivity. In some embodiments, one or more of the modules may be implemented using processing circuitry 170 of FIG. 10. In certain embodiments, the functions of two or more of the various modules may be combined into a single module.

The receiving module 1310 may perform certain of the receiving functions of virtual computing device 1300. For example, in a particular embodiment, receiving module 1310 may receive, from the master network node, resource coordination information for a wireless device.

The using module 1320 may perform certain of the using functions of virtual computing device 1300. For example, in a particular embodiment, using module 1320 may use the resource coordination information from the master network node for coordinating resource utilization between the master network node and the secondary network node for the wireless device.

Other embodiments of virtual computing device 1300 may include additional components beyond those shown in FIG. 23 that may be responsible for providing certain aspects of the secondary network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
AMF Access and Mobility Management Function
ARQ Automatic Repeat Request
AWGN Additive White Gaussian Noise
BCCH Broadcast Control Channel
BCH Broadcast Channel BWP Bandwidth Part
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DC Dual Connectivity
DCCH Dedicated Control Channel
DFT Discrete Fourier Transform
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
EN-DC E-UTRAN New Radio-Dual Connectivity)
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MeNB Master eNB
MgNB Master gNB
MIB Master Information Block
MME Mobility Management Entity
MN Master Node
MR-DC Multi-RAT Dual Connectivity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RB Resource Block
RLM Radio Link Management
RNC Radio Network Controller
RNL Radio Network Layer
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SeNB Secondary eNB
SFN System Frame Number
SgNB Secondary gNB
SGW Serving Gateway
SI System Information
SIB System Information Block
SN Secondary Node
SNR Signal to Noise Ratio
SON Self Optimized Network
SS Synchronization Signal
SSS Secondary Synchronization Signal
TDD Time Division Duplex
TDOA Time Difference of Arrival
TNL Transport Network Layer
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Additional Information: Per UE resource coordination between LTE and NR 1. Introduction:

RAN3 has received two LSs that trigger work in the same area, these are R3-173587, LS on single Tx switched UL, and R3-173581, LS on backhaul signalling for UE harmonic interference handling.

In one of the attachments in the LS in R3-173587, LS on single Tx switched UL the following is agreed:

Signalling to be defined to support the 'red text' from RAN4 part of the single tx discussion (i.e. as in RP-172064):

UE capability indicates that the UE does not allow 2 simultaneous UL transmission for the RAN4 specified channel allocations in a given band combination. If the network chooses to operate the UE in a way that is not consistent with this capability indication then the UE behavior is not specified and the UE might not meet the performance criteria.

Despite the "red text" above being difficult to find (unless colour blindness affected the entire population, there is no red text in RP172064), the message in the LS is to define signalling that avoids a UE only capable of single-UL transmission ("single-TX UE") in certain "difficult" band combinations to be scheduled (by eNB and gNB respectively) for uplink transmission in the same time resources in NR and LTE carriers. This calls for the definition of signalling indicating time-domain resources on which the network nodes (eNB or gNB) intend to schedule a given UE for uplink transmission.

Observation 1: in order to address the case of single Tx capable UEs, signalling indicating time-domain resources on which the network nodes (eNB or gNB) intend to schedule a given UE for uplink transmission is needed.

In the LS in R3-173581, LS on backhaul signalling for UE harmonic interference handling, the following is requested by RAN1:

Semi-static time pattern indicating intended reception/transmission on an LTE UL carrier and an NR DL carrier on non-overlapping frequencies Semi-static frequency pattern indicating intended reception/transmission on an LTE UL carrier and an NR DL carrier on non-overlapping frequencies These patterns can be at least UE-specific.

Observation 2: to solve the harmonic interference coordination problem, RAN1 is requesting RAN3 to enable signalling indicating time-frequency domain resources on which the network nodes (eNB or gNB) intend to schedule a given UE in UL for LTE and in UL and DL for NR.

It is rather obvious that the problems in R3-173587, LS on single Tx switched UL, and R3-173581, LS on backhaul signalling for UE harmonic interference handling can be solved with a single solution enabling signalling between LTE and NR nodes of per UE time-frequency patterns indicating intended utilisation of LTE UL, NR UL and NR DL resources and indicating the intended type of resource coordination targeted.

Conclusion 1: The problems of single TX UE handling and harmonic interference coordination can be solved by enabling signalling of time-frequency domain resources on which the network nodes (eNB or gNB) intend to schedule a given UE in LTE UL, NR UL and NR DL, together with an indication of the type of resource coordination intended.

2. Analysis of Existing Signalling Mechanisms

Given the prioritisation of work on EN-DC, we can focus our discussion on the case of signalling via the X2 interface between an MeNB and an SgNB. If we look at what was done over X2, we can find that a time-frequency pattern of resources intended to be utilised by an eNB was expressed in the RNTP IE, hence this is a good encoding example to follow.

| IE/Group Name | Presence | Range | IE type and reference | Semantics description | Criticality | Assigned Criticality |
|---|---|---|---|---|---|---|
| RNTP Per PRB | M | | BIT STRING (6 . . . 110, . . .) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". The IE is ignored if the Enhanced RNTP IE is included. | — | — |
| RNTP Threshold | M | | ENUMERATE D (−∞, −11, −10, −9, −8, −7, −6, −5, −4, −3, −2, −1, 0, 1, 2, 3, . . .) | $RNTP_{threshold}$ is defined in TS 36.213 [11]. | — | — |
| Number Of Cell-specific Antenna Ports | M | | ENUMERATE D (1, 2, 4, . . .) | P (number of antenna ports for cell-specific reference signals) defined in TS 36.211 [10] | — | — |
| P_B | M | | INTEGER (0 . . . 3, . . .) | $P_B$ is defined in TS 36.213 [11]. | — | — |
| PDCCH Interference Impact | M | | INTEGER (0 . . . 4, . . .) | Measured by Predicted Number Of Occupied PDCCH OFDM Symbols (see TS 36.211 [10]). | — | — |

| IE/Group Name | Presence | Range | IE type and reference | Semantics description | Criticality | Assigned Criticality |
|---|---|---|---|---|---|---|
| | | | | Value 0 means "no prediction is available". | | |
| Enhanced RNTP | O | | | | YES | ignore |
| >Enhanced RNTP Bitmap | M | | BIT STRING (12 . . . 8800, . . .) | Each position in the bitmap represents a PRB in a subframe; value "00" indicates "Tx not exceeding RNTP Threshold", value "01" indicates "Tx not exceeding RNTP High Power Threshold", value "11" indicates that "no promise on the Tx power is given". Value "10" is ignored by the receiver". Each position is applicable only in positions corresponding to DL subframes. The first 2 bits correspond to PRB 0 of the first subframe for which the IE is valid, the following 2 bits correspond to PRB 1 of the first subframe for which the IE is valid, and so on. The bit string may span across multiple contiguous subframes (maximum 40). The length of the bit string is an integer multiple of $2 \times N_{RB}^{DL}$. $N_{RB}^{DL}$ is defined in TS 36.211 [10]. The Enhanced RNTP pattern is continuously repeated. | | |
| >RNTP High Power Threshold | M | | ENUMERATED ($-\infty$, $-11$, $-10$, $-9$, $-8$, $-7$, $-6$, $-5$, $-4$, $-3$, $-2$, $-1$, 0, 1, 2, 3, . . .) | Defined as the $RNTP_{threshold}$ in TS 36.213 [11]. | | |
| >Enhanced RNTP Start Time | | 0 . . . 1 | | | | |
| >>Start SFN | M | | INTEGER (0 . . . 1023, . . .) | SFN of the radio frame containing the first subframe when the Enhanced RNTP IE is valid. | | |
| >>Start Subframe Number | M | | INTEGER (0 . . . 9, . . .) | Subframe number, within the radio frame indicated by the Start SFN IE, of the first subframe when the Enhanced RNTP IE is valid. | | |

In order to find a solution for single Tx capable UEs and harmonic interference coordination the RNTP IE can be taken as model and transformed into information signalled on a per UE basis to express intended utilisation of UL/DL time frequency resources.

With reference to the running CR in R3-174252, Baseline CR to TS 36.423 covering agreements of RAN3 #97bis, it is foreseen that the information exchange to achieve coordination of the cases above needs to be added to the following procedures:

SgNB Addition Preparation: this allows the MeNB to signal, in a UE associated way, to SgNB its intended resource utilisation and receive in response the intended resource utilisation of the SgNB MeNB initiated SgNB Modification Preparation: this allows the MeNB to signal, in a UE associated way, to SgNB eventual modifications of the intended resource utilisation and receive in response the eventually modified intended resource utilisation of the SgNB SgNB initiated SgNB Modification: this allows the SgNB to signal, in a UE associated way, to MeNB eventual modifications of the intended resource utilisation and receive in response the eventually modified intended resource utilisation of the MeNB The information that can be signalled should contain:

A cell identifier for the cell for which the intended resource allocation is signalled An indication from the MeNB to the SgNB of the intended UL resource allocation for a UE. This indication may cover multiple subframes. This utilisation can be considered valid until new information is signalled An indication from the SgNB to the MeNB of the intended UL and DL resource allocation for a UE. This indication may cover multiple subframes. This utilisation can be considered valid until new information is signalled An indication of whether the information is used for single Tx UE coordination, for harmonic interference coordination or for both. This is needed because When the indication applies to single Tx UE coordination all the time-frequency resources in the transmission time interval utilised for UL should be assumed not usable by the receiving node;

On the contrary, when the indication is for harmonic interference coordination, but the UE is not a single Tx UE, there is no strict restriction on the receiving node to use resources not utilised by the sending node;

When the indication is for both single Tx UEs and harmonic interference coordination the receiving node should assume that the transmission time intervals used for UL by the sending node cannot be used, and it should consider the indication on DL resources intended to be utilised when performing DL RRM for the UE A proposed way to realise the signalling needed is reported below with an example for the SgNB addition preparation procedure.

It needs to be noted that the approach taken in the proposed signalling is one where formatting of the information on intended resource allocation is done with respect to LTE. Namely, the SgNB constructs a pattern of utilised PRBs spanning across subframes, where PRBs and subframes follow the LTE structure. This is done for two reasons:

Minimise the impact on LTE: The MeNB will not need to understand the time frequency resource structure of the SgNB. The SgNB will format its intended resource utilisation in a way that fits the time frequency resource distribution in LTE.

Reduce complexity: the time frequency resource granularity of NR can be much finer than in LTE. However, to achieve coordination of resource allocation between LTE and NR it is sufficient to express intended resource allocation in accordance to the coarser structure, i.e. the LTE one.

3. Example of Tabular Solution Description 9.1.X.1 SGNB Addition Request

This message is sent by the MeNB to the SgNB to request the preparation of resources for EN-DC operation for a specific UE Direction: MeNB→SgNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |

[ . . . ]

| | | | | | | |
|---|---|---|---|---|---|---|
| MeNB Resource Coordination Information | 0 . . . 1 | | | Information used to coordinate resources utilisation between MeNB and SgNB | EACH | reject |
| >Cell ID | M | | ECGI 9.2.14 | | — | — |
| >UL Coordination Information | M | | BIT STRING (6 . . . 4400, . . .) | Each position in the bitmap represents a PRB in a |  |  |

-continued

|   |   |   |   |   |
|---|---|---|---|---|
|   |   |   |   | subframe; value "0" indicates "resource not intended to be used for transmission", value "1" indicates "resource intended to be used for transmission". Each position is applicable only in positions corresponding to UL subframes. The bit string may span across multiple contiguous subframes (maximum 40). The first position of the UL Coordination Information corresponds to subframe 0 in a radio frame where SFN = 0. The length of the bit string is an integer multiple of $N_{RB}^{DL}$. $N_{RB}^{DL}$ is defined in TS 36.211 [10]. The UL Coordination Information is continuously repeated. |
| >Resource Coordination Type | M |   | BITSTRING (SIZE(32)) | Each position in the bitmap indicates a type of intended coordination. First Bit = Single Tx Coordination, Second Bit = Harmonic Interference Coordination, Third Bit = Single Tx and Harmonic Interference Coordination. Other bits shall be ignored |

[ . . . ]

9.1.X.2 SGNB Addition Request Acknowledge

This message is sent by the SgNB to confirm the MeNB about the SgNB addition preparation.

Direction: SgNB→MeNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SgNB UE X2AP ID | M | | gNB UE X2AP ID 9.2.XX | Allocated at the SgNB | YES | reject |

[ . . . ]

| | | | | | | |
|---|---|---|---|---|---|---|
| SgNB Resource Coordination Information | | 0 . . . 1 | | Information used to coordinate resources utilisation between SgNB and MeNB | EACH | ignore |
| >Cell ID | M | | ECGI 9.2.14 | | — | — |
| >UL Coordination Information | M | | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to UL subframes. The bit string may span across multiple contiguous subframes (maximum 40). The first position of the UL Coordination Information corresponds to the receiving node's subframe 0 in a receiving node's radio frame where SFN = 0. The length of the bit string is an integer | | |

| | | | |
|---|---|---|---|
| | | | multiple of $N_{RB}^{DL}$. $N_{RB}^{DL}$ is defined in TS 36.211 [10]. The UL Coordination Information is continuously repeated. |
| >DL Coordination Information | O | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to DL subframes. The bit string may span across multiple contiguous subframes (maximum 40). The first position of the DL Coordination Information corresponds to the receiving node's subframe 0 in a receiving node's radio frame where SFN = 0. The length of the bit string is an integer multiple of $N_{RB}^{DL}$. $N_{RB}^{DL}$ is defined in TS 36.211 [10]. The DL Coordination Information is continuously repeated. |
| >Resource Coordination Type | M | BITSTRING (SIZE(32)) | Each position in the bitmap indicates a type of intended coordination. First Bit = Single Tx Coordination, Second Bit = Harmonic Interference Coordination, |

-continued

| |
|---|
| Third Bit = Single Tx and Harmonic Interference Coordination. Other bits shall be ignored |

4. Other Signalling Aspects

The above analysis focusses on signalling over the X2, or in general signalling over a peer to peer interface between RAN nodes. However, if one considers that the information on intended allocated resources resides mainly in the MAC layer, it is clear that some signalling support is needed over the F1 interface, where the gNB-DU shall inform the gNB-CU of the intended allocation of resources for a UE as well as being informed of intended allocation of resources in neighbour RAN nodes.

The same information described for signalling over the X2 can be reused over F1. Such information should be included in the following procedures:

UE Context Setup: this allows the gNB-CU to signal, in a UE associated way, to gNB-DU the intended resource utilisation in other RAN nodes and receive in response the intended resource utilisation of the gNB-DU UE Context Modification (gNB-CU initiated): this allows the gNB-CU to signal, in a UE associated way, to gNB-DU eventual modifications of the intended resource utilisation in other RAN nodes and receive in response the eventually modified intended resource utilisation of the gNB-DU UE Context Modification Required (gNB-DU initiated): this allows the gNB-DU to signal, in a UE associated way, to gNB-CU eventual modifications of the intended resource utilisation Conclusion 2: Signalling of resource coordination information needs to be exchanged over the F1 interface 5. Conclusions In this paper it was discussed that a single solution can be achieved to solve both the problem of single Tx capable UEs management and harmonic interference coordination.

The case of X2 signalling to enable EN-DC is taken as the reference case. It was noted that the RNTP IE provides a good model to derive the information that needs to be signalled between MeNB and SgNB.

The following was concluded:

Conclusion 1: The problems of single TX UE handling and harmonic interference coordination can be solved by enabling signalling of time-domain resources on which the network nodes (eNB or gNB) intend to schedule a given UE in LTE UL, NR UL and NR DL, together with an indication of the type of resource coordination intended.

It is proposed to agree to the pCR in R3-174794, which reflects the descriptions in this paper.

It was additionally noted that signalling would be need over the F1-C interface to convey the information needed between the gNB-CU and the gNB-DU, as per following conclusion:

Conclusion 2: Signalling of resource coordination information needs to be exchanged over the F1 interface Additional information: pCR for LTE-NR Resource Allocation Coordination over X2

1. Introduction

In R3-174793 it was explained that signalling of intended resource allocation information is needed over the X2 in order to enable coordination between LTE and NR in EN-DC.

In this paper a pCR is presented on the bases of the current BL CR in R3-174252.

2. pCR Based on R3-174252

Figure 24:
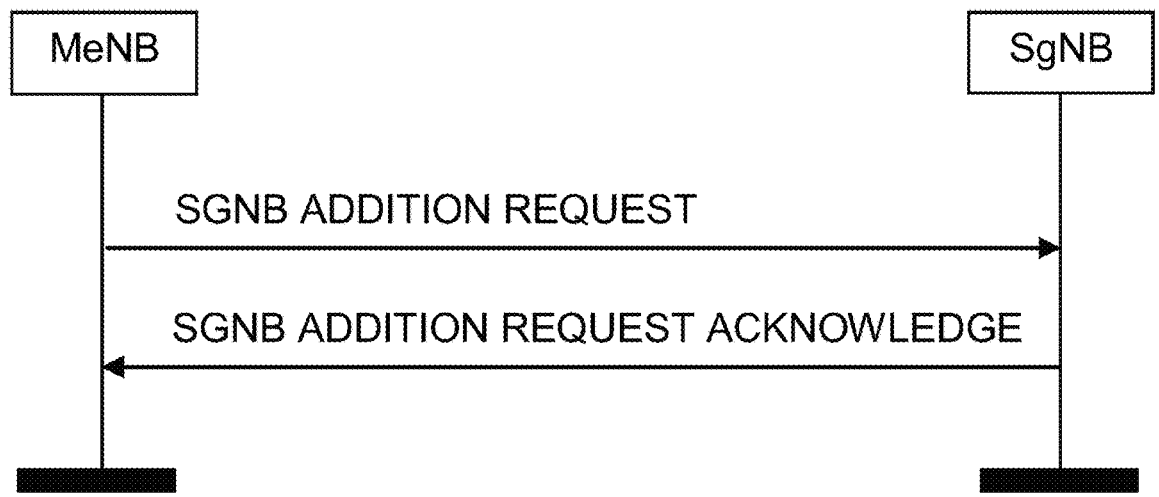
FIG. 24 illustrates SgNB Addition Preparation when successful.
Figure 25:
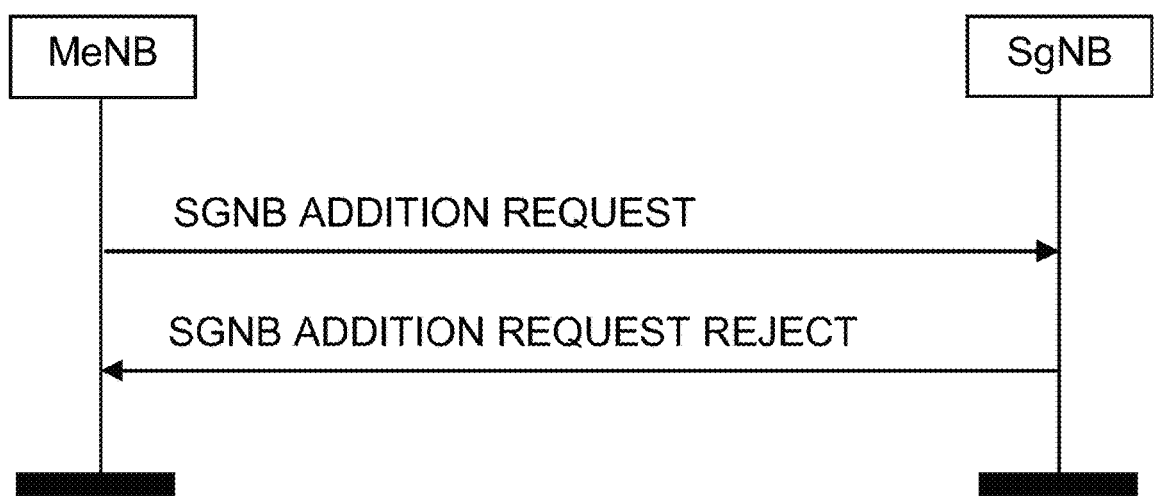
FIG. 25 illustrates SgNB Addition Preparation when unsuccessful.
Figure 26:
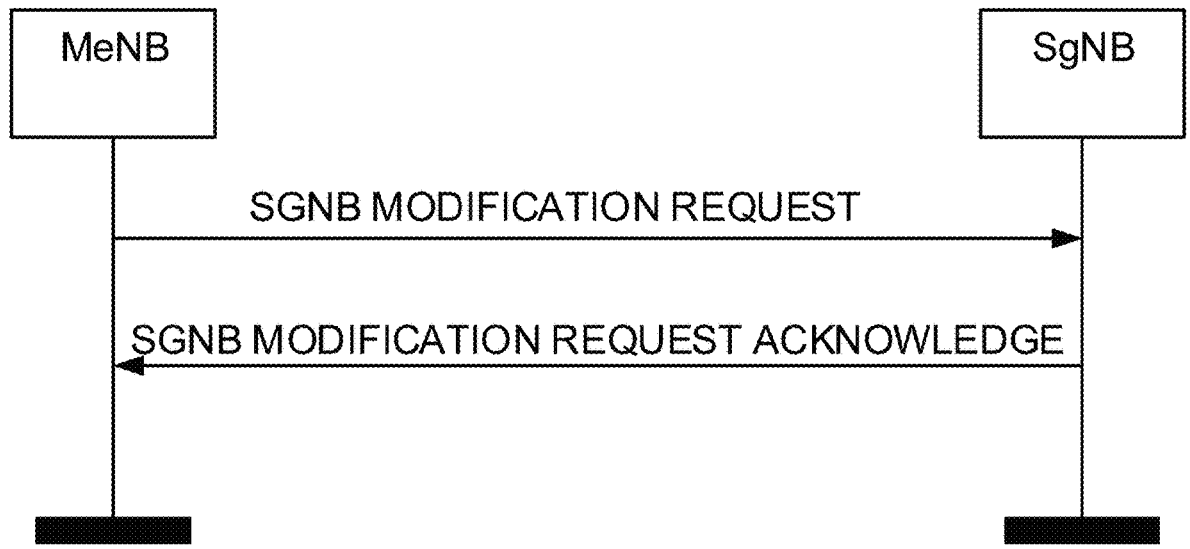
FIG. 26 illustrates MeNB initiated SgNB Modification Preparation when successful.

-------------------------------------First Change-------------------------------
8.X.3  SgNB Addition Preparation
8.X.3.1  General
The purpose of the SgNB Addition Preparation procedure is to request the SgNB to allocate resources for EN-DC connectivity operation for a specific UE.
The procedure uses UE-associated signalling.
8.X.3.2  Successful Operation
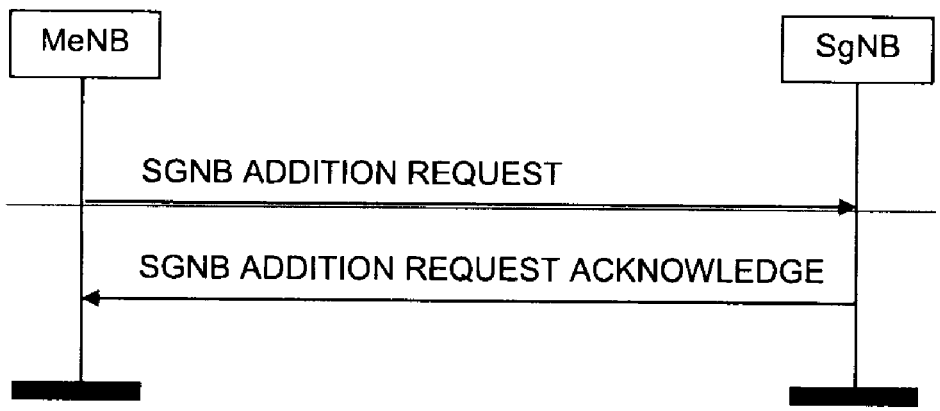
Figure 24 illustrates 8.X.3.2-1: SgNB Addition Preparation, when successful. operation The MeNB initiates the procedure by sending the SGNB ADDITION REQUEST message to the SgNB. When the MeNB sends the SGNB ADDITION REQUEST message, it shall start the timer $T_{DCprep}$.

The allocation of resources according to the values of the Allocation and Retention Priority IE included in the E-RAB Level QoS Parameters IE and in the Maximum admittable E-RAB Level QoS IE shall follow the principles described for the E-RAB Setup procedure in TS 36.413 [4].

If the SGNB ADDITION REQUEST message contains the Serving PLMN IE, the SgNB may use it for RRM purposes.

If the SGNB ADDITION REQUEST message contains the Expected UE Behaviour IE, the SgNB shall, if supported, store this information and may use it to optimize resource allocation.

If the SGNB ADDITION REQUEST message contains the Handover Restriction List IE, the SgNB node, if supported, shall store this information and use it to select an appropriate SCG bearer.

If the SGNB ADDITION REQUEST message contains the MeNB Resource Coordination Information IE, the SgNB may use it for the purpose of resource coordination with the MeNB. If the Resource Coordination Type IE indicates that the intended coordination is for UEs capable of single transmission, the UE may not be able to transmit on any resource of the subframes intended to be utilised for UL transmission, The SgNB shall consider the received MeNB Resource Coordination Information IE value valid until reception of a new update of the IE for the same UE.

The SgNB shall report to the MeNB, in the SGNB ADDITION REQUEST ACKNOWLEDGE message, the result for all the requested E-RABs in the following way:
  a list of E-RABs which are successfully established shall be included in the E-RABs Admitted To Be Added List IE;
  a list of E-RABs which failed to be established shall be included in the E-RABs Not Admitted List IE.
  NOTE: The MeNB may trigger the SgNB Addition Preparation procedure in the course of the Inter-MeNB handover without SgNB change procedure as described in TS 36.300 [15]. The deleted E-RABs are not included in the E-RABs To Be Added List IE in the SGNB ADDITION REQUEST message, from MeNB point of view. If the SgNB reports a certain E-RAB to be successfully established, respective SCG resources, from an SgNB point of view, may be actually successfully established or modified or kept; if a certain E-RAB is reported to be failed to be established, respective SCG resources, from an SgNB point of view, may be actually failed to be established or modified or kept.

For each E-RAB configured with the SCG bearer and SCG split bearer option:
  the SgNB shall choose the ciphering algorithm based on the information in the UE Security Capabilities IE and locally configured priority list of AS encryption algorithms and apply the key indicated in the SgNB Security Key IE as specified in the TS 33.401 [18]
  the MeNB may propose to apply forwarding of downlink data by including the DL Forwarding IE within the E-RABs To be Added Item IE of the SGNB ADDITION REQUEST message. For each E-RAB that it has decided to admit, the SgNB may include the DL Forwarding GTP Tunnel Endpoint IE within the E-RABs Admitted To Be Added Item IE of the SGNB ADDITION REQUEST ACKNOWLEDGE message to indicate that it accepts the proposed forwarding of downlink data for this bearer. This GTP tunnel endpoint may be different from the corresponding DL GTP TEID IE in the E-RAB To Be Modified List IE of the E-RAB MODIFICATION INDICATION message (see TS 36.413 [4]) depending on implementation choice;
  the SgNB may include for each bearer in the E-RABs Admitted To Be Added List IE the UL Forwarding GTP Tunnel Endpoint IE to indicate that it requests data forwarding of uplink packets to be performed for that bearer.

If the SGNB ADDITION REQUEST message contains for an E-RAB to be added which is configured with SCG split bearer option the MeNB GTP Tunnel Endpoint IE the SgNB shall use it as the DL X2-U address.

For an E-RAB to be added which is configured with SCG split bearer option the SgNB may include in the SGNB ADDITION REQUEST ACKNOWLEDGE message the S1 DL GTP Tunnel Endpoint IE.

Upon reception of the SGNB ADDITION REQUEST ACKNOWLEDGE message the MeNB shall stop the timer $T_{DCprep}$.

If the SGNB ADDITION ACKNOWLEDGE message contains the SgNB Resource Coordination Information, the MeNB may use it for the purpose of resource coordination with the SgNB. If the Resource Coordination Type IE indicates that the intended coordination is for UEs capable of single transmission, the UE may not be able to transmit on any resource of the subframes intended to be utilised for UL transmission. The MeNB shall consider the received UL Coordination Information IE value valid until reception of a new update of the IE for the same UE. The MeNB shall consider the received DL Coordination Information IE value valid until reception of a new update of the IE for the same UE.

If the GW Transport Layer Address IE is received in the SGNB ADDITION REQUEST ACKNOWLEDGE message, the MeNB stores this information and use it according to TS 36.300 [15].

If the SgNB UE X2AP ID IE and/or SgNB UE X2AP ID Extension IE are contained in the SGNB ADDITION REQUEST message, the SgNB shall, if supported, store this information and use it as defined in TS 36.300 [15].

If the Tunnel Information for BBF IE is received in the SGNB ADDITION REQUEST ACKNOWLEDGE message, the MeNB shall, if supported, transfer the tunnel information for BBF to the core network.

Interactions with the SgNB Reconfiguration Completion procedure:

If the SgNB admits at least one E-RAB, the SgNB shall start the timer $T_{DCoverall}$ when sending the SGNB ADDITION REQUEST ACKNOWLEDGE message to the MeNB. The reception of the SGNB RECONFIGURATION COMPLETE message shall stop the timer $T_{DCoverall}$.

Figure 8:
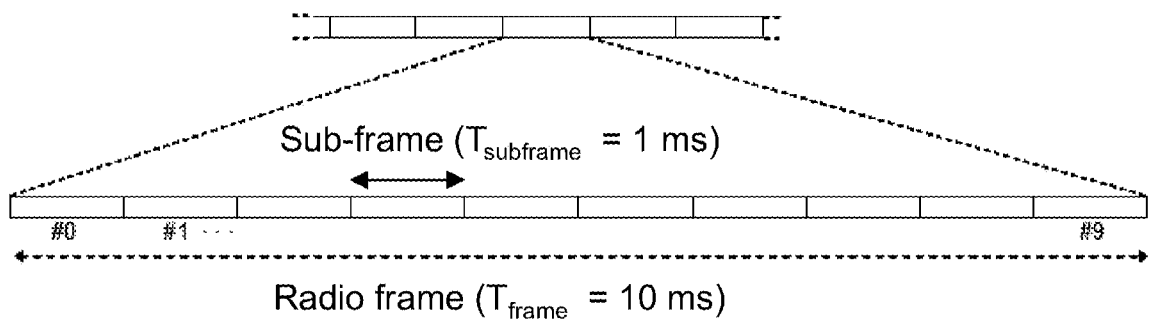
FIG. 8 illustrates the NR time-domain structure.

8.X.3.3    Unsuccessful Operation
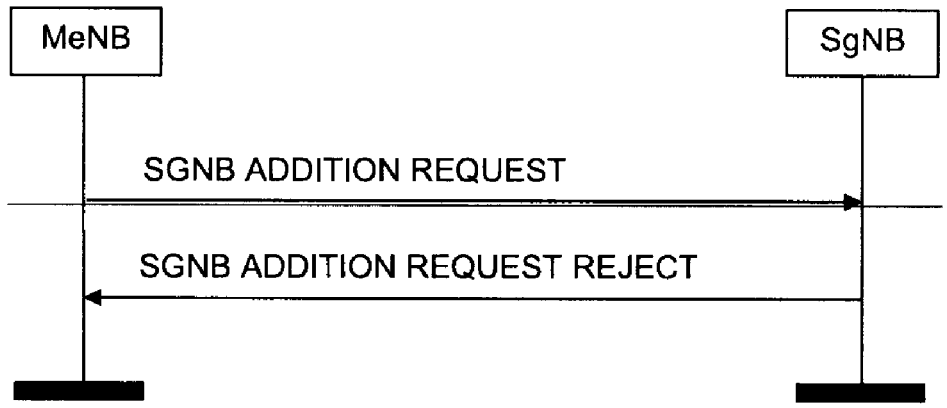
Figure 8.X.3.3-1.25 illustrates SgNB Addition Preparation, when unsuccessful. operation If the SgNB is not able to accept any of the bearers or a failure occurs during the SgNB Addition Preparation, the SgNB sends the SGNB ADDITION REQUEST REJECT message with an appropriate cause value to the MeNB.

8.X.3.4 Abnormal Conditions

If the SgNB receives a SGNB ADDITION REQUEST message containing multiple E-RAB ID IEs (in the E-RABs To Be Added List IE) set to the same value, the SgNB shall consider the establishment of the corresponding E-RAB as failed.

If the SgNB receives a SGNB ADDITION REQUEST message containing a E-RAB Level QoS Parameters IE which contains a QCI IE indicating a GBR bearer (as defined in TS 23.203 [13]), and which does not contain the GBR QoS Information IE, the SgNB shall consider the establishment of the corresponding E-RAB as failed.

If the supported algorithms for encryption defined in the Encryption Algorithms IE in the UE Security Capabilities IE, plus the mandated support of EEA0 in all UEs (TS 33.401 [18]), do not match any algorithms defined in the configured list of allowed encryption algorithms in the SgNB (TS 33.401) [18], the SgNB shall reject the procedure using the SENB ADDITION REQUEST REJECT message.

If the SgNB receives a SGNB ADDITION REQUEST message containing a SgNB UE X2AP ID IE that does not match any existing UE Context that has such ID, the SgNB shall reject the procedure using the SGNB ADDITION REQUEST REJECT message.

Interactions with the SgNB Reconfiguration Completion and SgNB initiated SgNB Release procedure:

If the timer $T_{DCoverall}$ expires before the SgNB has received the SGNB RECONFIGURATION COMPLETE or the SGNB RELEASE REQUEST message, the SgNB shall regard the requested RRC connection reconfiguration as being not applied by the UE and shall trigger the SgNB initiated SgNB Release procedure.

Interactions with the MeNB initiated SgNB Release procedure:

If the timer $T_{DCprep}$ expires before the MeNB has received the SGNB ADDITION REQUEST ACKNOWLEDGE message, the MeNB shall regard the SgNB Addition Preparation procedure as being failed and shall trigger the MeNB initiated SgNB Release procedure.

---------------------------Here the Second Change----------------------------

8.X.5 MeNB Initiated SgNB Modification Preparation

8.X.5.1 General

This procedure is used to enable an MeNB to request an SgNB to modify the UE context at the SgNB or to query the current SCG configuration for supporting delta signalling in MeNB initiated SgNB change.

The procedure uses UE-associated signalling.

8.X.5.2 Successful Operation
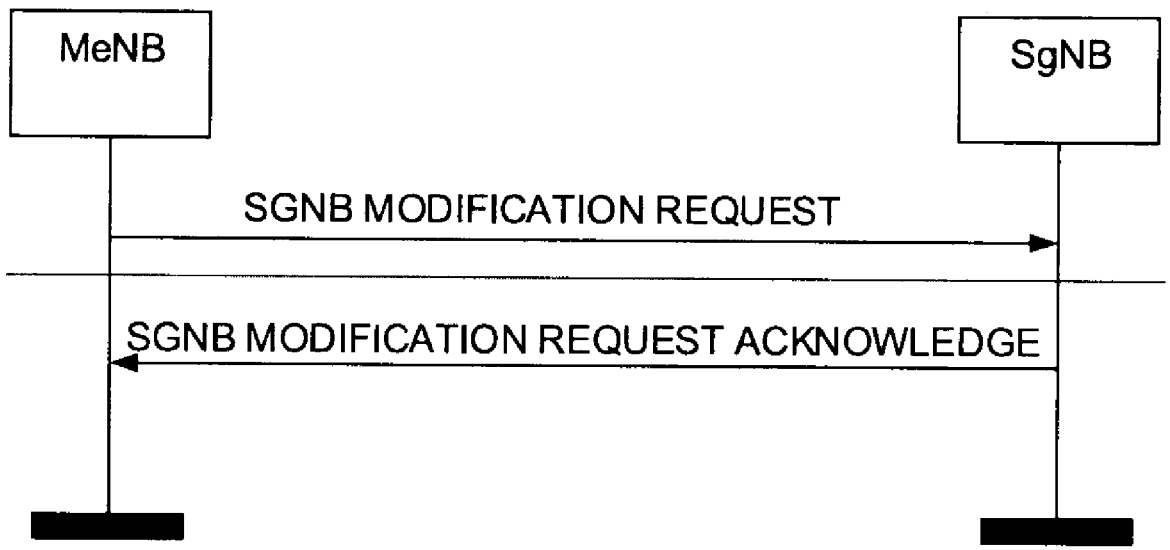
Figure 8.X.5.2-1 26 illustrates MeNB initiated SgNB Modification Preparation, when successful. operation The MeNB initiates the procedure by sending the SGNB MODIFICATION REQUEST message to the SgNB. When the MeNB sends the SGNB MODIFICATION REQUEST message, it shall start the timer $T_{DCprep}$.

The SGNB MODIFICATION REQUEST message may contain:
within the UE Context Information IE;
E-RABs to be added within the E-RABs To Be Added Item IE;
E-RABs to be modified within the E-RABs To Be Modified Item IE;
E-RABs to be released within the E-RABs To Be Released Item IE;
the SgNB UE Aggregate Maximum Bit Rate IE;
the MeNB to SgNB Container IE;
the SCG Change Indication IE;
the SCG Configuration Query IE;
the MeNB Resource Coordination Information IE If the SGNB MODIFICATION REQUEST message contains the Serving PLMN IE, the SgNB may use it for RRM purposes.

If the SGNB MODIFICATION REQUEST message contains the Handover Restriction List IE, the SGNB shall
replace the previously provided Handover Restriction List by the received Handover Restriction List in the UE context;
use this information to select an appropriate SCG bearer.

If the SgNB UE Aggregate Maximum Bit Rate IE is included in the SGNB MODIFICATION REQUEST message, the SgNB shall:
replace the previously provided SgNB UE Aggregate Maximum Bit Rate by the received SgNB UE Aggregate Maximum Bit Rate in the UE context;
use the received SgNB UE Aggregate Maximum Bit Rate for non-GBR Bearers for the concerned UE as defined in TS 36.300 [15].

The allocation of resources according to the values of the Allocation and Retention Priority IE included in the E-RAB Level QoS Parameters IE and in the Maximum admittable E-RAB Level QoS IE shall follow the principles described for the E-RAB Setup procedure in TS 36.413 [4].

If the SGNB MODIFICATION REQUEST message contains the MeNB Resource Coordination Information IE, the SgNB may use it for the purpose of resource coordination with the MeNB. If the Resource Coordination Type IE indicates that the intended coordination is for UEs capable of single transmission, the UE may not be able to transmit on any resource of the subframes intended to be utilised for UL transmission. The SgNB shall consider the received UL Coordination Information IE value valid until reception of a new update of the IE for the same UE.

If at least one of the requested modifications is admitted by the SgNB, the SgNB shall modify the related part of the UE context accordingly and send the SGNB MODIFICATION REQUEST ACKNOWLEDGE message back to the MeNB.

The SgNB shall include the E-RABs for which resources have been either added or modified or released at the SgNB either in the E-RABs Admitted To Be Added List IE or the E-RABs Admitted To Be Modified List IE or the E-RABs Admitted To Be Released List IE. The SgNB shall include the E-RABs that have not been admitted in the E-RABs Not Admitted List IE with an appropriate cause value.

For each E-RAB configured with the SCG bearer and SCG split bearer option:
the SgNB shall, if included, choose the ciphering algorithm based on the information in the UE Security Capabilities IE and locally configured priority list of AS encryption algorithms and apply the key indicated in the SgNB Security Key IE as specified in the TS 33.401 [18].

if applicable, the MeNB may propose to apply forwarding of downlink data by including the DL Forwarding IE within the E-RABs To Be Added Item IE of the SGNB MODIFICATION REQUEST message. For each E-RAB that it has decided to admit, the SgNB may include the DL Forwarding GTP Tunnel Endpoint IE within the E-RABs Admitted To Be Added Item IE of the SGNB MODIFICATION REQUEST ACKNOWLEDGE message to indicate that it accepts the proposed forwarding of downlink data for this bearer. The MeNB may also provide for an applicable E-RAB to be released the DL Forwarding GTP Tunnel Endpoint IE and the UL Forwarding GTP Tunnel Endpoint IE within the E-RABs To Be Released Item IE of the SGNB MODIFICATION REQUEST message.

if applicable, the SgNB may include for each bearer in the E-RABs Admitted To Be Added List IE in the SGNB MODIFICATION REQUEST ACKNOWLEDGE message the UL Forwarding GTP Tunnel Endpoint IE to indicate that it requests data forwarding of uplink packets to be performed for that bearer.

For each E-RAB configured with the split bearer option to be modified, if the SGNB MODIFICATION REQUEST message includes the SCG Change Indication IE and the MeNB GTP Tunnel Endpoint IE in the E-RABs To Be Modified Item IE, the SgNB shall act as specified in TS 37.340 [15].

For each E-RAB configured with the split bearer option to be modified (released),
if applicable, the MeNB may provide for an applicable E-RAB to be released the DL Forwarding GTP Tunnel Endpoint IE within the E-RABs To Be Released Item LE of the SGNB MODIFICATION REQUEST message.

If the E-RAB level QoS parameter IE is included in the SGNB MODIFICATION REQUEST message for an E-RAB to be modified the SgNB shall allocate respective resources and provide corresponding radio configuration information within the SgNB to MeNB Container IE as described in TS 36.300 [15].

If the SGNB MODIFICATION REQUEST message contains for an E-RAB to be modified which is configured with the SCG bearer and SCG split bearer option the S1 UL GTP Tunnel Endpoint IE the SgNB shall use it as the new UL S1-U address.

If the SGNB MODIFICATION REQUEST message contains for an E-RAB to be modified which is configured with the split bearer option the MeNB GTP Tunnel Endpoint IE the SgNB shall use it as the new UL X2-U address.

If the SGNB MODIFICATION REQUEST message contains for an E-RAB to be modified which is configured with SCG split bearer option the MeNB GTP Tunnel Endpoint IE the SgNB shall use it as the DL X2-U address.

For an E-RAB to be modified which is configured with the SCG bearer and SCG split bearer option the SgNB may include in the SGNB MODIFICATION REQUEST ACKNOWLEDGE message the S1 DL GTP Tunnel Endpoint IE.

If the SGNB MODIFICATION REQUEST ACKNOWLEDGE message contains the SgNB Resource Coordination Information IE, the MeNB may use it for the purpose of resource coordination with the SgNB. If the Resource Coordination Type IE indicates that the intended coordination is for UEs capable of single transmission, the UE may not be able to transmit on any resource of the subframes intended to be utilised for UL transmission. The MeNB shall consider the received UL Coordination Information IE value valid until reception of a new update of the IE for the same UE. The MeNB shall consider the received DL Coordination Information IE value valid until reception of a new update of the IE for the same UE.

For an E-RAB to be modified which is configured with the split bearer option the SgNB may include in the SGNB MODIFICATION REQUEST ACKNOWLEDGE message the SgNB GTP Tunnel Endpoint IE.

If the SCG Change Indication IE is included in the SGNB MODIFICATION REQUEST message, the SgNB shall act as specified in TS 37.340 [15].

Upon reception of the SGNB MODIFICATION REQUEST ACKNOWLEDGE message the MeNB shall stop the timer $T_{DCprep}$. If the SGNB MODIFICATION REQUEST ACKNOWLEDGE message has included the SgNB to MeNB Container IE the MeNB is then defined to have a Prepared SgNB Modification for that X2 UE-associated signalling.

If the SCG Configuration Query IE is included in the SGNB MODIFICATION REQUEST message, the SgNB shall provide corresponding radio configuration information within the SgNB to MeNB Container IE as described in TS 37.340 [yy].

Interactions with the SgNB Reconfiguration Completion Procedure:

If the SgNB admits a modification of the UE context requiring the MeNB to report about the success of the RRC connection reconfiguration procedure, the SgNB shall start the timer $T_{DCoverall}$ when sending the SGNB MODIFICATION REQUEST ACKNOWLEDGE message to the MeNB. The reception of the SgNB RECONFIGURATION COMPLETE message shall stop the timer $T_{DCoverall}$.

Figure 27:
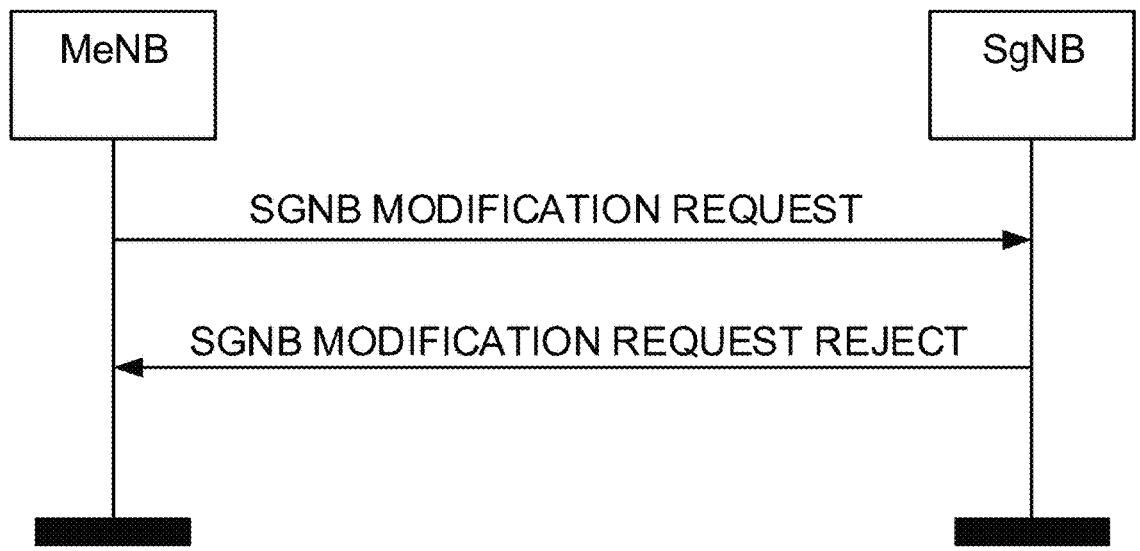
FIG. 27 illustrates MeNB initiated SgNB Modification Preparation when unsuccessful.
Figure 28:
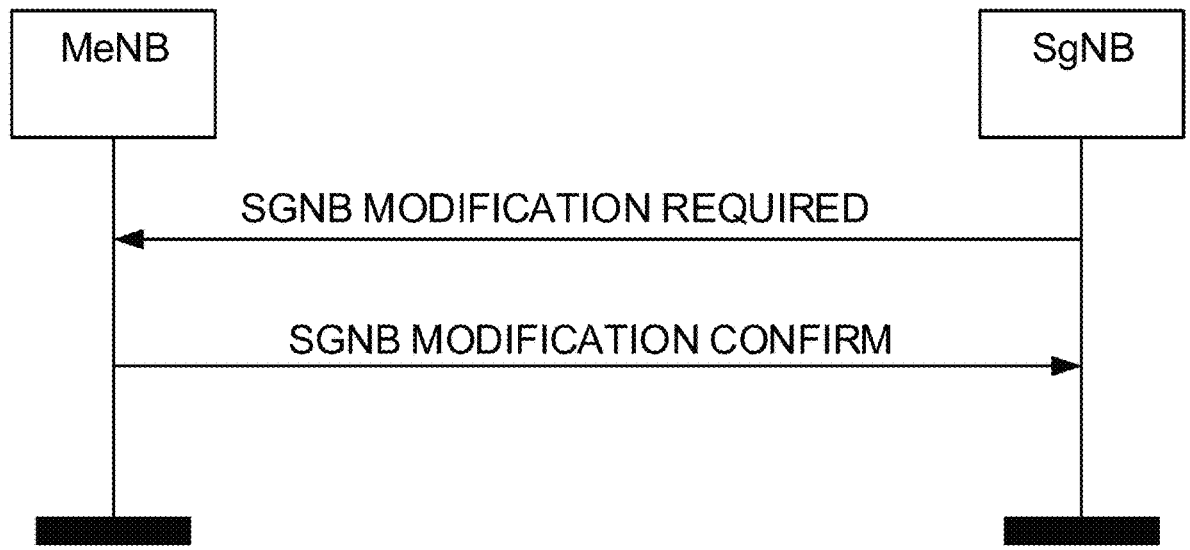
FIG. 28 illustrates SgNB initiated SgNB Modification when successful.
Figure 29:
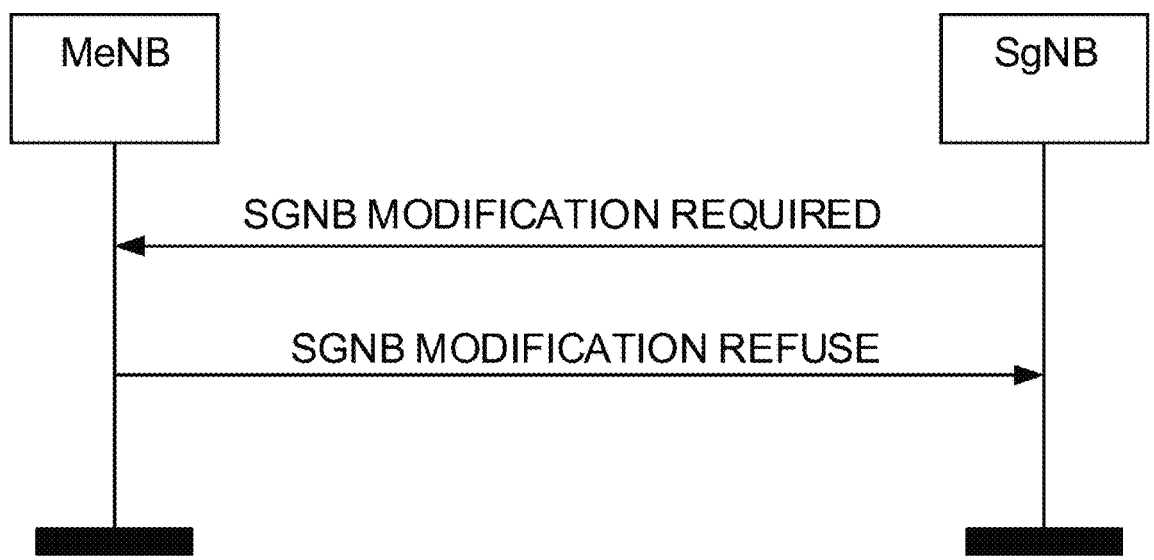
FIG. 29 illustrates SgNB initiated SgNB Modification when unsuccessful.

8.X.5.3 Unsuccessful Operation
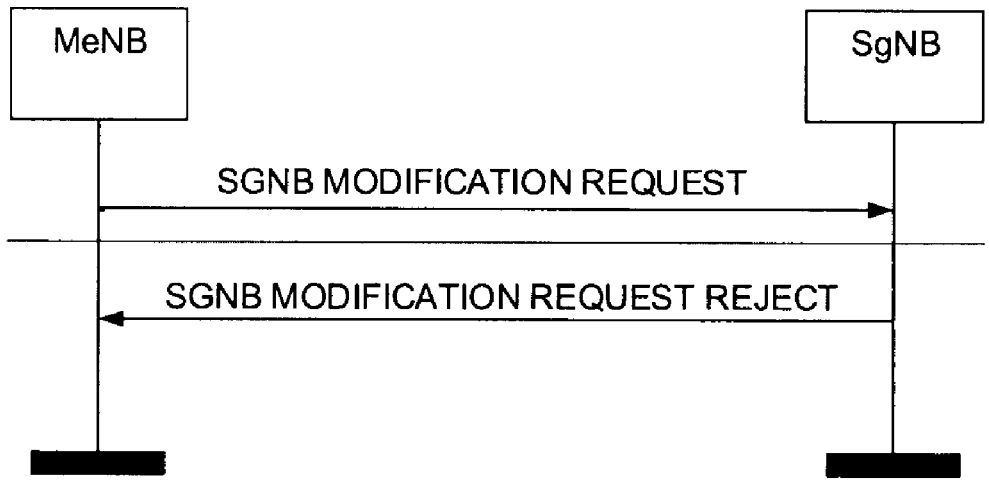
Figure 8.X.5.3-1:Figure 27 illustrates MeNB initiated SgNB Modification Preparation, when unsuccessful. operation If the SgNB does not admit any modification requested by the MeNB, or a failure occurs during the MeNB initiated SgNB Modification Preparation, the SgNB shall send the SGNB MODIFICATION REQUEST REJECT message to the MeNB. The message shall contain the Cause IE with an appropriate value.

If the SgNB receives a SGNB MODIFICATION REQUEST message containing the MeNB to SgNB Container IE that does not include required information as specified in TS 36.331 [9], the SgNB shall send the SGNB MODIFICATION REQUEST REJECT message to the MeNB.

8.X.5.4 Abnormal Conditions

If the SgNB receives a SGNB MODIFICATION REQUEST message containing multiple E-RAB ID IEs (in the E-RABs To Be Added List IE and/or the E-RABs To Be Modified List IE) set to the same value, the SgNB shall not admit the action requested for the corresponding E-RABs.

If the SgNB receives an SGNB MODIFICATION REQUEST message containing multiple E-RAB ID IEs (in the E-RAB To Be Released List IE) set to the same value, the SgNB shall initiate the release of one corresponding E-RAB and ignore the duplication of the instances of the selected corresponding E-RABs.

If the SgNB receives a SGNB MODIFICATION REQUEST message containing a E-RAB Level QoS Parameters IE which contains a QCI IE indicating a GBR bearer (as defined in TS 23.203 [13]), and which does not contain the GBR QoS Information IE, the SgNB shall not admit the corresponding E-RAB.

If the supported algorithms for encryption defined in the Encryption Algorithms IE in the UE Security Capabilities IE in the UE Context Information IE, plus the mandated support of EEA0 in all UEs (TS 33.401) [18]), do not match any algorithms defined in the configured list of allowed encryption algorithms in the SgNB (TS 33.401 [18]), the SgNB shall reject the procedure using the SGNB MODIFICATION REQUEST REJECT message.

If the timer $T_{DCprep}$ expires before the MeNB has received the SGNB MODIFICATION REQUEST ACKNOWLEDGE message, the MeNB shall regard the MeNB initiated SgNB Modification Preparation procedure as being failed and shall release the UE Context at the SgNB.

Interactions with the SgNB Reconfiguration Completion and SgNB Initiated SgNB Release Procedure:

If the timer $T_{DCoverall}$ expires before the SgNB has received the SGNB RECONFIGURATION COMPLETE or the SGNB RELEASE REQUEST message, the SgNB shall regard the requested modification RRC connection reconfiguration as being not applied by the UE and shall trigger the SgNB initiated SgNB Release procedure.

Interaction with the SgNB Initiated SgNB Modification Preparation Procedure:

If the MeNB, after having initiated the MeNB initiated SgNB Modification procedure, receives the SGNB MODIFICATION REQUIRED message, the MeNB shall refuse the SgNB initiated SgNB Modification procedure with an appropriate cause value in the Cause IE.

If the MeNB has a Prepared SgNB Modification and receives the SGNB MODIFICATION REQUIRED message, the MeNB shall respond with the SGNB MODIFICATION REFUSE message to the SgNB with an appropriate cause value in the Cause IE.

8.X.6 SgNB Initiated SgNB Modification

8.X.6.1 General

This procedure is used by the SgNB to modify the UE context in the SgNB.

The procedure uses UE-associated signalling.

8.X.6.2 Successful Operation
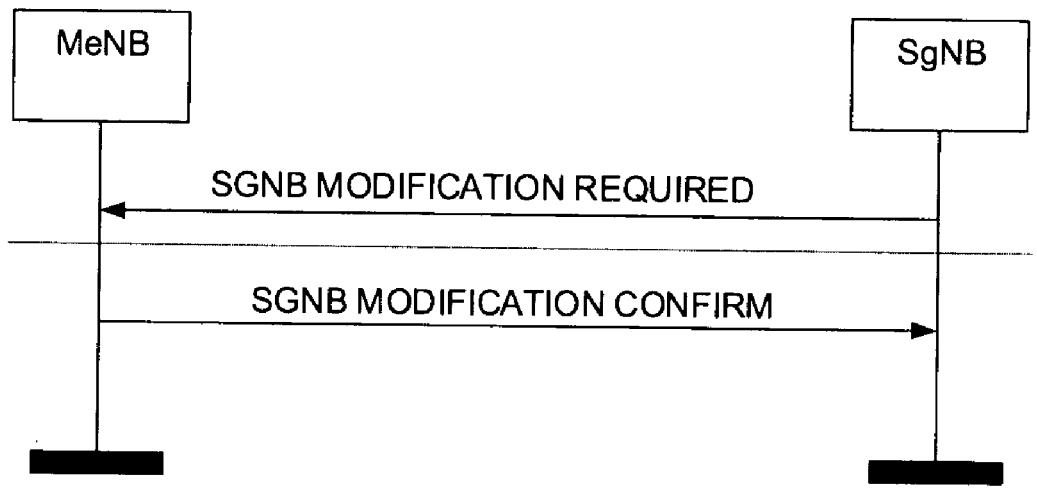
Figure 8.X.6.2-1:28 illustrates SgNB initiated SgNB Modification ;when successful operation.

The SgNB initiates the procedure by sending the SGNB MODIFICATION REQUIRED message to the MeNB. When the SgNB sends the SGNB MODIFICATION REQUIRED message, it shall start the timer $T_{DCoverall}$.

The SGNB MODIFICATION REQUIRED message may contain
- the SgNB to MeNB Container IE.
- E-RABs to be released within the E-RABs To Be Released Item IE;
- E-RABs to be modified within the E-RABs To Be Modified Item IE;
- the SCG Change Indication IE;
- the SgNB Resource Coordination Information.

If the MeNB is able to perform the change requested by the SgNB, the MeNB shall send the SGNB MODIFICATION CONFIRM message to the SgNB. The SGNB MODIFICATION CONFIRM message may contain the MeNB to SgNB Container IE.

If the SGNB MODIFICATION REQUIRED message contains the SgNB Resource Coordination Information IE, the MeNB may use it for the purpose of resource coordination with the SgNB. If the Resource Coordination Type IE indicates that the intended coordination is for UEs capable of single transmission, the UE may not be able to transmit on any resource of the subframes intended to be utilised for UL transmission. The MeNB shall consider the received UL Coordination Information IE value valid until reception of a new update of the IE for the same UE. The MeNB shall consider the received DL Coordination Information IE value valid until reception of a new update of the IE for the same UE.

Upon reception of the SGNB MODIFICATION CONFIRM message the SgNB shall stop the timer $T_{DCoverall}$.

If the SGNB MODIFICATION CONFIRM message contains the MeNB Resource Coordination Information IE, the SgNB may use it for the purpose of resource coordination with the MeNB. If the Resource Coordination Type IE indicates that the intended coordination is for UEs capable of single transmission, the UE may not be able to transmit on any resource of the subframes intended to be utilised for UL transmission. The SgNB shall consider the received UL Coordination Information IE value valid until reception of a new update of the IE for the same UE.

Interaction with the MeNB Initiated SgNB Modification Preparation Procedure:

If applicable, as specified in TS 37.340 [15], the SgNB may receive, after having initiated the SgNB initiated SgNB Modification procedure, the SGNB MODIFICATION REQUEST message including the DL Forwarding GTP Tunnel Endpoint IE and the UL Forwarding GTP Tunnel Endpoint IE within the E-RABs To Be Released List IE.

If applicable, as specified in TS 37.340 [15], the SgNB may receive, after having initiated the SgNB initiated SgNB Modification procedure, the SGNB MODIFICATION REQUEST message including the SgNB Security Key IE within the UE Context Information IE.

If the SgNB has initiated the SgNB initiated SgNB Modification procedure with the SGNB MODIFICATION REQUIRED message including the E-RABs To Be Released Item IE, it may receive the SGNB MODIFICATION REQUEST message, upon which the SgNB shall provide respective information in the SgNB to MeNB Container IE within the SGNB MODIFICATION REQUEST ACKNOWLEDGMENT message, as specified in TS 37.340 [15].

8.X.6.3 Unsuccessful Operation

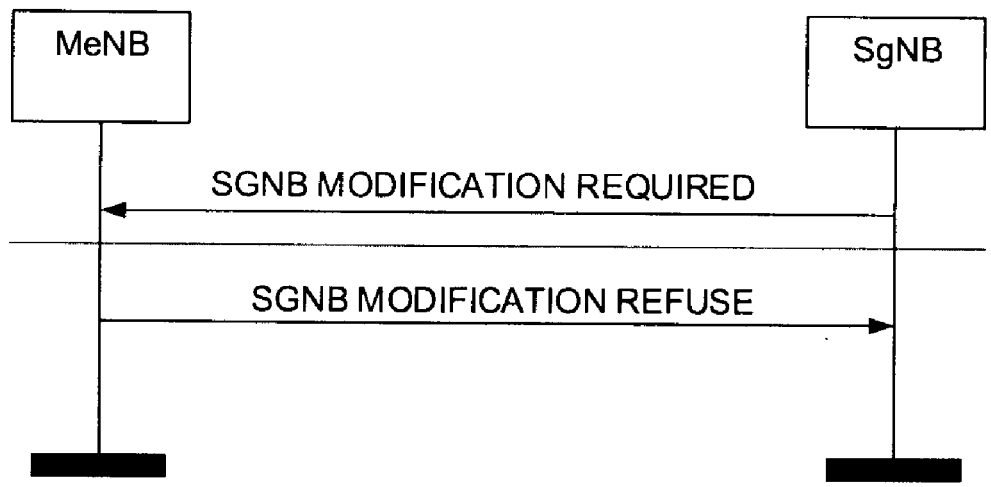
Figure 8.X.6.3-1:29 illustrates SgNB initiated SgNB Modification; when unsuccessful operation.

In case the request modification cannot be performed successfully the MeNB shall respond with the SGNB MODIFICATION REFUSE message to the SgNB with an appropriate cause value in the Cause IE.

The MeNB may also provide configuration information in the MeNB to SgNB Container IE.

8.X.6.4 Abnormal Conditions

If the timer $T_{DCoverall}$ expires before the SgNB has received the SGNB MODIFICATION CONFIRM or the SGNB MODIFICATION REFUSE message, the SgNB shall regard the requested modification as failed and may take further actions like triggering the SgNB initiated SgNB Release procedure to release all SgNB resources allocated for the UE.

If the MeNB is aware that the SgNB didn't receive the latest configuration information concerning the MCG, the MeNB may respond with the SGNB MODIFICATION REFUSE message to the SgNB with an appropriate cause value in the Cause IE.

If the value received in the E-RAB ID IE of any of the E-RABs To Be Released Items IE is not known at the MeNB, the MeNB shall regard the procedure as failed and may take appropriate actions like triggering the MeNB initiated SgNB Release procedure.

Interaction with the MeNB Initiated SgNB Modification Preparation Procedure:

If the SgNB, after having initiated the SgNB initiated SgNB Modification procedure, receives the SGNB MODIFICATION REQUEST message including other IEs than an applicable SgNB Security Key IE and/or applicable forwarding addresses and/or the SCG Change Indication IE the SgNB shall

- regard the SgNB initiated SgNB Modification Procedure as being failed;
- stop the $T_{DCoverall}$, which was started to supervise the SgNB initiated SgNB Modification procedure;
- be prepared to receive the SGNB MODIFICATION REFUSE message from the MeNB and;
- continue with the MeNB initiated SgNB Modification Preparation procedure as specified in section 8.X.3.

--------------------------and the Third Change---------------------------

9.1.X Messages for E-UTRAN-NR Dual Connectivity Procedures

Editor's Note: The IEs SCG Split Bearer and QoS are pending on further discussion. FFS.

9.1.X.1 SGNB Addition Request

This message is sent by the MeNB to the SgNB to request the preparation of resources for EN-DC operation for a specific UE Direction: MeNB→SgNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| UE Security Capabilities | C-ifSCGorSCGsplitBearerOption | | 9.2.29 | | YES | reject |
| SgNB Security Key | C-ifSCGorSCGsplitBearerOption | | 9.2.YY | The S-KgNB which is provided by the MeNB, see TS 33.401 [18]. | YES | reject |
| SgNB UE Aggregate Maximum Bit Rate | M | | UE Aggregate Maximum Bit Rate 9.2.12 | The UE Aggregate Maximum Bit Rate is split into MeNB UE Aggregate Maximum Bit Rate and SgNB UE Aggregate Maximum Bit Rate which are enforced by MeNB and SgNB respectively. | YES | reject |
| Serving PLMN | O | | PLMN Identity 9.2.4 | The serving PLMN of the SCG in the SgNB. | YES | ignore |
| Handover Restriction List | O | | 9.2.3 | | YES | ignore |
| E-RABs To Be Added List | | 1 | | | YES | reject |
| >E-RABs To Be Added Item | | 1 ... <maxnoof Bearers> | | | EACH | reject |
| >>CHOICE Bearer Option | M | | | | | |
| >>>SCG Bearer | | | | | | |

-continued

| IE/Group Name | Presence | Range | IE type and reference | Semantics description | Criticality | Assigned Criticality |
|---|---|---|---|---|---|---|
| >>>>E-RAB ID | M | | 9.2.23 | | — | — |
| >>>>E-RAB Level QoS Parameters | M | | 9.2.9 | Includes necessary QoS parameters for the SCG part. | — | — |
| >>>>DL Forwarding | O | | 9.2.5 | | — | — |
| >>>>S1 UL GTP Tunnel Endpoint | M | | GTP Tunnel End point 9.2.1 | SGW endpoint of the S1 transport bearer. For delivery of UL PDUs. | — | — |
| >>>Split Bearer | | | | | | |
| >>>>E-RAB ID | M | | 9.2.23 | | — | — |
| >>>>E-RAB Level QoS Parameters | M | | 9.2.9 | Includes necessary QoS parameters | — | — |
| >>>>MeNB GTP Tunnel Endpoint | M | | GTP Tunnel End point 9.2.1 | MeNB endpoint of the X2 transport bearer. For delivery of UL PDUs. | — | — |
| >>>SCG Split Bearer | | | | | | |
| >>>> E-RAB ID | M | | 9.2.23 | | — | — |
| >>>> E-RAB Level QoS Parameters | M | | E-RAB Level QoS Parameters 9.2.9 | Includes the E-RAB Level QoS parameters as received on S1-MME for the E-RAB | — | — |
| >>>> Maximum admittable E-RAB Level QoS Parameters | M | | E-RAB Level QoS Parameters 9.2.9 | Includes the E-RAB Level QoS parameters admittable by the MeNB | — | — |
| >>>>DL Forwarding | O | | 9.2.5 | | — | — |
| >>>>MeNB GTP Tunnel Endpoint | M | | GTP Tunnel Endpoint 9.2.1 | MeNB endpoint of the X2 transport bearer. For delivery of DL PDUs. | — | — |
| >>>>S1 UL GTP Tunnel Endpoint | M | | GTP Tunnel Endpoint 9.2.1 | SGW endpoint of the S1 transport bearer. For delivery of UL PDUs. | — | — |
| MeNB to SgNB Container | M | | OCTET STRING | Includes the SCG-ConfigInfo message as defined in TS 38.331 [xx]. Editor's Note: to be | YES | reject |

-continued

| IE/Group Name | Presence | Range | IE type and reference | Semantics description | Criticality | Assigned Criticality |
|---|---|---|---|---|---|---|
| | | | | checked with RAN2 | | |
| CSG Membership Status | O | | 9.2.52 | | YES | reject |
| SgNB UE X2AP ID | O | | gNB UE X2AP ID 9.2.XX | Allocated at the SgNB | YES | reject |
| SgNB UE X2AP ID Extension | O | | Extended gNB UE X2AP ID 9.2.XY | Allocated at the SgNB | YES | reject |
| Expected UE Behaviour | O | | 9.2.70 | | YES | ignore |
| MeNB UE X2AP ID Extension | O | | Extended eNB UE X2AP ID 9.2.86 | Allocated at the MeNB | YES | reject |
| Requested MCG split SRBs | O | | ENUMERATED (srb1, srb2, srb1&2, . . .) | Indicates that resources for MCG Split SRB are requested. | YES | reject |
| MeNB Resource Coordination Information | | 0 . . . 1 | | Information used to coordinate resources utilisation between MeNB and SgNB | EACH | ignore |
| >EUTRA Cell ID | M | | ECGI 9.2.14 | | — | — |
| >UL Coordination Information | M | | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to UL subframes. The bit string may span across multiple contiguous subframes (maximum 40). The first position of the UL Coordination Information corresponds to subframe 0 in a radio | — | — |

-continued

| IE/Group Name | Presence | Range | IE type and reference | Semantics description | Criticality | Assigned Criticality |
|---|---|---|---|---|---|---|
| >Resource Coordination Type | M | | BITSTRING (SIZE(32)) | frame where SFN = 0. The length of the bit string is an integer multiple of $N_{RB}^{DL}$. $N_{RB}^{DL}$ is defined in TS 36.211 [10]. The UL Coordination Information is continuously repeated. Each position in the bitmap indicates a type of intended coordination. First Bit = Single Tx Coordination, Second Bit = Harmonic Interference Coordination, Third Bit = Single Tx and Harmonic Interference Coordination. Other bits shall be ignored | | |

| Range bound | Explanation |
|---|---|
| maxnoofBearers | Maximum no. of E-RABs. Value is 256 |
| maxnoofSCG | Maximum no. of NR SCG. Value is FFS |

| Condition | Explanation |
|---|---|
| ifSCGorSCGsplitBearerOption | This IE shall be present if the Bearer Option IE is set to the value "SCG bearer" or "SCG split bearer". |

9.1.X.2 SGNB Addition Request Acknowledge

This message is sent by the SgNB to confirm the MeNB about the SgNB addition preparation.

Direction: SgNB→MeNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SgNB UE X2AP ID | M | | gNB UE X2AP ID 9.2.XX | Allocated at the SgNB | YES | reject |

-continued

| IE/Group Name | Presence | Range | IE type and reference | Semantics description | Criticality | Assigned Criticality |
|---|---|---|---|---|---|---|
| E-RABs Admitted To Be Added List | | 1 | | | YES | ignore |
| >E-RABs Admitted To Be Added Item | | 1 . . . <maxnoof Bearers> | | | EACH | ignore |
| >>CHOICE Bearer Option | M | | | | | |
| >>>SCG Bearer | | | | | | |
| >>>>E-RAB ID | M | | 9.2.23 | | — | — |
| >>>>S1 DL GTP Tunnel Endpoint | M | | GTP Tunnel End point 9.2.1 | SgNB endpoint of the S1 transport bearer. For delivery of DL PDUs. | — | — |
| >>>>DL Forwarding GTP Tunnel Endpoint | O | | GTP Tunnel End point 9.2.1 | Identifies the X2 transport bearer used for forwarding of DL PDUs | — | — |
| >>>>UL Forwarding GTP Tunnel Endpoint | O | | GTP Tunnel End point 9.2.1 | Identifies the X2 transport bearer used for forwarding of UL PDUs | — | — |
| >>>Split Bearer | | | | | | |
| >>>>E-RAB ID | M | | 9.2.23 | | — | — |
| >>>>SgNB GTP Tunnel Endpoint | M | | GTP Tunnel Endpoint 9.2.1 | Endpoint of the X2 transport bearer at the SgNB. | — | — |
| >>>SCG Split Bearer | | | | | | |
| >>>>E-RAB ID | M | | 9.2.23 | | — | — |
| >>>>S1 DL GTP Tunnel Endpoint | M | | GTP Tunnel Endpoint 9.2.1 | SgNB endpoint of the S1 transport bearer. For delivery of DL PDUs. | — | — |
| >>>>SgNB GTP Tunnel Endpoint | M | | GTP Tunnel Endpoint 9.2.1 | SgNB endpoint of the X2 transport bearer. For delivery of UL PDUs. | — | — |
| >>>>DL Forwarding GTP Tunnel Endpoint | O | | GTP Tunnel Endpoint 9.2.1 | Identifies the X2 transport bearer used for forwarding of DL PDUs. | — | — |
| >>>>>UL Forwarding GTP Tunnel Endpoint | O | | GTP Tunnel Endpoint 9.2.1 | Identifies the X2 transport bearer used for forwarding of UL PDUs. | — | — |
| >>>>> E-RAB Level QoS Parameters | M | | 9.2.9 | Includes necessary QoS parameters for the MCG part | — | — |

-continued

| IE/Group Name | Presence | Range | IE type and reference | Semantics description | Criticality | Assigned Criticality |
|---|---|---|---|---|---|---|
| E-RABs Not Admitted List | O | | E-RAB List 9.2.28 | A value for E-RAB ID shall only be present once in E-RABs Admitted List IE and in E-RABs Not Admitted List IE. | YES | ignore |
| SgNB to MeNB Container | M | | OCTET STRING | Includes the RRCConnectionReconfiguration message (NR RRC message name is FFS) as defined in TS 38.331[xx]. Editor's Note: to be checked with RAN2 | YES | reject |
| Criticality Diagnostics | O | | 9.2.7 | | YES | ignore |
| GW Transport Layer Address | O | | BIT STRING (1 . . . 160, . . .) | Indicating GW Transport Layer Address. | YES | ignore |
| MeNB UE X2AP ID Extension | O | | Extended eNB UE X2AP ID 9.2.86 | Allocated at the MeNB | YES | reject |
| SgNB UE X2AP ID Extension | O | | Extended gNB UE X2AP ID 9.2.XY | Allocated at the SgNB | YES | reject |
| Tunnel Information for BBF | O | | Tunnel Information 9.2.89 | Indicating eNB's Local IP Address assigned by the broadband access provider, UDP port Number. | YES | ignore |
| Admitted MCG split SRBs | O | | ENUMERATED (srb1, srb2, srb1&2, . . .) | Indicates admitted SRBs | YES | reject |
| SgNB Resource Coordination Information | | 0 . . . 1 | | Information used to coordinate resources utilisation between SgNB and MeNB | EACH | ignore |
| >NR-CGI | M | | 9.2.bb | | — | — |
| >UL Coordination Information | M | | BIT STRING (6 . . . 4400, . . .) | Each position in the bitmap represents a PRB in a subframe; value "0" indicates "resource not intended to be used for transmission", value "1" indicates "resource | — | — |

-continued

| IE/Group Name | Presence | Range | IE type and reference | Semantics description | Criticality | Assigned Criticality |
|---|---|---|---|---|---|---|
| | | | | intended to be used for transmission". Each position is applicable only in positions corresponding to UL subframes. The bit string may span across multiple contiguous subframes (maximum 40). The first position of the UL Coordination Information corresponds to the receiving node's subframe 0 in a receiving node's radio frame where SFN = 0. The length of the bit string is an integer multiple of $N_{RB}^{DL}$. $N_{RB}^{DL}$ is defined in TS 36.211 [10]. The UL Coordination Information is continuously repeated. | | |
| >DL Coordination Information | O | | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to DL subframes. The bit string may span across multiple | — | — |

-continued

| IE/Group Name | Presence | Range | IE type and reference | Semantics description | Criticality | Assigned Criticality |
|---|---|---|---|---|---|---|
| >Resource Coordination Type | M | | BITSTRING (SIZE(32)) | contiguous subframes (maximum 40). The first position of the DL Coordination Information corresponds to the receiving node's subframe 0 in a receiving node's radio frame where SFN = 0. The length of the bit string is an integer multiple of $N_{RB}^{DL}$. $N_{RB}^{DL}$ is defined in TS 36.211 [10]. The DL Coordination Information is continuously repeated. Each position in the bitmap indicates a type of intended coordination. First Bit = Single Tx Coordination, Second Bit = Harmonic Interference Coordination, Third Bit = Single Tx and Harmonic Interference Coordination. Other bits shall be ignored | | |

| Range bound | Explanation |
|---|---|
| maxnoofBearers | Maximum no. of E-RABs. Value is 256 |

9.1.X.5 SGNB Modification Request

This message is sent by the MeNB to the SgNB to request the preparation to modify SgNB resources for a specific UE.

Direction: MeNB→SgNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SgNB UE X2AP ID | M | | gNB UE X2AP ID 9.2.XX | Allocated at the SgNB | YES | reject |

| IE/Group Name | Presence | Range | IE type and reference | Semantics description | Criticality | Assigned Criticality |
|---|---|---|---|---|---|---|
| Cause | M | | 9.2.6 | | YES | ignore |
| SCG Change Indication | O | | 9.2.73 | | YES | ignore |
| Serving PLMN | O | | PLMN Identity 9.2.4 | The serving PLMN of the SCG in the SgNB. | YES | ignore |
| Handover Restriction List | O | | 9.2.3 | | YES | ignore |
| SCG Configuration Query | O | | 9.2.x | | YES | ignore |
| UE Context Information | | 0 . . . 1 | | | YES | reject |
| >UE Security Capabilities | O | | 9.2.29 | | — | — |
| >SgNB Security Key | O | | 9.2.YY | | — | — |
| >SgNB UE Aggregate Maximum Bit Rate | O | | UE Aggregate Maximum Bit Rate 9.2.12 | | — | — |
| >E-RABs To Be Added List | | 0 . . . 1 | | | — | — |
| >>E-RABs To Be Added Item | | 1 . . . <maxnoofBearers> | | | EACH | ignore |
| >>>CHOICE Bearer Option | M | | | | — | — |
| >>>>SCG Bearer | | | | | | |
| >>>>>E-RAB ID | M | | 9.2.23 | | — | — |
| >>>>>E-RAB Level QoS Parameters | M | | 9.2.9 | Includes necessary QoS parameters | — | — |
| >>>>>DL Forwarding | O | | 9.2.5 | | — | — |
| >>>>>S1 UL GTP Tunnel Endpoint | M | | GTP Tunnel Endpoint 9.2.1 | SGW endpoint of the S1 transport bearer. For delivery of UL PDUs. | — | — |
| >>>>Split Bearer | | | | | | |
| >>>>>E-RAB ID | M | | 9.2.23 | | — | — |
| >>>>>E-RAB Level QoS Parameters | M | | 9.2.9 | Includes necessary QoS parameters | — | — |
| >>>>>MeNB GTP Tunnel Endpoint | M | | GTP Tunnel Endpoint 9.2.1 | MeNB endpoint of the X2 transport bearer. For delivery of UL PDUs. | — | — |
| >>>>SCG Split Bearer | | | | | | |
| >>>>>E-RAB ID | M | | 9.2.23 | | — | — |
| >>>>>E-RAB Level QoS Parameters | M | | E-RAB Level QoS Parameters 9.2.9 | Includes the E-RAB Level QoS parameters as received on S1-MME for the E-RAB | — | — |

-continued

| IE/Group Name | Presence | Range | IE type and reference | Semantics description | Criticality | Assigned Criticality |
|---|---|---|---|---|---|---|
| >>>>>DL Forwarding | O | | 9.2.5 | | — | — |
| >>>>>MeNB GTP Tunnel Endpoint | M | | GTP Tunnel Endpoint 9.2.1 | MeNB endpoint of the X2 transport bearer. For delivery of DL PDUs. | — | — |
| >>>>>S1 UL GTP Tunnel Endpoint | M | | GTP Tunnel Endpoint 9.2.1 | SGW endpoint of the S1 transport bearer. For delivery of UL PDUs. | — | — |
| >>>>Maximum admittable E-RAB Level QoS Parameters | M | | 9.2.9 | Includes the E-RAB Level QoS parameters admittable by the MeNB | — | — |
| >E-RABs To Be Modified List | | 0 ... 1 | | | — | — |
| >>E-RABs To Be Modified Item | | 1 ... <maxnoofBearers> | | | EACH | ignore |
| >>>CHOICE Bearer Option | M | | | | — | — |
| >>>>SCG Bearer | | | | | | |
| >>>>>E-RAB ID | M | | 9.2.23 | | — | — |
| >>>>>E-RAB Level QoS Parameters | O | | 9.2.9 | Includes QoS parameters to be modified | — | — |
| >>>>>S1 UL GTP Tunnel Endpoint | O | | GTP Tunnel Endpoint 9.2.1 | SGW endpoint of the S1 transport bearer. For delivery of UL PDUs. | — | — |
| >>>>Split Bearer | | | | | | |
| >>>>>E-RAB ID | M | | 9.2.23 | | — | — |
| >>>>>E-RAB Level QoS Parameters | O | | 9.2.9 | Includes QoS parameters to be modified | — | — |
| >>>>>MeNB GTP Tunnel Endpoint | O | | GTP Tunnel Endpoint 9.2.1 | MeNB endpoint of the X2 transport bearer. For delivery of UL PDUs. | — | — |
| >>>SCG Split Bearer | | | | | | |
| >>>>E-RAB ID | M | | 9.2.23 | | — | — |
| >>>>E-RAB Level QoS Parameters | O | | E-RAB Level QoS Parameters 9.2.9 | Includes the E-RAB Level QoS parameters as received on S1-MME for the E-RAB | — | — |
| >>>>MeNB GTP Tunnel Endpoint | M | | GTP Tunnel Endpoint 9.2.1 | MeNB endpoint of the X2 | — | — |

-continued

| IE/Group Name | Presence | Range | IE type and reference | Semantics description | Criticality | Assigned Criticality |
|---|---|---|---|---|---|---|
| >>>>S1 UL GTP Tunnel Endpoint | M | | GTP Tunnel Endpoint 9.2.1 | SGW endpoint of the S1 transport bearer. For delivery of UL PDUs. | — | — |
| >>>>Maximum admittable E-RAB Level QoS Parameters | O | | 9.2.9 | Includes the E-RAB Level QoS parameters admittable by the MeNB. | — | — |
| >E-RABs To Be Released List | | 0 . . . 1 | | | — | — |
| >>E-RABs To Be Released Item | | 1 . . . <maxnoofBearers> | | | EACH | ignore |
| >>>CHOICE Bearer Option | M | | | | | |
| >>>>SCG Bearer | | | | | | |
| >>>>>E-RAB ID | M | | 9.2.23 | | — | — |
| >>>>>DL Forwarding GTP Tunnel Endpoint | O | | GTP Tunnel Endpoint 9.2.1 | Identifies the X2 transport bearer used for forwarding of DL PDUs | — | — |
| >>>>>UL Forwarding GTP Tunnel Endpoint | O | | GTP Tunnel Endpoint 9.2.1 | Identifies the X2 transport bearer. used for forwarding of UL PDUs | — | — |
| >>>>Split Bearer | | | | | | |
| >>>>>E-RAB ID | M | | 9.2.23 | | — | — |
| >>>>>DL Forwarding GTP Tunnel Endpoint | O | | GTP Tunnel Endpoint 9.2.1 | Identifies the X2 transport bearer used for forwarding of DL PDUs | — | — |
| >>>>SCG Split Bearer | | | | | | |
| >>>>>E-RAB ID | M | | 9.2.23 | | — | — |
| >>>>>DL Forwarding GTP Tunnel Endpoint | O | | GTP Tunnel Endpoint 9.2.1 | Identifies the X2 transport bearer used for forwarding of DL PDUs. | — | — |
| >>>>UL Forwarding GTP Tunnel Endpoint | O | | GTP Tunnel Endpoint 9.2.1 | Identifies the X2 transport bearer used for forwarding of UL PDUs | — | — |
| MeNB to SgNB Container | O | | OCTET STRING | Includes the SCG-ConfigInfo message as defined in TS 38.331 [xx] Editor's Note: to be checked with RAN2 | YES | reject |
| MeNB UE X2AP ID Extension | O | | Extended eNB UE X2AP ID 9.2.86 | Allocated at the MeNB | YES | reject |
| SgNB UE X2AP ID | O | | Extended gNB UE | Allocated at the SgNB | YES | reject |

-continued

| IE/Group Name | Presence | Range | IE type and reference | Semantics description | Criticality | Assigned Criticality |
|---|---|---|---|---|---|---|
| Extension | | | X2AP ID 9.2.XY | | | |
| MeNB Resource Coordination Information | | 0 . . . 1 | | Information used to coordinate resources utilisation between MeNB and SgNB | EACH | ignore |
| >EUTRA Cell ID | M | | ECGI 9.2.14 | | — | — |
| >UL Coordination Information | M | | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to UL subframes. The bit string may span across multiple contiguous subframes (maximum 40). The first position of the UL Coordination Information corresponds to subframe 0 in a radio frame where SFN = 0. The length of the bit string is an integer multiple of $N_{RB}^{DL}$. $N_{RB}^{DL}$ is defined in TS 36.211 [10]. The UL Coordination Information is continuously repeated. | | |
| >Resource Coordination Type | M | | BITSTRING (SIZE(32)) | Each position in the bitmap indicates a type of intended coordination. First Bit = Single Tx Coordination, Second Bit = Harmonic Interference Coordination, Third Bit = Single Tx and Harmonic | | |

-continued

| IE/Group Name | Presence | Range | IE type and reference | Semantics description | Criticality | Assigned Criticality |
|---|---|---|---|---|---|---|
| | | | | Interference Coordination. Other bits shall be ignored | | |

| Range bound | Explanation |
|---|---|
| maxnoofBearers | Maximum no. of E-RABs. Value is 256 |

9.1.X.6 SGNB Modification Request Acknowledge

This message is sent by the SgNB to confirm the MeNB's request to modify the SgNB resources for a specific UE.

Direction: SgNB→MeNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SgNB UE X2AP ID | M | | gNB UE X2AP ID 9.2.XX | Allocated at the SgNB | YES | ignore |
| E-RABs Admitted List | | 0 . . . 1 | | | YES | ignore |
| >E-RABs Admitted To Be Added List | | 1 | | | — | — |
| >>E-RABs Admitted To Be Added Item | | 1 . . . <maxnoofBearers> | | | EACH | ignore |
| >>>CHOICE Bearer Option | M | | | | | |
| >>>>SCG Bearer | | | | | | |
| >>>>>E-RAB ID | M | | 9.2.23 | | — | — |
| >>>>>S1 DL GTP Tunnel Endpoint | M | | GTP Tunnel Endpoint 9.2.1 | SgNB endpoint of the S1 transport bearer. For delivery of DL PDUs. | — | — |
| >>>>>DL Forwarding GTP Tunnel Endpoint | O | | GTP Tunnel Endpoint 9.2.1 | Identifies the X2 transport bearer used for forwarding of DL PDUs | — | — |
| >>>>>UL Forwarding GTP Tunnel Endpoint | O | | GTP Tunnel Endpoint 9.2.1 | Identifies the X2 transport bearer used for forwarding of UL PDUs | — | — |
| >>>>Split Bearer | | | | | | |
| >>>>>E-RAB ID | M | | 9.2.23 | | — | — |
| >>>>>SgNB GTP Tunnel Endpoint | M | | GTP Tunnel Endpoint 9.2.1 | Endpoint of the X2 transport bearer at the SgNB. | — | — |
| >>>>SCG Split Bearer | | | | | | |
| >>>>>E-RAB ID | M | | 9.2.23 | | — | — |
| >>>>>S1 DL GTP Tunnel Endpoint | M | | GTP Tunnel Endpoint 9.2.1 | SgNB endpoint of the S1 transport bearer. For |  |  |

| IE/Group Name | Presence | Range | IE type and reference | Semantics description | Criticality | Assigned Criticality |
|---|---|---|---|---|---|---|
| >>>>>SgNB GTP Tunnel Endpoint | M | | GTP Tunnel Endpoint 9.2.1 | delivery of DL PDUs. SgNB endpoint of the X2 transport bearer. For delivery of UL PDUs. | — | — |
| >>>>>DL Forwarding GTP Tunnel Endpoint | O | | GTP Tunnel Endpoint 9.2.1 | Identifies the X2 transport bearer used for forwarding of DL PDUs. | — | — |
| >>>>>UL Forwarding GTP Tunnel Endpoint | O | | GTP Tunnel Endpoint 9.2.1 | Identifies the X2 transport bearer used for forwarding of UL PDUs. | — | — |
| >>>>>E-RAB Level QoS Parameters | M | | 9.2.9 | Includes necessary QoS parameters for the MCG part | — | — |
| >E-RABs Admitted To Be Modified List | | 0 . . . 1 | | | — | — |
| >>E-RABs Admitted To Be Modified Item | | 1 . . . <maxnoofBearers> | | | EACH | ignore |
| >>>CHOICE Bearer Option | M | | | | | |
| >>>>SCG Bearer | | | | | | |
| >>>>>E-RAB ID | M | | 9.2.23 | | | |
| >>>>>S1 DL GTP Tunnel Endpoint | O | | GTP Tunnel Endpoint 9.2.1 | SgNB endpoint of the S1 transport bearer. For delivery of DL PDUs. | — | — |
| >>>>Split Bearer | | | | | | |
| >>>>>E-RAB ID | M | | 9.2.23 | | | |
| >>>>>SgNB GTP Tunnel Endpoint | O | | GTP Tunnel Endpoint 9.2.1 | Endpoint of the X2 transport bearer at the SgNB. | — | — |
| >>>>SCG Split Bearer | | | | | | |
| >>>>>E-RAB ID | M | | 9.2.23 | | | |
| >>>>>S1 DL GTP Tunnel Endpoint | M | | GTP Tunnel Endpoint 9.2.1 | SgNB endpoint of the S1 transport bearer. For delivery of DL PDUs. | — | — |
| >>>>>SgNB GTP Tunnel Endpoint | M | | GTP Tunnel Endpoint 9.2.1 | SgNB endpoint of the X2 transport bearer. For delivery of UL PDUs. | — | — |
| >>>>>E-RAB Level QoS Parameters | O | | 9.2.9 | Includes necessary QoS | — | — |

| IE/Group Name | Presence | Range | IE type and reference | Semantics description | Criticality | Assigned Criticality |
|---|---|---|---|---|---|---|
| | | | | parameters for the MCG part. | | |
| >E-RABs Admitted To Be Released List | | 0 . . . 1 | | | — | — |
| >>E-RABs Admitted To Be Released Item | | 1 . . . <maxnoofBearers> | | | EACH | ignore |
| >>>CHOICE Bearer Option | M | | | | | |
| >>>>SCG Bearer | | | | | | |
| >>>>>E-RAB ID | M | | 9.2.23 | | — | — |
| >>>>Split Bearer | | | | | | |
| >>>>>E-RAB ID | M | | 9.2.23 | | — | — |
| >>>>SCG Split Bearer | | | | | | |
| >>>>>E-RAB ID | M | | 9.2.23 | | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |
| SgNB to MeNB Container | O | | OCTET STRING | Includes the NR RRCConnectionReconfiguration message (NR RRC message name is FFS) as defined in TS 38.331 [xx]. | YES | ignore |
| Criticality Diagnostics | O | | 9.2.7 | | YES | ignore |
| MeNB UE X2AP ID Extension | O | | Extended eNB UE X2AP ID 9.2.86 | Allocated at the MeNB | YES | ignore |
| SgNB UE X2AP ID Extension | O | | Extended gNB UE X2AP ID 9.2.XY | Allocated at the SgNB | YES | Ignore |
| SgNB Resource Coordination Information | | 0 . . . 1 | | Information used to coordinate resources utilisation between SgNB and MeNB | EACH | ignore |
| > NR-CGI | M | | 9.2.bb | | — | — |
| >UL Coordination Information | M | | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable | — | — |

-continued

| IE/Group Name | Presence | Range | IE type and reference | Semantics description | Criticality | Assigned Criticality |
|---|---|---|---|---|---|---|
| | | | | only in positions corresponding to UL subframes. The bit string may span across multiple contiguous subframes (maximum 40). The first position of the UL Coordination Information corresponds to the receiving node's subframe 0 in a receiving node's radio frame where SFN = 0. The length of the bit string is an integer multiple of $N_{RB}^{DL}$. $N_{RB}^{DL}$ is defined in TS 36.211 [10]. The UL Coordination Information is continuously repeated. | | |
| >DL Coordination Information | M | | BIT STRING (6 ... 4400, ...) | Each position in the bitmap represents a PRB in a subframe; value "0" indicates "resource not intended to be used for transmission", value "1" indicates "resource intended to be used for transmission". Each position is applicable only in positions corresponding to DL subframes. The bit string may span across multiple contiguous subframes (maximum 40). The first position of the DL Coordination Information corresponds to the receiving node's subframe 0 in a receiving node's radio | — | — |

| IE/Group Name | Presence | Range | IE type and reference | Semantics description | Criticality | Assigned Criticality |
|---|---|---|---|---|---|---|
| >Resource Coordination Type | M | | BITSTRING (SIZE(32)) | frame where SFN = 0. The length of the bit string is an integer multiple of $N_{RB}^{DL}$. $N_{RB}^{DL}$ is defined in TS 36.211 [10]. The DL Coordination Information is continuously repeated. Each position in the bitmap indicates a type of intended coordination. First Bit = Single Tx Coordination, Second Bit = Harmonic Interference Coordination, Third Bit = Single Tx and Harmonic Interference Coordination. Other bits shall be ignored | | |

| Range bound | Explanation |
|---|---|
| maxnoofBearers | Maximum no. of E-RABs. Value is 256 |

This message is sent by the SgNB to inform the MeNB that the MeNB initiated SgNB Modification Preparation has failed.

Direction: SgNB→MeNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SgNB UE X2AP ID | M | | gNB UE X2AP ID 9.2.XX | Allocated at the SgNB | YES | ignore |
| Cause | M | | 9.2.6 | | YES | ignore |
| Criticality Diagnostics | O | | 9.2.7 | | YES | ignore |
| MeNB UE X2AP ID Extension | O | | Extended eNB UE X2AP ID 9.2.86 | Allocated at the MeNB | YES | ignore |
| SgNB UE X2AP ID Extension | O | | Extended gNB UE X2AP ID 9.2.XY | Allocated at the SgNB | YES | ignore |

9.1.X.8 SGNB Modification Required
This message is sent by the SgNB to the MeNB to request the modification of SgNB resources for a specific UE.
    Direction: SgNB→MeNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SgNB UE X2AP ID | M | | gNB UE X2AP ID 9.2.XX | Allocated at the SgNB | YES | reject |
| Cause | M | | 9.2.6 | | YES | ignore |
| SCG Change Indication | O | | 9.2.73 | | YES | ignore |
| E-RABs To Be Released List | | 0 ... 1 | | | YES | ignore |
| >E-RABs To Be Released Item | | 1 ... <maxnoofBearers> | | | EACH | ignore |
| >>E-RAB ID | M | | 9.2.23 | | — | — |
| >>Cause | M | | 9.2.6 | | — | — |
| SgNB to MeNB Container | O | | OCTET STRING | Includes the NR RRCConnectionReconfiguration message (NR RRC message name is FFS) as defined in TS 38.331 [xx]. | YES | ignore |
| MeNB UE X2AP ID Extension | O | | Extended eNB UE X2AP ID 9.2.86 | Allocated at the MeNB | YES | reject |
| SgNB UE X2AP ID Extension | O | | Extended gNB UE X2AP ID 9.2.XY | Allocated at the SgNB | YES | reject |
| E-RABs To Be Modified List | | 0 ... 1 | | | YES | ignore |
| >E-RABs To Be Modified Item | | 1 ... <maxnoofBearers> | | | EACH | ignore |
| >>CHOICE Bearer Option | M | | | | | |
| >>>SCG Split Bearer | | | | | | |
| >>>>E-RAB ID | M | | 9.2.23 | | — | — |
| >>>>E-RAB Level QoS Parameters | O | | 9.2.9 | Includes necessary QoS parameters for the MCG part | — | — |
| SgNB Resource Coordination Information | | 0 ... 1 | | Information used to coordinate resources utilisation between SgNB and MeNB | EACH | ignore |
| >NR-CGI | M | | 9.2.bb | | — | — |
| >UL Coordination Information | M | | BIT STRING (6 ... 4400, ...) | Each position in the bitmap represents a PRB in a subframe; value "0" indicates "resource not intended to be used for transmission", value "1" indicates "resource intended | — | — |

-continued

| IE/Group Name | Presence | Range | IE type and reference | Semantics description | Criticality | Assigned Criticality |
|---|---|---|---|---|---|---|
| | | | | to be used for transmission". Each position is applicable only in positions corresponding to UL subframes. The bit string may span across multiple contiguous subframes (maximum 40). The first position of the UL Coordination Information corresponds to the receiving node's subframe 0 in a receiving node's radio frame where SFN = 0. The length of the bit string is an integer multiple of $N_{RB}^{DL}$. $N_{RB}^{DL}$ is defined in TS 36.211 [10]. The UL Coordination Information is continuously repeated. | | |
| >DL Coordination Information | M | | BIT STRING (6 . . . 4400, . . .) | Each position in the bitmap represents a PRB in a subframe; value "0" indicates "resource not intended to be used for transmission", value "1" indicates "resource intended to be used for transmission". Each position is applicable only in positions corresponding to DL subframes. The bit string may span across multiple contiguous subframes (maximum 40). The first position of the DL Coordination Information corresponds to the receiving node's subframe 0 in a receiving node's radio | — | — |

| IE/Group Name | Presence | Range | IE type and reference | Semantics description | Criticality | Assigned Criticality |
|---|---|---|---|---|---|---|
| >Resource Coordination Type | M | | BITSTRING (SIZE(32)) | frame where SFN = 0. The length of the bit string is an integer multiple of $N_{RB}^{DL}$. $N_{RB}^{DL}$ is defined in TS 36.211 [10]. The DL Coordination Information is continuously repeated. Each position in the bitmap indicates a type of intended coordination. First Bit = Single Tx Coordination, Second Bit = Harmonic Interference Coordination, Third Bit = Single Tx and Harmonic Interference Coordination. Other bits shall be ignored | | |

| Range bound | Explanation |
|---|---|
| maxnoofBearers | Maximum no. of E-RABs. Value is 256 |

9.1.X.9 SGNB Modification Confirm

This message is sent by the MeNB to inform the SgNB about the successful modification.

Direction: MeNB→SgNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SgNB UE X2AP ID | M | | gNB UE X2AP ID 9.2.XX | Allocated at the SgNB | YES | ignore |
| MeNB to SgNB Container | O | | OCTET STRING | Includes the NR RRCConnectionReconfigurationComplete message (NR RRC message name is FFS) as defined in TS 38.331 [xx]. Editor's Note: to be checked with RAN2 | YES | ignore |
| Criticality Diagnostics | O | | 9.2.7 | | YES | ignore |
| MeNB UE X2AP ID Extension | O | | Extended eNB UE X2AP ID 9.2.86 | Allocated at the MeNB | YES | ignore |
| SgNB UE X2AP ID Extension | O | | Extended gNB UE X2AP ID 9.2.XY | Allocated at the SgNB | YES | ignore |

-continued

| IE/Group Name | Presence | Range | IE type and reference | Semantics description | Criticality | Assigned Criticality |
|---|---|---|---|---|---|---|
| MeNB Resource Coordination Information | | 0 . . . 1 | | Information used to coordinate resources utilisation between MeNB and SgNB | EACH | ignore |
| >EUTRA Cell ID | M | | ECGI 9.2.14 | | — | — |
| >UL Coordination Information | M | | BIT STRING (6 . . . 4400, . . .) | Each position in the bitmap represents a PRB in a subframe; value "0" indicates "resource not intended to be used for transmission", value "1" indicates "resource intended to be used for transmission Each position is applicable only in positions corresponding to UL subframes. The bit string may span across multiple contiguous subframes (maximum 40). The first position of the UL Coordination Information corresponds to subframe 0 in a radio frame where SFN = 0. The length of the bit string is an integer multiple of $N_{RB}^{DL}$. $N_{RB}^{DL}$ is defined in TS 36.211 [10]. The UL Coordination Information is continuously repeated. | — | — |
| >Resource Coordination Type | M | | BITSTRING (SIZE(32)) | Each position in the bitmap indicates a type of intended coordination. First Bit = Single Tx Coordination, Second Bit = Harmonic Interference Coordination, Third Bit = Single Tx and Harmonic Interference Coordination. | | |

| IE/Group Name | Presence | Range | IE type and reference | Semantics description | Criticality | Assigned Criticality |
|---|---|---|---|---|---|---|
| | | | | Other bits shall be ignored | | |

| Range bound | Explanation |
|---|---|
| maxnoofBearers | Maximum no. of E-RABs. Value is 256 |

----------------------------------------there is a fifth Change---------------------
------------------

9.2.aa SCG Configuration Query

The SCG Configuration Query IE is used to request the SgNB to provide current SCG configuration.

| IE/Group Name | Presence | Range | IE Type and Reference | Semantics Description |
|---|---|---|---|---|
| SCG Configuration Query | M | | ENUMERATED (True, . . .) | |

9.2.bb NR-CGI

The NR Cell Global Identifier (NR-CGI) is used to globally identify a NR cell (see TS 38.401 [xx]).

| IE/Group Name | Presence | Range | IE type and reference | Semantics description | Criticality | Assigned Criticality |
|---|---|---|---|---|---|---|
| PLMN Identity | M | | 9.2.4 | | — | — |
| NR Cell Identifier | M | | BIT STRING (36) | The leftmost bits of the NR Cell Identifier IE value correspond to the value of the en-gNB ID IE contained in the Global en-gNB ID IE (defined in section xxxxxx) identifying the en-gNB that controls the cell. | — | — |

-- 9.3.4 PDU Definitions

```
--
*********************************************************
--
-- PDU definitions for X2AP.
--
--
*********************************************************

X2AP-PDU-Contents {
itu-t (0) identified-organization (4) etsi (0) mobileDomain (0)
eps-Access (21) modules (3) x2ap (2) version1 (1) x2ap-
PDU-Contents (1) }

DEFINITIONS AUTOMATIC TAGS ::=

BEGIN

--
*********************************************************
--
-- IE parameter types from other modules.
--
--
*********************************************************

IMPORTS
   ABSInformation,
   ABS-Status,
   AS-SecurityInformation,
   BearerType,
   Cause,
   CompositeAvailableCapacityGroup,
   Correlation-ID,
   COUNTvalue,
   CellReportingIndicator,
   CriticalityDiagnostics,
   CRNTI,
   CSGMembershipStatus,
   CSG-Id,
```

DeactivationIndication,
DL-Forwarding,
DynamicDLTransmissionInformation,
ECGI,
E-RAB-ID,
E-RAB-Level-QoS-Parameters,
E-RAB-List,
EUTRANTraceID,
GlobalENB-ID,
GTPtunnelEndpoint,
GUGroupIDList,
GUMMEI,
HandoverReportType,
HandoverRestrictionList,
Masked-IMEISV,
InvokeIndication,
LocationReportingInformation,
MDT-Configuration,
ManagementBasedMDTallowed,
MDTPLMNList,
Neighbour-Information,
PCI,
PDCP-SN,
PLMN-Identity,
ReceiveStatusofULPDCPSDUs,
Registration-Request,
RelativeNarrowbandTxPower,
RadioResourceStatus,
RRCConnReestabIndicator,
RRCConnSetupIndicator,
UE-RLF-Report-Container,
RRC-Context,
ServedCell-Information,
ServedCells,
ShortMAC-I,
SRVCCOperationPossible,
SubscriberProfileIDforRFP,
TargetCellInUTRAN,
TargeteNBtoSource-eNBTransparentContainer,
TimeToWait,
TraceActivation,
TraceDepth,
TransportLayerAddress,
UEAggregateMaximumBitRate,
UE-HistoryInformation,
UE-HistoryInformationFromTheUE,
UE-S1AP-ID,
UESecurityCapabilities, UE-X2AP-ID,
UL-HighInterferenceIndicationInfo,
UL-InterferenceOverloadIndication,
HWLoadIndicator,
S1TNLLoadIndicator,
Measurement-ID,
ReportCharacteristics,
MobilityParametersInformation,
MobilityParametersModificationRange,
ReceiveStatusOfULPDCPSDUsExtended,
COUNTValueExtended,
SubframeAssignment,
ExtendedULInterferenceOverloadInfo,
ExpectedUEBehaviour,
SeNBSecurityKey,
MeNBtoSeNBContainer,
SeNBtoMeNBContainer,
SCGChangeIndication,
CoMPInformation,
ReportingPeriodicityRSRPMR,
RSRPMRList,
UE-RLF-Report-Container-for-extended-bands,
ProSeAuthorized,
CoverageModificationList,
ReportingPeriodicityCSIR,
CSIReportList,
ReceiveStatusOfULPDCPSDUsPDCP-SNlength18,
COUNTvaluePDCP-SNlength18,
LHN-ID,
UE-ContextKeptIndicator,
UE-X2AP-ID-Extension,
SIPTOBearerDeactivationIndication,
TunnelInformation,
V2XServicesAuthorized,
X2BenefitValue,
ResumeID,
EUTRANCellIdentifier,
MakeBeforeBreakIndicator,
WTID,
WT-UE-XwAP-ID,
UESidelinkAggregateMaximumBitRate,
SgNBSecurityKey,
MeNBtoSgNBContainer,
SgNBtoMeNBContainer,
MCGSplitSRBs,
RRCContainer,
SRBType,
GNB-ID,

```
SCGConfigurationQuery,
MCGSplitSRB,
UENRMeasurement,
MeNBResourceCoordinationInformation,
SgNBResourceCoordinationInformation FROM X2AP-IEs PrivateIE-Container{},
    ProtocolExtensionContainer{},
    ProtocolIE-Container{},
    ProtocolIE-ContainerList{},
    ProtocolIE-ContainerPair{},
    ProtocolIE-ContainerPairList{},
    ProtocolIE-Single-Container{},
    X2AP-PRIVATE-IES,
    X2AP-PROTOCOL-EXTENSION,
    X2AP-PROTOCOL-IES,
    X2AP-PROTOCOL-IES-PAIR
FROM X2AP-Containers id-ABSInformation,
    id-ActivatedCellList,
    id-BearerType,
    id-Cause,
    id-CellInformation,
    id-CellInformation-Item,
    id-CellMeasurementResult,
    id-CellMeasurementResult-Item,
    id-CellToReport,
    id-CellToReport-Item,
    id-CompositeAvailableCapacityGroup,
    id-CriticalityDiagnostics,
    id-DeactivationIndication,
    id-DynamicDLTransmissionInformation,
    id-E-RABs-Admitted-Item,
    id-E-RABs-Admitted-List,
    id-E-RABs-NotAdmitted-List,
    id-E-RABs-SubjectToStatusTransfer-List,
    id-E-RABs-SubjectToStatusTransfer-Item,
    id-E-RABs-ToBeSetup-Item,
    id-GlobalENB-ID,
    id-GUGroupIDList,
    id-GUGroupIDToAddList,
    id-GUGroupIDToDeleteList,
    id-GUMMEI-ID,
```

```
id-Masked-IMEISV,
id-InvokeIndication,
id-New-eNB-UE-X2AP-ID,
id-Old-eNB-UE-X2AP-ID,
id-Registration-Request,
id-ReportingPeriodicity,
id-ServedCells,
id-ServedCellsToActivate,
id-ServedCellsToAdd,
id-ServedCellsToModify,
id-ServedCellsToDelete,
id-SRVCCOperationPossible,
id-TargetCell-ID,
id-TargeteNBtoSource-eNBTransparentContainer,
id-TimeToWait,
id-TraceActivation,
id-UE-ContextInformation,
id-UE-HistoryInformation,
id-UE-X2AP-ID,
id-Measurement-ID,
id-ReportCharacteristics,
id-ENB1-Measurement-ID,
id-ENB2-Measurement-ID,
id-ENB1-Cell-ID,
id-ENB2-Cell-ID,
id-ENB2-Proposed-Mobility-Parameters,
id-ENB1-Mobility-Parameters,
id-ENB2-Mobility-Parameters-Modification-Range,
id-FailureCellPCI,
id-Re-establishmentCellECGI,
id-FailureCellCRNTI,
id-ShortMAC-I,
id-SourceCellECGI,
id-FailureCellECGI,
id-HandoverReportType,
id-UE-RLF-Report-Container,
id-PartialSuccessIndicator,
id-MeasurementInitiationResult-List,
id-MeasurementInitiationResult-Item,
id-MeasurementFailureCause-Item,
id-CompleteFailureCauseInformation-List,
id-CompleteFailureCauseInformation-Item,
id-CSGMembershipStatus,
id-CSG-Id,
id-MDTConfiguration,
id-ManagementBasedMDTallowed,
id-ABS-Status,
id-RRCConnSetupIndicator,
``` id-RRCConnReestabIndicator,
id-TargetCellInUTRAN,
id-MobilityInformation,
id-SourceCellCRNTI,
id-ManagementBasedMDTPLMNList,
id-ReceiveStatusOfULPDCPSDUsExtended,
id-ULCOUNTValueExtended,
id-DLCOUNTValueExtended,
id-IntendedULDLConfiguration,
id-ExtendedULInterferenceOverloadInfo,
id-RNL-Header,
id-x2APMessage,
id-UE-HistoryInformationFromTheUE,
id-ExpectedUEBehaviour,
id-MeNB-UE-X2AP-ID,
id-SeNB-UE-X2AP-ID,
id-UE-SecurityCapabilities,
id-SeNBSecurityKey,
id-SeNBUEAggregateMaximumBitRate,
id-ServingPLMN,
id-E-RABs-ToBeAdded-List,
id-E-RABs-ToBeAdded-Item,
id-MeNBtoSeNBContainer,
id-E-RABs-Admitted-ToBeAdded-List,
id-E-RABs-Admitted-ToBeAdded-Item,
id-SeNBtoMeNBContainer,
id-ResponseInformationSeNBReconfComp,
id-UE-ContextInformationSeNBModReq,
id-E-RABs-ToBeAdded-ModReqItem,
id-E-RABs-ToBeModified-ModReqItem,
id-E-RABs-ToBeReleased-ModReqItem,
id-E-RABs-Admitted-ToBeAdded-ModAckList,
id-E-RABs-Admitted-ToBeModified-ModAckList,
id-E-RABs-Admitted-ToBeReleased-ModAckList,
id-E-RABs-Admitted-ToBeAdded-ModAckItem,
id-E-RABs-Admitted-ToBeModified-ModAckItem,
id-E-RABs-Admitted-ToBeReleased-ModAckItem,
id-SCGChangeIndication,
id-E-RABs-ToBeReleased-ModReqd,
id-E-RABs-ToBeReleased-ModReqdItem,
id-E-RABs-ToBeReleased-List-RelReq,
id-E-RABs-ToBeReleased-RelReqItem,
id-E-RABs-ToBeReleased-List-RelConf,
id-E-RABs-ToBeReleased-RelConfItem,
id-E-RABs-SubjectToCounterCheck-List,
id-E-RABs-SubjectToCounterCheckItem,
id-CoMPInformation,
id-ReportingPeriodicityRSRPMR,

```
id-RSRPMRList,
id-UE-RLF-Report-Container-for-extended-bands,
id-ProSeAuthorized,
id-CoverageModificationList,
id-ReportingPeriodicityCSIR,
id-CSIReportList,
id-ReceiveStatusOfULPDCPSDUsPDCP-SNlength18,
id-ULCOUNTValuePDCP-SNlength18,
id-DLCOUNTValuePDCP-SNlength18,
id-LHN-ID,
id-Correlation-ID,
id-SIPTO-Correlation-ID,
id-UE-ContextReferenceAtSeNB,
id-UE-ContextReferenceAtWT,
id-UE-ContextKeptIndicator,
id-WT-UE-ContextKeptIndicator,
id-New-eNB-UE-X2AP-ID-Extension,
id-Old-eNB-UE-X2AP-ID-Extension,
id-MeNB-UE-X2AP-ID-Extension,
id-SeNB-UE-X2AP-ID-Extension,
id-SIPTO-BearerDeactivationIndication,
id-Tunnel-Information-for-BBF,
id-SIPTO-L-GW-TransportLayerAddress,
id-GW-TransportLayerAddress,
id-X2RemovalThreshold,
id-CellReportingIndicator,
id-V2XServicesAuthorized,
id-resumeID,
id-UE-ContextInformationRetrieve,
id-E-RABs-ToBeSetupRetrieve-Item,
id-NewEUTRANCellIdentifier,
id-MakeBeforeBreakIndicator,
id-UESidelinkAggregateMaximumBitRate,
id-uL-GTPtunnelEndpoint,
id-SgNBSecurityKey,
id-SgNBUEAggregateMaximumBitRate,
id-E-RABs-ToBeAdded-SgNBAddReqList,
id-MeNBtoSgNBContainer,
id-SgNB-UE-X2AP-ID,
id-SgNB-UE-X2AP-ID-Extension,
id-RequestedMCGSplitSRBs,
id-E-RABs-ToBeAdded-SgNBAddReq-Item,
id-E-RABs-Admitted-ToBeAdded-SgNBAddResList,
id-SgNBtoMeNBContainer,
id-AdmittedMCGSplitSRBs ,
id-E-RABs-Admitted-ToBeAdded-SgNBAddRes-Item,
id-ResponseInformationSgNBReconfComp,
id-UE-ContextInformation-SgNBModReq,
``` id-E-RABs-ToBeAdded-SgNBModReq-Item,
id-E-RABs-ToBeModified-SgNBModReq-Item,
id-E-RABs-ToBeReleased-SgNBModReq-Item,
id-E-RABs-Admitted-ToBeAdded-SgNBModAckList,
id-E-RABs-Admitted-ToBeModified-SgNBModAckList
id-E-RABs-Admitted-ToBeReleased-SgNBModAckList
id-E-RABs-Admitted-ToBeAdded-SgNBModAck-Item,
id-E-RABs-Admitted-ToBeModified-SgNBModAck-Item
id-E-RABs-Admitted-ToBeReleased-SgNBModAck-Item
id-E-RABs-ToBeReleased-SgNBModReqdList,
id-E-RABs-ToBeModified-SgNBModReqdList,
id-E-RABs-ToBeReleased-SgNBModReqd-Item,
id-E-RABs-ToBeModified-SgNBModReqd-Item,
id-E-RABs-ToBeReleased-SgNBChaConfList,
id-E-RABs-ToBeReleased-SgNBChaConf-Item,
id-E-RABs-ToBeReleased-SgNBRelReqList,
id-E-RABs-ToBeReleased-SgNBRelReq-Item,
id-E-RABs-ToBeReleased-SgNBRelConfList,
id-E-RABs-ToBeReleased-SgNBRelConf-Item,
id-E-RABs-SubjectToSgNBCounterCheck-List,
id-E-RABs-SubjectToSgNBCounterCheck-Item,
id-Target-SgNB-ID,
id-RRCContainer,
id-SRBType,
id-HandoverRestrictionList,
id-SCGConfigurationQuery,
id-MCGSplitSRB,
id-UENRMeasurement,
id-InitiatingNodeType-EndcX2Setup,
id-InitiatingNodeType-EndcConfigUpdate,
id-RespondingNodeType-EndcX2Setup,
id-RespondingNodeType-EndcConfigUpdate,
id-MeNBResourceCoordinationInformation,
id-SgNBResourceCoordinationInformation maxCellineNB,
maxnoofBearers,
maxnoofPDCP-SN,
maxFailedMeasObjects,
maxnoofCellIDforMDT,
maxnoofTAforMDT ------------Oh yes, a seventh Change-----------------

[Unchanged text skipped]

-- ********************************************************
--
-- SGNB ADDITION REQUEST
--
-- ********************************************************

```
SgNBAdditionRequest ::= SEQUENCE {
    protocolIEs     ProtocolIE-Container  {{SgNBAdditionRequest-IEs}},
    ...
}

SgNBAdditionRequest-IEs X2AP-PROTOCOL-IES ::= {
    { ID id-MeNB-UE-X2AP-ID                         CRITICALITY reject   TYPE UE-X2AP-ID                                     PRESENCE mandatory}|
    { ID id-UE-SecurityCapabilities                 CRITICALITY reject   TYPE UESecurityCapabilities                         PRESENCE conditional}|
    -- This IE shall be present if the Bearer Option IE is set to the value "SCG bearer" or "SCG split bearer" --
    { ID id-SgNBSecurityKey                         CRITICALITY reject   TYPE SgNBSecurityKey                                PRESENCE conditional}|
    -- This IE shall be present if the Bearer Option IE is set to the value "SCG bearer" or "SCG split bearer"--
    { ID id-SgNBUEAggregateMaximumBitRate           CRITICALITY reject   TYPE UEAggregateMaximumBitRate                      PRESENCE mandatory}|
    { ID id-ServingPLMN                             CRITICALITY ignore   TYPE PLMN-Identity                                  PRESENCE optional}|
    { ID id-HandoverRestrictionList                 CRITICALITY ignore   TYPE HandoverRestrictionList                        PRESENCE optional}|
    { ID id-E-RABs-ToBeAdded-SgNBAddReqList         CRITICALITY reject   TYPE E-RABs-ToBeAdded-SgNBAddReqList                PRESENCE mandatory}|
    { ID id-MeNBtoSgNBContainer                     CRITICALITY reject   TYPE MeNBtoSgNBContainer                            PRESENCE mandatory}|
    { ID id-CSGMembershipStatus                     CRITICALITY reject   TYPE CSGMembershipStatus                            PRESENCE optional}|
    { ID id-SgNB-UE-X2AP-ID                         CRITICALITY reject   TYPE UE-X2AP-ID                                     PRESENCE optional}|
    { ID id-SgNB-UE-X2AP-ID-Extension               CRITICALITY reject   TYPE UE-X2AP-ID-Extension                           PRESENCE optional}|
    { ID id-ExpectedUEBehaviour                     CRITICALITY ignore   TYPE ExpectedUEBehaviour                            PRESENCE optional}|
    { ID id-MeNB-UE-X2AP-ID-Extension               CRITICALITY reject   TYPE UE-X2AP-ID-Extension                           PRESENCE optional}|
    { ID id-RequestedMCGsplitSRBs                   CRITICALITY reject   TYPE MCGSplitSRBs                                   PRESENCE optional}|
    { ID id-MeNBResourceCoordinationInformation     CRITICALITY ignore   TYPE MeNBResourceCoordinationInformation PRESENCE optional},
    ...
}
```

[Unchanged text skipped]

-- ********************************************************
--
-- SGNB ADDITION REQUEST ACKNOWLEDGE
--
-- ********************************************************

```
SgNBAdditionRequestAcknowledge ::= SEQUENCE {
    protocolIEs     ProtocolIE-Container      {{SgNBAdditionRequestAcknowledge-IEs}},
    ...
}

SgNBAdditionRequestAcknowledge-IEs X2AP-PROTOCOL-IES ::= {
    { ID id-MeNB-UE-X2AP-ID                              CRITICALITY reject   TYPE UE-X2AP-ID                           PRESENCE mandatory}|
    { ID id-SgNB-UE-X2AP-ID                              CRITICALITY reject   TYPE UE-X2AP-ID                           PRESENCE mandatory}|
    { ID id-E-RABs-Admitted-ToBeAdded-SgNBAddResList     CRITICALITY ignore   TYPE E-RABs-Admitted-ToBeAdded-SgNBAddResList    PRESENCE mandatory}|
```

```
    { ID id-E-RABs-NotAdmitted-List              CRITICALITY ignore  TYPE E-
RAB-List                                             PRESENCE optional}|
    { ID id-SgNBtoMeNBContainer                  CRITICALITY reject  TYPE
SgNBtoMeNBContainer                                  PRESENCE mandatory}|
    { ID id-CriticalityDiagnostics               CRITICALITY ignore  TYPE
CriticalityDiagnostics                               PRESENCE optional}|
    { ID id-GW-TransportLayerAddress             CRITICALITY ignore  TYPE
TransportLayerAddress                                PRESENCE optional}|
    { ID id-MeNB-UE-X2AP-ID-Extension            CRITICALITY reject  TYPE UE-
X2AP-ID-Extension                           PRESENCE optional}|
    { ID id-SgNB-UE-X2AP-ID-Extension            CRITICALITY reject  TYPE UE-
X2AP-ID-Extension                           PRESENCE optional}|
    { ID id-Tunnel-Information-for-BBF           CRITICALITY ignore  TYPE
TunnelInformation                                    PRESENCE optional}|
    { ID id-AdmittedMCGSplitSRBs                 CRITICALITY reject  TYPE
MCGSplitSRBs                                         PRESENCE optional}|
    { ID id-SgNBResourceCoordinationInformation  CRITICALITY ignore  TYPE
SgNBResourceCoordinationInformation         PRESENCE optional,
    ...
}
```

[Unchanged text skipped]

```
-- **************************************************************
--
-- SGNB MODIFICATION REQUEST
--
-- **************************************************************

SgNBModificationRequest ::= SEQUENCE {
    protocolIEs     ProtocolIE-Container     {{ SgNBModificationRequest-IEs}},
    ...
}

SgNBModificationRequest-IEs X2AP-PROTOCOL-IES ::= {
    { ID id-MeNB-UE-X2AP-ID                      CRITICALITY reject  TYPE UE-X2AP-ID
                        PRESENCE mandatory}|
    { ID id-SgNB-UE-X2AP-ID                      CRITICALITY reject  TYPE UE-X2AP-ID
                        PRESENCE mandatory}|
    { ID id-Cause                                CRITICALITY ignore  TYPE Cause
                        PRESENCE mandatory}|
    { ID id-SCGChangeIndication                  CRITICALITY ignore  TYPE
SCGChangeIndication                         PRESENCE optional}|
    { ID id-ServingPLMN                          CRITICALITY ignore  TYPE PLMN-
Identity                                    PRESENCE optional}|
    { ID id-HandoverRestrictionList              CRITICALITY ignore  TYPE
HandoverRestrictionList                     PRESENCE optional}|
    { ID id-SCGConfigurationQuery                CRITICALITY ignore  TYPE
SCGConfigurationQuery                       PRESENCE optional}|
    { ID id-UE-ContextInformation-SgNBModReq     CRITICALITY reject  TYPE UE-
ContextInformation-SgNBModReq       PRESENCE optional}|
    { ID id-MeNBtoSgNBContainer                  CRITICALITY ignore  TYPE
MeNBtoSgNBContainer                         PRESENCE optional}|
    { ID id-MeNB-UE-X2AP-ID-Extension            CRITICALITY reject  TYPE UE-X2AP-ID-
Extension                           PRESENCE optional}|
    { ID id-SgNB-UE-X2AP-ID-Extension            CRITICALITY reject  TYPE UE-X2AP-ID-
Extension                           PRESENCE optional}|
    { ID id-MeNBResourceCoordinationInformation  CRITICALITY ignore  TYPE
MeNBResourceCoordinationInformation PRESENCE optional},
    ...
}
```

[Unchanged text skipped]

```
-- *************************************************************
--
-- SGNB MODIFICATION REQUEST ACKNOWLEDGE
--
-- *************************************************************

SgNBModificationRequestAcknowledge ::= SEQUENCE {
    protocolIEs     ProtocolIE-Container    {{SgNBModificationRequestAcknowledge-IEs}},
    ...
}

SgNBModificationRequestAcknowledge-IEs X2AP-PROTOCOL-IES ::= {
    { ID id-MeNB-UE-X2AP-ID                                 CRITICALITY ignore   TYPE UE-X2AP-ID                                                PRESENCE mandatory}|
    { ID id-SgNB-UE-X2AP-ID                                 CRITICALITY ignore   TYPE UE-X2AP-ID                                                PRESENCE mandatory}|
    { ID id-E-RABs-Admitted-ToBeAdded-SgNBModAckList        CRITICALITY ignore   TYPE E-RABs-Admitted-ToBeAdded-SgNBModAckList                  PRESENCE optional}|
    { ID id-E-RABs-Admitted-ToBeModified-SgNBModAckList     CRITICALITY ignore   TYPE E-RABs-Admitted-ToBeModified-SgNBModAckList               PRESENCE optional}|
    { ID id-E-RABs-Admitted-ToBeReleased-SgNBModAckList     CRITICALITY ignore   TYPE E-RABs-Admitted-ToBeReleased-SgNBModAckList               PRESENCE optional}|
    { ID id-E-RABs-NotAdmitted-List                         CRITICALITY ignore   TYPE E-RAB-List                                                PRESENCE optional}|
    { ID id-SgNBtoMeNBContainer                             CRITICALITY ignore   TYPE SgNBtoMeNBContainer                                       PRESENCE optional}|
    { ID id-CriticalityDiagnostics                          CRITICALITY ignore   TYPE CriticalityDiagnostics                                    PRESENCE optional}|
    { ID id-MeNB-UE-X2AP-ID-Extension                       CRITICALITY ignore   TYPE UE-X2AP-ID-Extension                                      PRESENCE optional}|
    { ID id-SgNB-UE-X2AP-ID-Extension                       CRITICALITY ignore   TYPE UE-X2AP-ID-Extension                                      PRESENCE optional}|
    { ID id-SgNBResourceCoordinationInformation             CRITICALITY ignore   TYPE SgNBResourceCoordinationInformation                       PRESENCE optional,
    ...
}
```

[Unchanged text skipped]

```
-- *************************************************************
--
-- SGNB MODIFICATION REQUIRED
--
-- *************************************************************

SgNBModificationRequired ::= SEQUENCE {
    protocolIEs     ProtocolIE-Container    {{SgNBModificationRequired-IEs}},
    ...
}

SgNBModificationRequired-IEs X2AP-PROTOCOL-IES ::= {
    { ID id-MeNB-UE-X2AP-ID                                 CRITICALITY reject   TYPE UE-X2AP-ID                PRESENCE mandatory}|
    { ID id-SgNB-UE-X2AP-ID                                 CRITICALITY reject   TYPE UE-X2AP-ID                PRESENCE mandatory}|
    { ID id-Cause                                           CRITICALITY ignore   TYPE Cause                     PRESENCE mandatory}|
    { ID id-SCGChangeIndication                             CRITICALITY ignore   TYPE SCGChangeIndication       PRESENCE optional}|
    { ID id-E-RABs-ToBeReleased-SgNBModReqdList             CRITICALITY ignore   TYPE E-RABs-ToBeReleased-SgNBModReqdList   PRESENCE optional}|
    { ID id-SgNBtoMeNBContainer                             CRITICALITY ignore   TYPE SgNBtoMeNBContainer       PRESENCE optional}|
    { ID id-MeNB-UE-X2AP-ID-Extension                       CRITICALITY reject   TYPE UE-X2AP-ID-Extension      PRESENCE optional}|
    { ID id-SgNB-UE-X2AP-ID-Extension                       CRITICALITY reject   TYPE UE-X2AP-ID-Extension      PRESENCE optional}|
```

```
    { ID id-E-RABs-ToBeModified-SgNBModReqdList     CRITICALITY ignore   TYPE E-RABs-
ToBeModified-SgNBModReqdList          PRESENCE optional}|
    { ID id-SgNBResourceCoordinationInformation    CRITICALITY ignore   TYPE
SgNBResourceCoordinationInformation    PRESENCE optional,
    ...
}
```

[Unchanged text skipped]

```
-- ****************************************************************
--
-- SGNB MODIFICATION CONFIRM
--
-- ****************************************************************

SgNBModificationConfirm ::= SEQUENCE {
    protocolIEs    ProtocolIE-Container    {{SgNBModificationConfirm-IEs}},
    ...
}

SgNBModificationConfirm-IEs X2AP-PROTOCOL-IES ::= {
    { ID id-MeNB-UE-X2AP-ID                        CRITICALITY ignore   TYPE UE-X2AP-ID
                 PRESENCE mandatory}|
    { ID id-SgNB-UE-X2AP-ID                        CRITICALITY ignore   TYPE UE-X2AP-ID
                 PRESENCE mandatory}|
    { ID id-MeNBtoSgNBContainer                    CRITICALITY ignore   TYPE
MeNBtoSgNBContainer         PRESENCE optional}|
    { ID id-CriticalityDiagnostics                 CRITICALITY ignore   TYPE
CriticalityDiagnostics         PRESENCE optional}|
    { ID id-MeNB-UE-X2AP-ID-Extension              CRITICALITY ignore   TYPE UE-X2AP-ID-
Extension          PRESENCE optional}|
    { ID id-SgNB-UE-X2AP-ID-Extension              CRITICALITY ignore   TYPE UE-X2AP-ID-
Extension          PRESENCE optional}|
    { ID id-MeNBResourceCoordinationInformation    CRITICALITY ignore   TYPE
MeNBResourceCoordinationInformation    PRESENCE optional},
    ...
}
```

[Unchanged text skipped]

END

-- 9.3.5   Information Element definitions

```
-- ****************************************************************
--
-- Information Element Definitions
--
-- ****************************************************************

X2AP-IEs {
itu-t (0) identified-organization (4) etsi (0) mobileDomain (0)
eps-Access (21) modules (3) x2ap (2) version1 (1) x2ap-IEs (2) }

DEFINITIONS AUTOMATIC TAGS ::=

BEGIN

IMPORTS id-E-RAB-Item,
    id-Number-of-Antennaports,
    id-MBSFN-Subframe-Info,
```

```
id-PRACH-Configuration,
id-CSG-Id,
id-MDTConfiguration,
id-SignallingBasedMDTPLMNList,
id-MultibandInfoList,
id-FreqBandIndicatorPriority,
id-NeighbourTAC,
id-Time-UE-StayedInCell-EnhancedGranularity,
id-MBMS-Service-Area-List,
id-HO-cause,
id-eARFCNExtension,
id-DL-EARFCNExtension,
id-UL-EARFCNExtension,
id-M3Configuration,
id-M4Configuration,
id-M5Configuration,
id-MDT-Location-Info,
id-NRrestriction,
id-AdditionalSpecialSubframe-Info,
id-UEID,
id-enhancedRNTP,
id-ProSeUEtoNetworkRelaying,
id-M6Configuration,
id-M7Configuration,
id-OffsetOfNbiotChannelNumberToDL-EARFCN,
id-OffsetOfNbiotChannelNumberToUL-EARFCN,
id-AdditionalSpecialSubframeExtension-Info,
id-BandwidthReducedSI,
id-extended-e-RAB-MaximumBitrateDL,
id-extended-e-RAB-MaximumBitrateUL,
id-extended-e-RAB-GuaranteedBitrateDL,
id-extended-e-RAB-GuaranteedBitrateUL,
id-extended-uEaggregateMaximumBitRateDownlink,
id-extended-uEaggregateMaximumBitRateUplink,
maxnoofBearers,
maxCellineNB,
maxEARFCN,
maxEARFCNPlusOne,
newmaxEARFCN,
maxInterfaces, maxnoofBands,
maxnoofBPLMNs,
maxnoofCells,
maxnoofEPLMNs,
maxnoofEPLMNsPlusOne,
maxnoofForbLACs,
maxnoofForbTACs,
maxnoofNeighbours,
maxnoofPRBs,
maxNrOfErrors,
maxPools,
maxnoofMBSFN,
maxnoofTAforMDT,
maxnoofCellIDforMDT,
maxnoofMBMSServiceAreaIdentities,
maxnoofMDTPLMNs,
maxnoofCoMPHypothesisSet,
maxnoofCoMPCells,
maxUEReport,
maxCellReport,
maxnoofPA,
maxCSIProcess,
maxCSIReport,
maxSubband FROM X2AP-Constants
```

[Unchanged text skipped]

-- M

[Unchanged text skipped]

```
MDTPLMNList ::= SEQUENCE (SIZE(1..maxnoofMDTPLMNs)) OF PLMN-Identity

MDT-Location-Info ::= BIT STRING (SIZE (8))

Measurement-ID  ::= INTEGER (1..4095, ...)

MeasurementsToActivate::= BIT STRING (SIZE (8))

MeasurementThresholdA2 ::= CHOICE {
    threshold-RSRP              Threshold-RSRP,
    threshold-RSRQ              Threshold-RSRQ,
    ...
}

MeNBResourceCoordinationInformation ::= SEQUENCE {
    eUTRA-Cell-ID               ECGI,
    uLCoordinationInformation   BIT STRING (SIZE(6..4400, ...)),
    resourceCoordinationType    BIT STRING (SIZE(32)),
    iE-Extensions               ProtocolExtensionContainer { {
MeNBResourceCoordinationInformationExtIEs} }         OPTIONAL,
    ...
}

MeNBResourceCoordinationInformationExtIEs X2AP-PROTOCOL-EXTENSION ::= {
    ...
}

MeNBtoSeNBContainer ::= OCTET STRING

MME-Group-ID    ::= OCTET STRING (SIZE (2))

MME-Code        ::= OCTET STRING (SIZE (1))
```

[Unchanged text skipped]

```
-- N
Neighbour-Information ::= SEQUENCE (SIZE (0..maxnoofNeighbours)) OF SEQUENCE {
    eCGI                    ECGI,
    pCI                     PCI,
    eARFCN                  EARFCN,
    iE-Extensions           ProtocolExtensionContainer { {Neighbour-Information-ExtIEs}
} OPTIONAL,
    ...
}

Neighbour-Information-ExtIEs X2AP-PROTOCOL-EXTENSION ::= {
    { ID id-NeighbourTAC      CRITICALITY ignore   EXTENSION TAC
    PRESENCE optional}|
    { ID id-eARFCNExtension   CRITICALITY reject   EXTENSION EARFCNExtension
    PRESENCE optional},
    ...
}

NextHopChainingCount ::= INTEGER (0..7)
```

```
NRCellIdentifier ::= BIT STRING (SIZE (36))

NR-CGI ::= SEQUENCE {
    pLMN-Identity          PLMN-Identity,
    nRcellIdentifier       NRCellIdentifier,
    iE-Extensions          ProtocolExtensionContainer { {NR-CGI-ExtIEs} }
OPTIONAL,
    ...
}

NR-CGI-ExtIEs X2AP-PROTOCOL-EXTENSION ::= {
    ...
}

Number-of-Antennaports ::= ENUMERATED {
        an1,
        an2,
        an4,
        ...
}

NRrestriction ::= ENUMERATED {
    nRrestricted,
    ...
}
```

[Unchanged text skipped]

[Unchanged text skipped]

-- S

[Unchanged text skipped]

```
ServedCells ::= SEQUENCE (SIZE (1.. maxCellineNB)) OF SEQUENCE {
    servedCellInfo         ServedCell-Information,
    neighbour-Info         Neighbour-Information            OPTIONAL,
    iE-Extensions          ProtocolExtensionContainer { {ServedCell-ExtIEs}
} OPTIONAL,
    ...
}

ServedCell-ExtIEs X2AP-PROTOCOL-EXTENSION ::= {
    ...
}

ServedCell-Information ::= SEQUENCE {
    pCI                PCI,
    cellId             ECGI,
    tAC                TAC,
    broadcastPLMNs     BroadcastPLMNs-Item,
    eUTRA-Mode-Info    EUTRA-Mode-Info,
    iE-Extensions      ProtocolExtensionContainer { {ServedCell-Information-ExtIEs}
} OPTIONAL,
    ...
}

ServedCell-Information-ExtIEs X2AP-PROTOCOL-EXTENSION ::= {
    { ID id-Number-of-Antennaports       CRITICALITY ignore   EXTENSION Number-of-
Antennaports                 PRESENCE optional}|
    { ID id-PRACH-Configuration          CRITICALITY ignore   EXTENSION PRACH-
Configuration                PRESENCE optional}|
    { ID id-MBSFN-Subframe-Info          CRITICALITY ignore   EXTENSION MBSFN-Subframe-
Infolist                     PRESENCE optional}|
```

```
    { ID id-CSG-Id                        CRITICALITY ignore   EXTENSION CSG-Id
                     PRESENCE optional}|
    { ID id-MBMS-Service-Area-List        CRITICALITY ignore   EXTENSION MBMS-Service-
Area-Identity-List   PRESENCE optional}|
    { ID id-MultibandInfoList             CRITICALITY ignore   EXTENSION
MultibandInfoList                         PRESENCE optional}|
    { ID id-FreqBandIndicatorPriority     CRITICALITY ignore   EXTENSION
FreqBandIndicatorPriority                 PRESENCE optional}|
    { ID id-BandwidthReducedSI            CRITICALITY ignore   EXTENSION
BandwidthReducedSI                        PRESENCE optional},
    ...
}

SgNBResourceCoordinationInformation ::= SEQUENCE {
    nR-CGI                     NR-CGI,
    ULCoordinationInformation  BIT STRING (SIZE(6..4400, ...)),
    DLCoordinationInformation  BIT STRING (SIZE(6..4400, ...)),
    resourceCoordinationType   BIT STRING (SIZE(32)),
    iE-Extensions              ProtocolExtensionContainer { {
SgNBResourceCoordinationInformationExtIEs} }            OPTIONAL,
    ...
}

SgNBResourceCoordinationInformationExtIEs X2AP-PROTOCOL-EXTENSION ::= {
    ...
}

SIPTOBearerDeactivationIndication ::= ENUMERATED {
    true,
    ...
}

ShortMAC-I ::= BIT STRING (SIZE(16))
```

[Unchanged text skipped]

```
-- Y
-- Z

END
```

-- 9.3.7   Constant definitions

```
-- ************************************************************
--
-- Constant definitions
--
-- ************************************************************

X2AP-Constants {
itu-t (0) identified-organization (4) etsi (0) mobileDomain (0)
eps-Access (21) modules (3) x2ap (2) version1 (1) x2ap-Constants (4) }

DEFINITIONS AUTOMATIC TAGS ::=

BEGIN
```

[Unchanged text skipped]

```
-- ************************************************************
--
-- Lists
--
-- ************************************************************
maxEARFCN                               INTEGER ::= 65535
maxEARFCNPlusOne                        INTEGER ::= 65536
newmaxEARFCN                            INTEGER ::= 262143
maxInterfaces                           INTEGER ::= 16
maxCellineNB                            INTEGER ::= 256
maxnoofBands                            INTEGER ::= 16
```

```
maxnoofBearers                              INTEGER ::= 256
maxNrOfErrors                               INTEGER ::= 256
maxnoofPDCP-SN                              INTEGER ::= 16
maxnoofEPLMNs                               INTEGER ::= 15
maxnoofEPLMNsPlusOne                        INTEGER ::= 16
maxnoofForbLACs                             INTEGER ::= 4096
maxnoofForbTACs                             INTEGER ::= 4096
maxnoofBPLMNs                               INTEGER ::= 6
maxnoofNeighbours                           INTEGER ::= 512
maxnoofPRBs                                 INTEGER ::= 110
maxPools                                    INTEGER ::= 16
maxnoofCells                                INTEGER ::= 16
maxnoofMBSFN                                INTEGER ::= 8
maxFailedMeasObjects                        INTEGER ::= 32
maxnoofCellIDforMDT                         INTEGER ::= 32
maxnoofTAforMDT                             INTEGER ::= 8
maxnoofMBMSServiceAreaIdentities            INTEGER ::= 256
maxnoofMDTPLMNs                             INTEGER ::= 16
maxnoofCoMPHypothesisSet                    INTEGER ::= 256
maxnoofCoMPCells                            INTEGER ::= 32
maxUEReport                                 INTEGER ::= 128
maxCellReport                               INTEGER ::= 9
maxnoofPA                                   INTEGER ::= 3
maxCSIProcess                               INTEGER ::= 4
maxCSIReport                                INTEGER ::= 2
maxSubband                                  INTEGER ::= 14

-- ***************************************************************
--
-- IEs
--
-- ***************************************************************
id-E-RABs-Admitted-Item
    ProtocolIE-ID ::= 0
id-E-RABs-Admitted-List
    ProtocolIE-ID ::= 1
id-E-RAB-Item
    ProtocolIE-ID ::= 2
id-E-RABs-NotAdmitted-List
    ProtocolIE-ID ::= 3
id-E-RABs-ToBeSetup-Item
    ProtocolIE-ID ::= 4
id-Cause
    ProtocolIE-ID ::= 5
id-CellInformation
    ProtocolIE-ID ::= 6
id-CellInformation-Item
    ProtocolIE-ID ::= 7
id-New-eNB-UE-X2AP-ID
    ProtocolIE-ID ::= 9
id-Old-eNB-UE-X2AP-ID
    ProtocolIE-ID ::= 10
id-TargetCell-ID
    ProtocolIE-ID ::= 11
id-TargeteNBtoSource-eNBTransparentContainer
    ProtocolIE-ID ::= 12
id-TraceActivation
    ProtocolIE-ID ::= 13
id-UE-ContextInformation
    ProtocolIE-ID ::= 14
id-UE-HistoryInformation
    ProtocolIE-ID ::= 15
id-UE-X2AP-ID
    ProtocolIE-ID ::= 16
id-CriticalityDiagnostics
    ProtocolIE-ID ::= 17
id-E-RABs-SubjectToStatusTransfer-List
    ProtocolIE-ID ::= 18
id-E-RABs-SubjectToStatusTransfer-Item
    ProtocolIE-ID ::= 19
id-ServedCells
    ProtocolIE-ID ::= 20
```

```
id-GlobalENB-ID
    ProtocolIE-ID ::= 21
id-TimeToWait
    ProtocolIE-ID ::= 22
id-GUMMEI-ID
    ProtocolIE-ID ::= 23
id-GUGroupIDList
    ProtocolIE-ID ::= 24
id-ServedCellsToAdd
    ProtocolIE-ID ::= 25
id-ServedCellsToModify
    ProtocolIE-ID ::= 26
id-ServedCellsToDelete
    ProtocolIE-ID ::= 27
id-Registration-Request
    ProtocolIE-ID ::= 28
id-CellToReport
    ProtocolIE-ID ::= 29
id-ReportingPeriodicity
    ProtocolIE-ID ::= 30
id-CellToReport-Item
    ProtocolIE-ID ::= 31
id-CellMeasurementResult
    ProtocolIE-ID ::= 32
id-CellMeasurementResult-Item
    ProtocolIE-ID ::= 33
id-GUGroupIDToAddList
    ProtocolIE-ID ::= 34
id-GUGroupIDToDeleteList
    ProtocolIE-ID ::= 35
id-SRVCCOperationPossible
    ProtocolIE-ID ::= 36
id-Measurement-ID
    ProtocolIE-ID ::= 37
id-ReportCharacteristics
    ProtocolIE-ID ::= 38
id-ENB1-Measurement-ID
    ProtocolIE-ID ::= 39
id-ENB2-Measurement-ID
    ProtocolIE-ID ::= 40
id-Number-of-Antennaports
    ProtocolIE-ID ::= 41
id-CompositeAvailableCapacityGroup
    ProtocolIE-ID ::= 42
id-ENB1-Cell-ID
    ProtocolIE-ID ::= 43
id-ENB2-Cell-ID
    ProtocolIE-ID ::= 44
id-ENB2-Proposed-Mobility-Parameters
    ProtocolIE-ID ::= 45
id-ENB1-Mobility-Parameters
    ProtocolIE-ID ::= 46
id-ENB2-Mobility-Parameters-Modification-Range
    ProtocolIE-ID ::= 47
id-FailureCellPCI
    ProtocolIE-ID ::= 48
id-Re-establishmentCellECGI
    ProtocolIE-ID ::= 49
id-FailureCellCRNTI
    ProtocolIE-ID ::= 50
id-ShortMAC-I
    ProtocolIE-ID ::= 51
id-SourceCellECGI
    ProtocolIE-ID ::= 52
id-FailureCellECGI
    ProtocolIE-ID ::= 53
id-HandoverReportType
    ProtocolIE-ID ::= 54
id-PRACH-Configuration
    ProtocolIE-ID ::= 55
id-MBSFN-Subframe-Info
    ProtocolIE-ID ::= 56
```

```
id-ServedCellsToActivate
    ProtocolIE-ID ::= 57
id-ActivatedCellList
    ProtocolIE-ID ::= 58
id-DeactivationIndication
    ProtocolIE-ID ::= 59
id-UE-RLF-Report-Container
    ProtocolIE-ID ::= 60
id-ABSInformation
    ProtocolIE-ID ::= 61
id-InvokeIndication
    ProtocolIE-ID ::= 62
id-ABS-Status
    ProtocolIE-ID ::= 63
id-PartialSuccessIndicator
    ProtocolIE-ID ::= 64
id-MeasurementInitiationResult-List
    ProtocolIE-ID ::= 65
id-MeasurementInitiationResult-Item
    ProtocolIE-ID ::= 66
id-MeasurementFailureCause-Item
    ProtocolIE-ID ::= 67
id-CompleteFailureCauseInformation-List
    ProtocolIE-ID ::= 68
id-CompleteFailureCauseInformation-Item
    ProtocolIE-ID ::= 69
id-CSG-Id
    ProtocolIE-ID ::= 70
id-CSGMembershipStatus
    ProtocolIE-ID ::= 71
id-MDTConfiguration
    ProtocolIE-ID ::= 72
id-ManagementBasedMDTallowed
    ProtocolIE-ID ::= 74
id-RRCConnSetupIndicator
    ProtocolIE-ID ::= 75
id-NeighbourTAC
    ProtocolIE-ID ::= 76
id-Time-UE-StayedInCell-EnhancedGranularity
    ProtocolIE-ID ::= 77
id-RRCConnReestabIndicator
    ProtocolIE-ID ::= 78
id-MBMS-Service-Area-List
    ProtocolIE-ID ::= 79
id-HO-cause
    ProtocolIE-ID ::= 80
id-TargetCellInUTRAN
    ProtocolIE-ID ::= 81
id-MobilityInformation
    ProtocolIE-ID ::= 82
id-SourceCellCRNTI
    ProtocolIE-ID ::= 83
id-MultibandInfoList
    ProtocolIE-ID ::= 84
id-M3Configuration
    ProtocolIE-ID ::= 85
id-M4Configuration
    ProtocolIE-ID ::= 86
id-M5Configuration
    ProtocolIE-ID ::= 87
id-MDT-Location-Info
    ProtocolIE-ID ::= 88
id-ManagementBasedMDTPLMNList
    ProtocolIE-ID ::= 89
id-SignallingBasedMDTPLMNList
    ProtocolIE-ID ::= 90
id-ReceiveStatusOfULPDCPSDUsExtended
    ProtocolIE-ID ::= 91
id-ULCOUNTValueExtended
    ProtocolIE-ID ::= 92
id-DLCOUNTValueExtended
    ProtocolIE-ID ::= 93
```

```
id-eARFCNExtension
    ProtocolIE-ID ::= 94
id-UL-EARFCNExtension
    ProtocolIE-ID ::= 95
id-DL-EARFCNExtension
    ProtocolIE-ID ::= 96
id-AdditionalSpecialSubframe-Info
    ProtocolIE-ID ::= 97
id-Masked-IMEISV
    ProtocolIE-ID ::= 98
id-IntendedULDLConfiguration
    ProtocolIE-ID ::= 99
id-ExtendedULInterferenceOverloadInfo
    ProtocolIE-ID ::= 100
id-RNL-Header
    ProtocolIE-ID ::= 101
id-x2APMessage
    ProtocolIE-ID ::= 102
id-ProSeAuthorized
    ProtocolIE-ID ::= 103
id-ExpectedUEBehaviour
    ProtocolIE-ID ::= 104
id-UE-HistoryInformationFromTheUE
    ProtocolIE-ID ::= 105
id-DynamicDLTransmissionInformation
    ProtocolIE-ID ::= 106
id-UE-RLF-Report-Container-for-extended-bands
    ProtocolIE-ID ::= 107
id-CoMPInformation
    ProtocolIE-ID ::= 108
id-ReportingPeriodicityRSRPMR
    ProtocolIE-ID ::= 109
id-RSRPMRList
    ProtocolIE-ID ::= 110
id-MeNB-UE-X2AP-ID
    ProtocolIE-ID ::= 111
id-SeNB-UE-X2AP-ID
    ProtocolIE-ID ::= 112
id-UE-SecurityCapabilities
    ProtocolIE-ID ::= 113
id-SeNBSecurityKey
    ProtocolIE-ID ::= 114
id-SeNBUEAggregateMaximumBitRate
    ProtocolIE-ID ::= 115
id-ServingPLMN
    ProtocolIE-ID ::= 116
id-E-RABs-ToBeAdded-List
    ProtocolIE-ID ::= 117
id-E-RABs-ToBeAdded-Item
    ProtocolIE-ID ::= 118
id-MeNBtoSeNBContainer
    ProtocolIE-ID ::= 119
id-E-RABs-Admitted-ToBeAdded-List
    ProtocolIE-ID ::= 120
id-E-RABs-Admitted-ToBeAdded-Item
    ProtocolIE-ID ::= 121
id-SeNBtoMeNBContainer
    ProtocolIE-ID ::= 122
id-ResponseInformationSeNBReconfComp
    ProtocolIE-ID ::= 123
id-UE-ContextInformationSeNBModReq
    ProtocolIE-ID ::= 124
id-E-RABs-ToBeAdded-ModReqItem
    ProtocolIE-ID ::= 125
id-E-RABs-ToBeModified-ModReqItem
    ProtocolIE-ID ::= 126
id-E-RABs-ToBeReleased-ModReqItem
    ProtocolIE-ID ::= 127
id-E-RABs-Admitted-ToBeAdded-ModAckList
    ProtocolIE-ID ::= 128
id-E-RABs-Admitted-ToBeModified-ModAckList
    ProtocolIE-ID ::= 129
```

```
id-E-RABs-Admitted-ToBeReleased-ModAckList
    ProtocolIE-ID ::= 130
id-E-RABs-Admitted-ToBeAdded-ModAckItem
    ProtocolIE-ID ::= 131
id-E-RABs-Admitted-ToBeModified-ModAckItem
    ProtocolIE-ID ::= 132
id-E-RABs-Admitted-ToBeReleased-ModAckItem
    ProtocolIE-ID ::= 133
id-E-RABs-ToBeReleased-ModReqd
    ProtocolIE-ID ::= 134
id-E-RABs-ToBeReleased-ModReqdItem
    ProtocolIE-ID ::= 135
id-SCGChangeIndication
    ProtocolIE-ID ::= 136
id-E-RABs-ToBeReleased-List-RelReq
    ProtocolIE-ID ::= 137
id-E-RABs-ToBeReleased-RelReqItem
    ProtocolIE-ID ::= 138
id-E-RABs-ToBeReleased-List-RelConf
    ProtocolIE-ID ::= 139
id-E-RABs-ToBeReleased-RelConfItem
    ProtocolIE-ID ::= 140
id-E-RABs-SubjectToCounterCheck-List
    ProtocolIE-ID ::= 141
id-E-RABs-SubjectToCounterCheckItem
    ProtocolIE-ID ::= 142
id-CoverageModificationList
    ProtocolIE-ID ::= 143
id-ReportingPeriodicityCSIR
    ProtocolIE-ID ::= 145
id-CSIReportList
    ProtocolIE-ID ::= 146
id-UEID
    ProtocolIE-ID ::= 147
id-enhancedRNTP
    ProtocolIE-ID ::= 148
id-ProSeUEtoNetworkRelaying
    ProtocolIE-ID ::= 149
id-ReceiveStatusOfULPDCPSDUsPDCP-SNlength18
    ProtocolIE-ID ::= 150
id-ULCOUNTValuePDCP-SNlength18
    ProtocolIE-ID ::= 151
id-DLCOUNTValuePDCP-SNlength18
    ProtocolIE-ID ::= 152
id-UE-ContextReferenceAtSeNB
    ProtocolIE-ID ::= 153
id-UE-ContextKeptIndicator
    ProtocolIE-ID ::= 154
id-New-eNB-UE-X2AP-ID-Extension
    ProtocolIE-ID ::= 155
id-Old-eNB-UE-X2AP-ID-Extension
    ProtocolIE-ID ::= 156
id-MeNB-UE-X2AP-ID-Extension
    ProtocolIE-ID ::= 157
id-SeNB-UE-X2AP-ID-Extension
    ProtocolIE-ID ::= 158
id-LHN-ID
    ProtocolIE-ID ::= 159
id-FreqBandIndicatorPriority
    ProtocolIE-ID ::= 160
id-M6Configuration
    ProtocolIE-ID ::= 161
id-M7Configuration
    ProtocolIE-ID ::= 162
id-Tunnel-Information-for-BBF
    ProtocolIE-ID ::= 163
id-SIPTO-BearerDeactivationIndication
    ProtocolIE-ID ::= 164
id-GW-TransportLayerAddress
    ProtocolIE-ID ::= 165
id-Correlation-ID
    ProtocolIE-ID ::= 166
```

```
id-SIPTO-Correlation-ID
    ProtocolIE-ID ::= 167
id-SIPTO-L-GW-TransportLayerAddress
    ProtocolIE-ID ::= 168
id-X2RemovalThreshold
    ProtocolIE-ID ::= 169
id-CellReportingIndicator
    ProtocolIE-ID ::= 170
id-BearerType
    ProtocolIE-ID ::= 171
id-resumeID
    ProtocolIE-ID ::= 172
id-UE-ContextInformationRetrieve
    ProtocolIE-ID ::= 173
id-E-RABs-ToBeSetupRetrieve-Item
    ProtocolIE-ID ::= 174
id-NewEUTRANCellIdentifier
    ProtocolIE-ID ::= 175
id-V2XServicesAuthorized
    ProtocolIE-ID ::= 176
id-OffsetOfNbiotChannelNumberToDL-EARFCN
    ProtocolIE-ID ::= 177
id-OffsetOfNbiotChannelNumberToUL-EARFCN
    ProtocolIE-ID ::= 178
id-AdditionalSpecialSubframeExtension-Info
    ProtocolIE-ID ::= 179
id-BandwidthReducedSI
    ProtocolIE-ID ::= 180
id-MakeBeforeBreakIndicator
    ProtocolIE-ID ::= 181
id-UE-ContextReferenceAtWT
    ProtocolIE-ID ::= 182
id-WT-UE-ContextKeptIndicator
    ProtocolIE-ID ::= 183
id-UESidelinkAggregateMaximumBitRate
    ProtocolIE-ID ::= 184
id-uL-GTPtunnelEndpoint
    ProtocolIE-ID ::= 185
id-extended-e-RAB-MaximumBitrateDL
    ProtocolIE-ID ::= xxx
id-extended-e-RAB-MaximumBitrateUL
    ProtocolIE-ID ::= xxx+1
id-extended-e-RAB-GuaranteedBitrateDL
    ProtocolIE-ID ::= xxx+2
id-extended-e-RAB-GuaranteedBitrateUL
    ProtocolIE-ID ::= xxx+3
id-extended-uEaggregateMaximumBitRateDownlink
    ProtocolIE-ID ::= xxx+4
id-extended-uEaggregateMaximumBitRateUplink
    ProtocolIE-ID ::= xxx+5
id-NRrestriction
    ProtocolIE-ID ::= xxx+6
id-SgNBSecurityKey
    ProtocolIE-ID ::= xxx+7
id-SgNBUEAggregateMaximumBitRate
    ProtocolIE-ID ::= xxx+8
id-E-RABs-ToBeAdded-SgNBAddReqList
    ProtocolIE-ID ::= xxx+9
id-MeNBtoSgNBContainer
    ProtocolIE-ID ::= xxx+10
id-SgNB-UE-X2AP-ID
    ProtocolIE-ID ::= xxx+11
id-SgNB-UE-X2AP-ID-Extension
    ProtocolIE-ID ::= xxx+12
id-RequestedMCGSplitSRBs
    ProtocolIE-ID ::= xxx+13
id-E-RABs-ToBeAdded-SgNBAddReq-Item
    ProtocolIE-ID ::= xxx+14
id-E-RABs-Admitted-ToBeAdded-SgNBAddResList
    ProtocolIE-ID ::= xxx+15
id-SgNBtoMeNBContainer
    ProtocolIE-ID ::= xxx+16
```

```
id-AdmittedMCGSplitSRBs
    ProtocolIE-ID ::= xxx+17
id-E-RABs-Admitted-ToBeAdded-SgNBAddRes-Item
    ProtocolIE-ID ::= xxx+18
id-ResponseInformationSgNBReconfComp
    ProtocolIE-ID ::= xxx+19
id-UE-ContextInformation-SgNBModReq
    ProtocolIE-ID ::= xxx+20
id-E-RABs-ToBeAdded-SgNBModReq-Item
    ProtocolIE-ID ::= xxx+21
id-E-RABs-ToBeModified-SgNBModReq-Item
    ProtocolIE-ID ::= xxx+22
id-E-RABs-ToBeReleased-SgNBModReq-Item
    ProtocolIE-ID ::= xxx+23
id-E-RABs-Admitted-ToBeAdded-SgNBModAckList
    ProtocolIE-ID ::= xxx+24
id-E-RABs-Admitted-ToBeModified-SgNBModAckList
    ProtocolIE-ID ::= xxx+25
id-E-RABs-Admitted-ToBeReleased-SgNBModAckList
    ProtocolIE-ID ::= xxx+26
id-E-RABs-Admitted-ToBeAdded-SgNBModAck-Item
    ProtocolIE-ID ::= xxx+27
id-E-RABs-Admitted-ToBeModified-SgNBModAck-Item
    ProtocolIE-ID ::= xxx+28
id-E-RABs-Admitted-ToBeReleased-SgNBModAck-Item
    ProtocolIE-ID ::= xxx+29
id-E-RABs-ToBeReleased-SgNBModReqdList
    ProtocolIE-ID ::= xxx+30
id-E-RABs-ToBeModified-SgNBModReqdList
    ProtocolIE-ID ::= xxx+31
id-E-RABs-ToBeReleased-SgNBModReqd-Item
    ProtocolIE-ID ::= xxx+32
id-E-RABs-ToBeModified-SgNBModReqd-Item
    ProtocolIE-ID ::= xxx+33
id-E-RABs-ToBeReleased-SgNBChaConfList
    ProtocolIE-ID ::= xxx+34
id-E-RABs-ToBeReleased-SgNBChaConf-Item
    ProtocolIE-ID ::= xxx+35
id-E-RABs-ToBeReleased-SgNBRelReqList
    ProtocolIE-ID ::= xxx+36
id-E-RABs-ToBeReleased-SgNBRelReq-Item
    ProtocolIE-ID ::= xxx+37
id-E-RABs-ToBeReleased-SgNBRelConfList
    ProtocolIE-ID ::= xxx+38
id-E-RABs-ToBeReleased-SgNBRelConf-Item
    ProtocolIE-ID ::= xxx+39
id-E-RABs-SubjectToSgNBCounterCheck-List
    ProtocolIE-ID ::= xxx+40
id-E-RABs-SubjectToSgNBCounterCheck-Item
    ProtocolIE-ID ::= xxx+41
id-RRCContainer
    ProtocolIE-ID ::= xxx+42
id-SRBType
    ProtocolIE-ID ::= xxx+43
id-Target-SgNB-ID
    ProtocolIE-ID ::= xxx+44
id-HandoverRestrictionList
    ProtocolIE-ID ::= xxx+45
id-SCGConfigurationQuery
    ProtocolIE-ID ::= xxx+46
id-MCGSplitSRB
    ProtocolIE-ID ::= xxx+47
id-UENRMeasurement
    ProtocolIE-ID ::= xxx+48
id-InitiatingNodeType-EndcX2Setup
    ProtocolIE-ID ::= xxx+49
id-InitiatingNodeType-EndcConfigUpdate
    ProtocolIE-ID ::= xxx+50
id-RespondingNodeType-EndcX2Setup
    ProtocolIE-ID ::= xxx+51
id-RespondingNodeType-EndcConfigUpdate
    ProtocolIE-ID ::= xxx+52
```

```
id-MeNBResourceCoordinationInformation
    ProtocolIE-ID ::= xxx+53
id-SgNBResourceCoordinationInformation
    ProtocolIE-ID ::= xxx+54

END
```

The invention claimed is:

1. A method by a master network node for resource coordination with a secondary network node for dual connectivity, the method comprising:
transmitting, to the secondary network node, in a SGNB addition request or SGNB modification request, resource coordination information for use by the secondary network node in coordinating resource utilization between the master network node and the secondary network node for a wireless device; and
receiving, from the secondary network node, in a SGNB addition acknowledge message or a SGNB modification acknowledge message, resource coordination information for use by the master network node in coordinating resource utilization between the master node and the second node for the wireless device.

2. A master network node for resource coordination with a secondary network node for dual connectivity, comprising:
processing circuitry, the processing circuitry configured to:
transmit, to the secondary network node, in a SGNB addition request or SGNB modification request, resource coordination information for use by the secondary network node in coordinating resource utilization between the master network node and the secondary network node for a wireless device; and
receive, from the secondary network node, in a SGNB addition acknowledge message or a SGNB modification acknowledge message, resource coordination information for use by the master network node in coordinating resource utilization between the master node and the second node for the wireless device.

3. The master network node of claim 2, wherein the processing circuitry is configured to receive, from the secondary network node, a response message acknowledging the resource coordination information.

4. The master network node of claim 2, wherein the processing circuitry is configured to:
use the resource coordination information from the secondary network node to coordinate resource utilization for the wireless device.

5. The master network node of claim 2, wherein:
the SGNB modification request requests the secondary network node to modify the at least one resource allocated to the wireless device.

6. The master network node of claim 2, wherein transmitting the resource coordination information to the secondary network node comprises transmitting an indication of an intended resource allocation of the master network node.

7. The master network node of claim 2, wherein receiving the resource coordination information from the secondary network node comprises receiving an indication of an intended resource allocation of the secondary network node.

8. The master network node of claim 2, wherein the resource coordination information is transmitted to the secondary network node over an X2 interface.

9. The master network node of claim 2, wherein the resource coordination information comprises a cell identifier associated with a cell in which the wireless device is served.

10. The master network node of claim 2, wherein the resource coordination information comprises an indication of an uplink resource allocation for at least one subframe.

11. The master network node of claim 2, wherein the resource coordination information comprises an indication of a downlink resource allocation for at least one subframe.

12. The master network node of claim 2, wherein the resource coordination information comprises an indication of whether the resource coordination information is for single transmitter user equipment (Tx UE) coordination.

13. The master network node of claim 2, wherein the resource coordination information comprises an indication of whether the resource coordination information is for harmonic interference coordination.

14. The master network node of claim 2, wherein the resource coordination information is valid until a subsequent transmission of additional resource coordination information.

15. The method of claim 2, wherein the dual connectivity between the master network node and the secondary network node comprises E-UTRAN-NR dual connectivity.

16. A method by a secondary network node for resource coordination with a master network node for dual connectivity, the method comprising:
receiving, from the master network node, in a SGNB addition request or SGNB modification request, resource coordination information for a wireless device;
using, by the secondary network node, the resource coordination information from the master network node for coordinating resource utilization between the master network node and the secondary network node for the wireless device; and
transmitting, to the master network node, in a SGNB addition acknowledge message or a SGNB modification acknowledge message, resource coordination information for use by the master network node in coordinating resource utilization between the master node and the second node for the wireless device.

17. A secondary network node for resource coordination with a master network node for dual connectivity, comprising:
processing circuitry configured to:
receive, from the master network node, in a SGNB addition request or SGNB modification request, resource coordination information for a wireless device;
use, by the secondary network node, the resource coordination information from the master network node for coordinating resource utilization between the master network node and the secondary network node for the wireless device; and
transmit, to the master network node, in a SGNB addition acknowledge message or a SGNB modification acknowledge message, resource coordination information for use by the master network node in coordinating resource utilization between the master node and the second node for the wireless device.

18. The secondary network node of claim 17, wherein the processing circuitry is configured to transmit, to the master network node, a response message acknowledging the resource coordination information received from the master network node.

19. The secondary network node of claim 17, wherein:
the SGNB modification request requests the secondary network node to modify at least one resource allocated to the wireless device.

20. The secondary network node of claim 17, wherein transmitting the resource coordination information from the secondary network node to the master network node comprises transmitting, to the master network node, an indication of an intended resource allocation of the secondary network node.

21. The secondary network node of claim 17, wherein receiving the resource coordination information from the master network node comprises receiving an indication of an intended resource allocation of the master network node.

22. The secondary network node of claim 17, wherein the resource coordination information is received from the master network node over an X2 interface.

23. The secondary network node of claim 17, wherein the resource coordination information comprises at least one of:
a cell identifier associated with a cell in which the wireless device is served.

* * * * *